United States Patent
Gilman

(10) Patent No.: US 9,476,133 B2
(45) Date of Patent: Oct. 25, 2016

(54) PORTABLE HYDROGEN AND OXYGEN SUPPLY SYSTEM

(71) Applicant: Brian Daniel Gilman, East Northport, NY (US)

(72) Inventor: Brian Daniel Gilman, East Northport, NY (US)

( * ) Notice: Subject to any disclaimer, the term of this patent is extended or adjusted under 35 U.S.C. 154(b) by 37 days.

(21) Appl. No.: 14/219,257

(22) Filed: Mar. 19, 2014

(65) Prior Publication Data
US 2014/0284209 A1  Sep. 25, 2014

Related U.S. Application Data

(60) Provisional application No. 61/803,140, filed on Mar. 19, 2013.

(51) Int. Cl.
| | |
|---|---|
| *C25B 1/04* | (2006.01) |
| *C25B 9/08* | (2006.01) |
| *C25B 1/00* | (2006.01) |
| *C25D 17/00* | (2006.01) |
| *C25C 7/02* | (2006.01) |
| *C25C 7/00* | (2006.01) |

(Continued)

(52) U.S. Cl.
CPC .............. *C25B 11/02* (2013.01); *C25B 1/04* (2013.01); *C25B 9/00* (2013.01); *Y02E 60/366* (2013.01)

(58) Field of Classification Search
CPC ............ C25B 1/04; C25B 9/08; C25B 9/00; C25B 1/00; C25B 1/10; C25B 1/02; C25D 17/00; C25C 7/02; C25C 7/00; C25C 3/16; C25C 3/10; C25C 3/12
USPC ................... 204/242, 628, 285, 286.1, 288.1
See application file for complete search history.

(56) References Cited

U.S. PATENT DOCUMENTS

| | | | | |
|---|---|---|---|---|
| 3,313,718 A | * | 4/1967 | Bloch | B01D 17/06 204/542 |
| 4,456,519 A | * | 6/1984 | Zollner | C25C 7/02 204/290.01 |

(Continued)

OTHER PUBLICATIONS

The Notification of Transmittal of the International Search Report and Written Opinion of the International Searching Authority, or the Declaration, dated Jul. 29, 2014, the International Search Report, dated Jul. 29, 2014, and the Written Opinion of the International Searching Authority, dated Jul. 29, 2014, issued from Applicant's corresponding PCT Application No. PCT/US2014/031181, filed on Mar. 19, 2014, each of which being from the World Intellectual Property Organization (WIPO).

*Primary Examiner* — Zulmariam Mendez
(74) *Attorney, Agent, or Firm* — Gerald T. Bodner

(57) ABSTRACT

A portable hydrogen and oxygen supply system produces gaseous hydrogen and gaseous oxygen from water. It separates the gasses and vents them into two separate chambers. The supply system creates water disassociation through an array of concentric hexagonal hydrogen collector tubes, anode rods and a cathode matrix, all of which are submersed in water. The anode rods and cathode matrix are supplied DC electrical current. The water separates (disassociates) as atomic hydrogen is drawn to the negatively charged anode rods and the atomic oxygen is drawn to the positively charged cathode matrix. The hydrogen, on its path to the anode, passes through the walls of the hydrogen collector tubes to be collected in the first chamber. The oxygen is unable to pass through the walls of the tubes, and remains outside the tubes to be collected in the second chamber.

80 Claims, 58 Drawing Sheets

(51) Int. Cl.
*C25C 3/16* (2006.01)
*C25C 3/10* (2006.01)
*C25C 3/12* (2006.01)
*C25B 11/02* (2006.01)
*C25B 9/00* (2006.01)

(56) References Cited

U.S. PATENT DOCUMENTS

| | | | |
|---|---|---|---|
| 5,667,647 A * | 9/1997 | Suga | C25B 1/10 204/237 |
| 5,972,196 A * | 10/1999 | Murphy | B01D 53/22 204/157.15 |
| 6,852,205 B1 * | 2/2005 | Toyoshima | C25B 9/20 204/253 |
| 2004/0062977 A1 | 4/2004 | Yazici et al. | 429/38 |
| 2007/0151846 A1* | 7/2007 | Klein | C01B 3/00 204/237 |
| 2007/0151865 A1 | 7/2007 | Shimko et al. | 205/628 |
| 2008/0245673 A1 | 10/2008 | Ghosh et al. | 205/639 |
| 2009/0139856 A1 | 6/2009 | Chiarini, Jr. | 204/272 |
| 2011/0117459 A1 | 5/2011 | McGill | 429/421 |
| 2011/0147204 A1 | 6/2011 | Leiato et al. | 204/272 |
| 2012/0055805 A1 | 3/2012 | Kirchoff et al. | 205/637 |
| 2012/0315539 A1* | 12/2012 | Lashmore | H01B 1/04 429/211 |

* cited by examiner

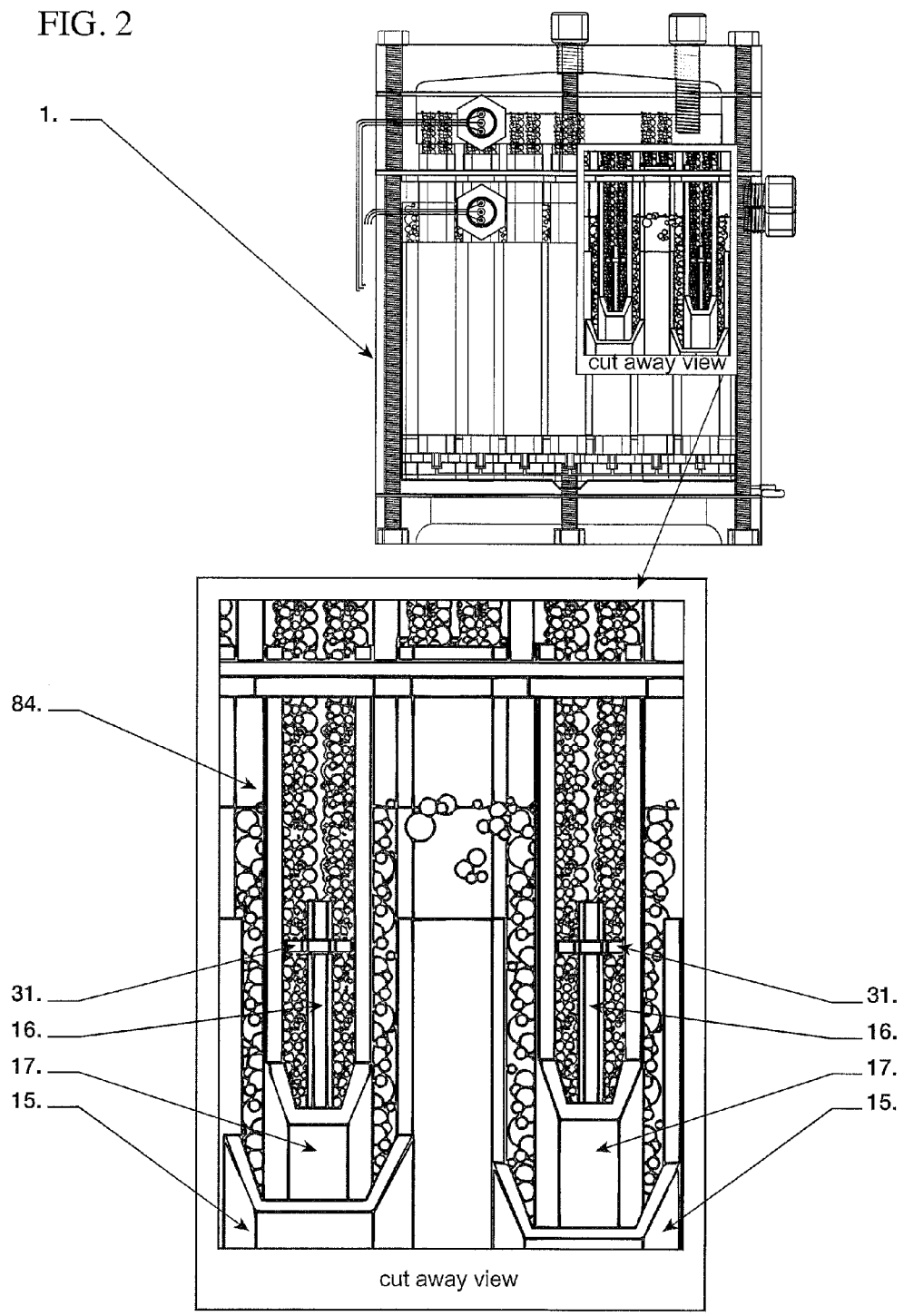

24.

Circular Matrix Variation

Triangular Matrix Variation

Hexagonal Matrix Variation

PORTABLE HYDROGEN AND OXYGEN SUPPLY SYSTEM

CROSS-REFERENCE TO RELATED APPLICATIONS

This application is related to the U.S. Provisional Application Ser. No. 61/803,140, filed on Mar. 19, 2013, and entitled "Portable Hydrogen and Oxygen Supply System", the disclosure of which is incorporated herein by reference and on which priority is hereby claimed.

BACKGROUND OF THE INVENTION

1. Field of the Invention

The present invention relates to hydrogen gas and oxygen gas generation systems, and more particularly relates to methods and devices which employ electrolysis to cause water disassociation and to create hydrogen gas and oxygen gas therefrom.

2. Description of the Prior Art

There are many known types of hydrogen gas and oxygen gas generation systems which are based on electrolysis to cause water disassociation to generate these gases. However, most such systems are expensive to manufacture and operate, and large and cumbersome or yield relatively low volumes of gases.

For example, some such systems use expensive, rare platinum electrodes or catalysts, which have a limited life. Some systems employ bipolar stacks of electrodes, which do not mimic the path of electrical currents moving through water and, thus, do not permit the maximum possible generation of hydrogen and oxygen gases.

Other conventional devices use proton exchange membranes (PEMs) for gas separation, but these require relatively high power and draw relatively high current, and require certain torque pressures to work. Also, devices using PEMs or solid oxide fuel cells (SOFC) for gas generation may require elevated temperatures to generate gases.

Additionally, some hydrogen gas/oxygen gas generators require distilled water for gas generation, and some generators must use electrolytes, requiring special care in using the generators and disposing of the electrolytes.

OBJECTS AND SUMMARY OF THE INVENTION

It is an object of the present invention to provide a hydrogen and oxygen supply system that uses highly electro-conductive polymers or highly electro-conductive carbon aerogels instead of platinum for its diodes, the highly electro-conductive polymers or highly electro-conductive carbon aerogels promising longer life of the diode material than conventional diode materials.

It is another object of the present invention to provide a hydrogen and oxygen supply system which is portable, but can be scaled up for industrial applications.

It is still another object of the present invention to provide a hydrogen and oxygen supply system that makes pure atomic hydrogen and pure atomic oxygen gasses from common water that does not require distillation.

It is yet another object of the present invention to provide a hydrogen and oxygen supply system which can be injection molded to keep consumer cost reasonable.

It is a further object of the present invention to provide a hydrogen and oxygen supply system which does not use liquid electrolytes.

It is still a further object of the present invention to provide a hydrogen and oxygen supply system which does not need Proton Exchange Membranes (PEM).

It is yet a further object of the present invention to provide a hydrogen and oxygen supply system which will create greater yields of gasses at lower voltage than that of PEM assembly generation devices.

It is an object of the present invention to provide a hydrogen and oxygen supply system which can disassociate water at lower temperatures than that of PEM, Solid Oxide Fuel Cell (SOFC), and many other devices that disassociate water.

It is another object of the present invention to provide a hydrogen and oxygen supply system which works at lower internal pressures than most, if not all, other devices that disassociate water.

It is still another object of the present invention to provide a hydrogen and oxygen supply system in which all emissions are environmentally safe, when using water.

It is a further object of the present invention to provide a hydrogen and oxygen supply system which uses a unique "honeycomb" planar design.

It is yet a further object of the present invention to provide a hydrogen and oxygen supply system which employs simple electrolysis, and passes the hydrogen from water through a polymer that filters out the oxygen.

It is another object of the present invention to provide a hydrogen and oxygen supply system which can produce the necessary gasses for fuel cells, welding torches, hydrogen internal combustion engines, forming gasses, gasses for hospitals, cabin conditions and academic use.

The device of the present invention produces gaseous hydrogen and gaseous oxygen from water. It separates the gasses and vents them into two separate chambers. The device creates water disassociation through an array of concentric hexagonal electro-conductive polymer tubes, rods and a cathode matrix, all of which are submersed in water. The individual chambers are supplied DC electrical current. The water separates (disassociates) as atomic hydrogen is drawn to the negatively charged anode rod and the atomic oxygen is drawn to the positively charged cathode matrix. The hydrogen, on its path to the anode, must pass through the walls of a hexagonal tube made from the same electro-conductive polymer. The oxygen has been observed to be unable to pass through the wall of the tube, and remains on its outside to float up to the top of the first chamber (referred to as the Redox Chamber). The hydrogen passes up the collection tube to the second chamber (referred to as the Hydrogen Trap). Both gasses are vented into two separate lines where they pass through two separate bubblers. They then pass through two driers and are ported outside the device for collection and storage.

These and other objects, features and advantages of the present invention will be apparent from the following detailed description of illustrative embodiments thereof, which is to be read in connection with the accompanying drawings.

BRIEF DESCRIPTION OF THE DRAWINGS

FIG. 2 is an enlarged cut away view of reaction inside of the Cathode Matrix, the Hydrogen Collector Tubes with anodes inside and the flow of gasses into the Hydrogen Trap and Redox Chamber, each of which forms part of the hydrogen and oxygen supply system of the present invention.

DETAILED DESCRIPTION OF THE PREFERRED EMBODIMENTS

Figure 1:
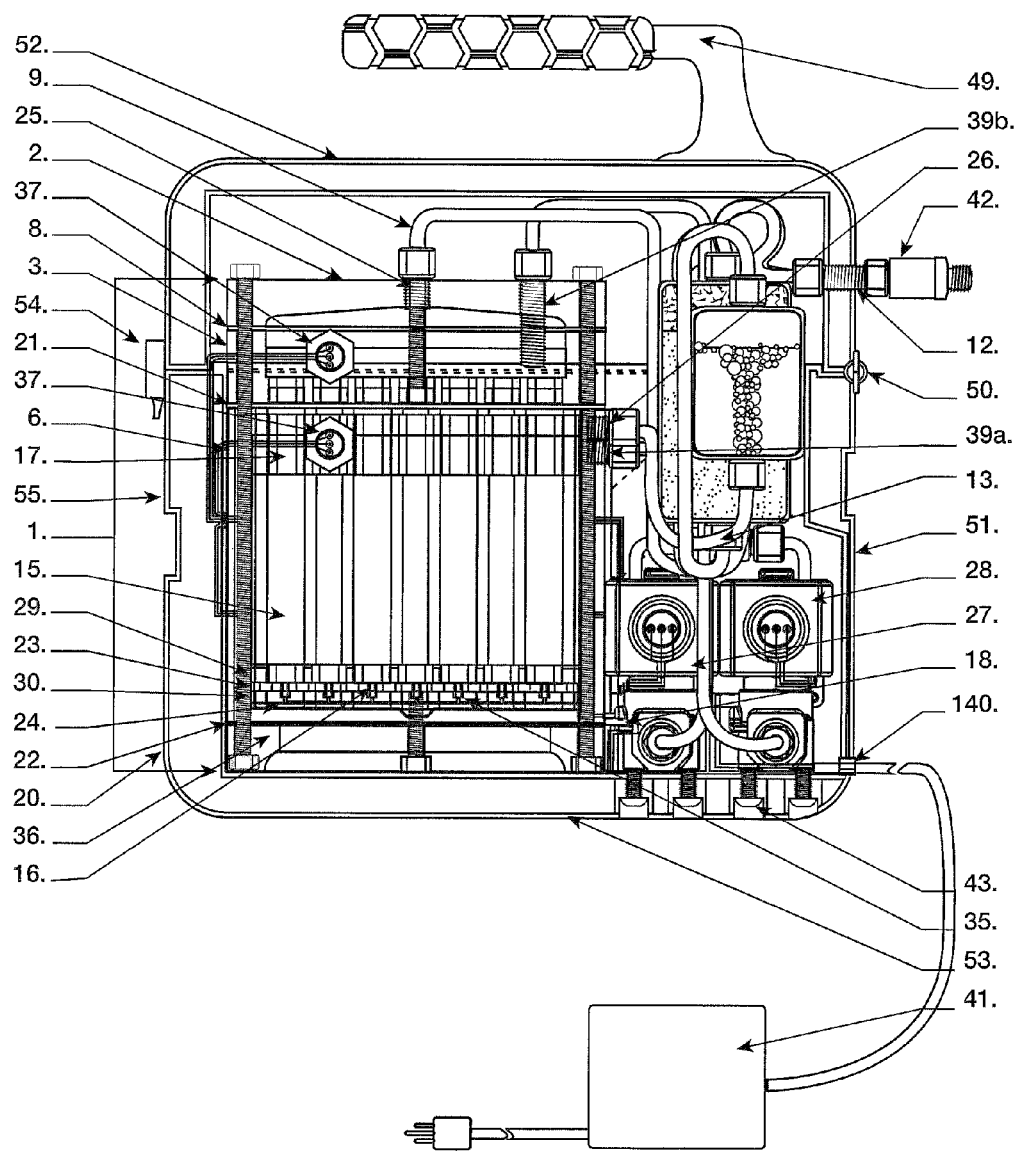
FIGS. 1 and 1A are left side and top cut away overviews, respectively, of a hydrogen and oxygen supply system formed in accordance with the present invention.
Figure 1A:
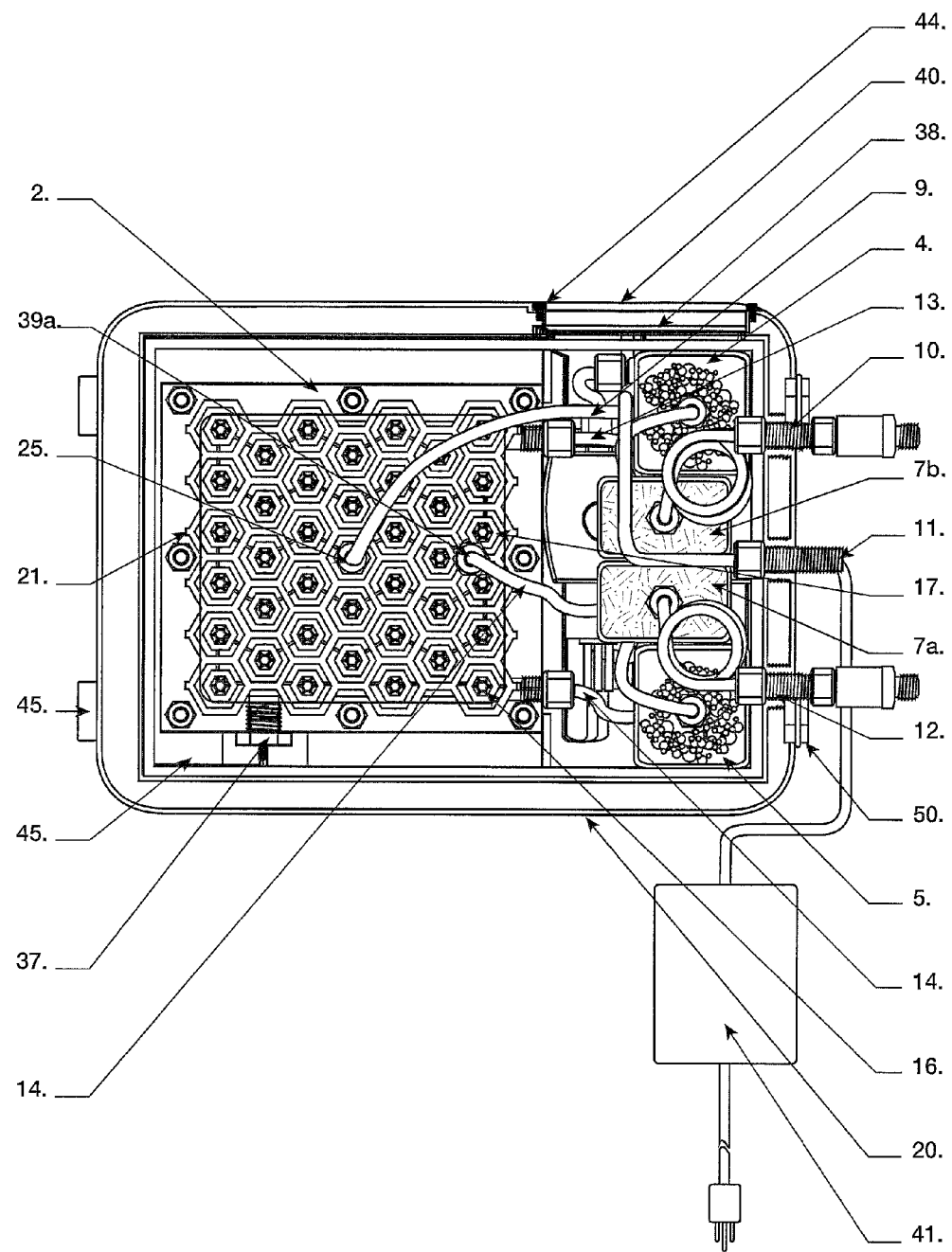
Figure 3:
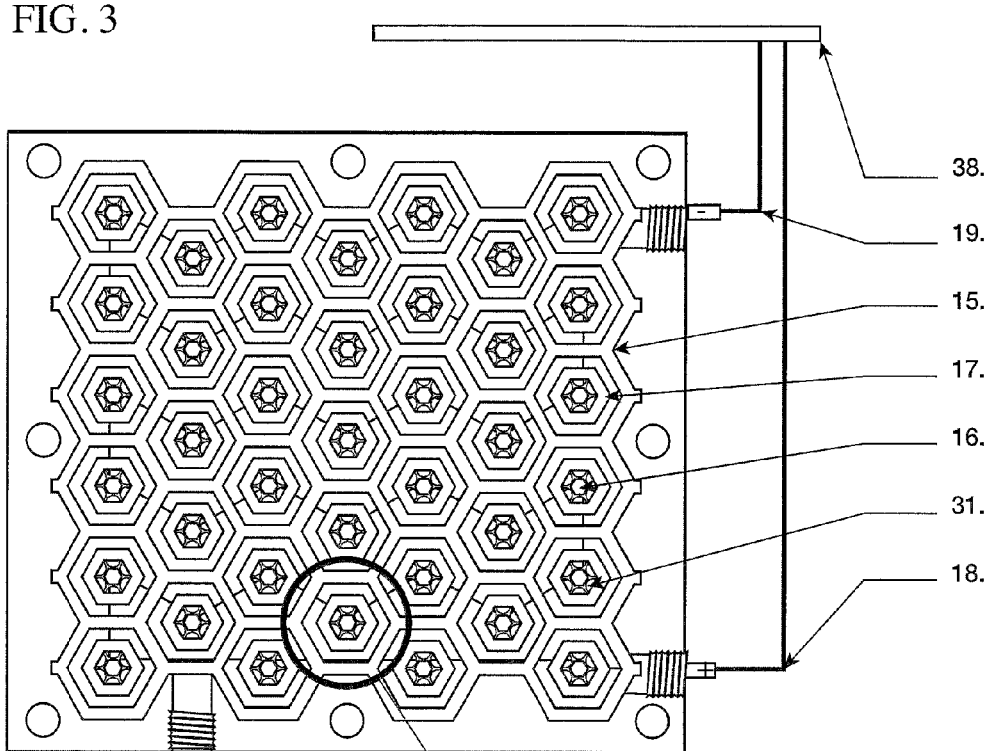
FIG. 3 is a top view of the hydrogen and oxygen supply system of the present invention, with the cut away view showing the disassociation of water into the two gasses and how the hydrogen is pulled through the Hydrogen Collector Tubes to go to the Anodes as the oxygen is pulled towards the Cathode Matrix.
Figure 3A:
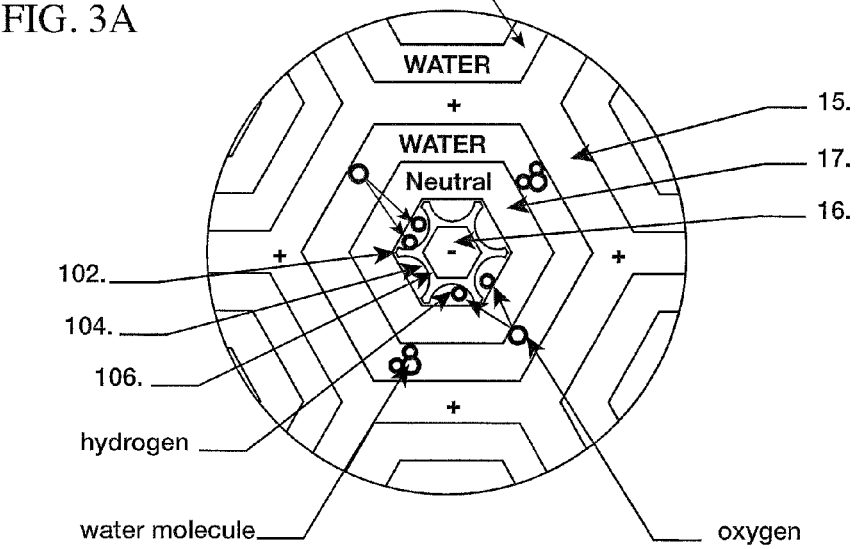
FIG. 3A is an enlarged top view of a portion of the hydrogen and oxygen supply system of the present invention shown in the circle of FIG. 3.
Figure 4A:
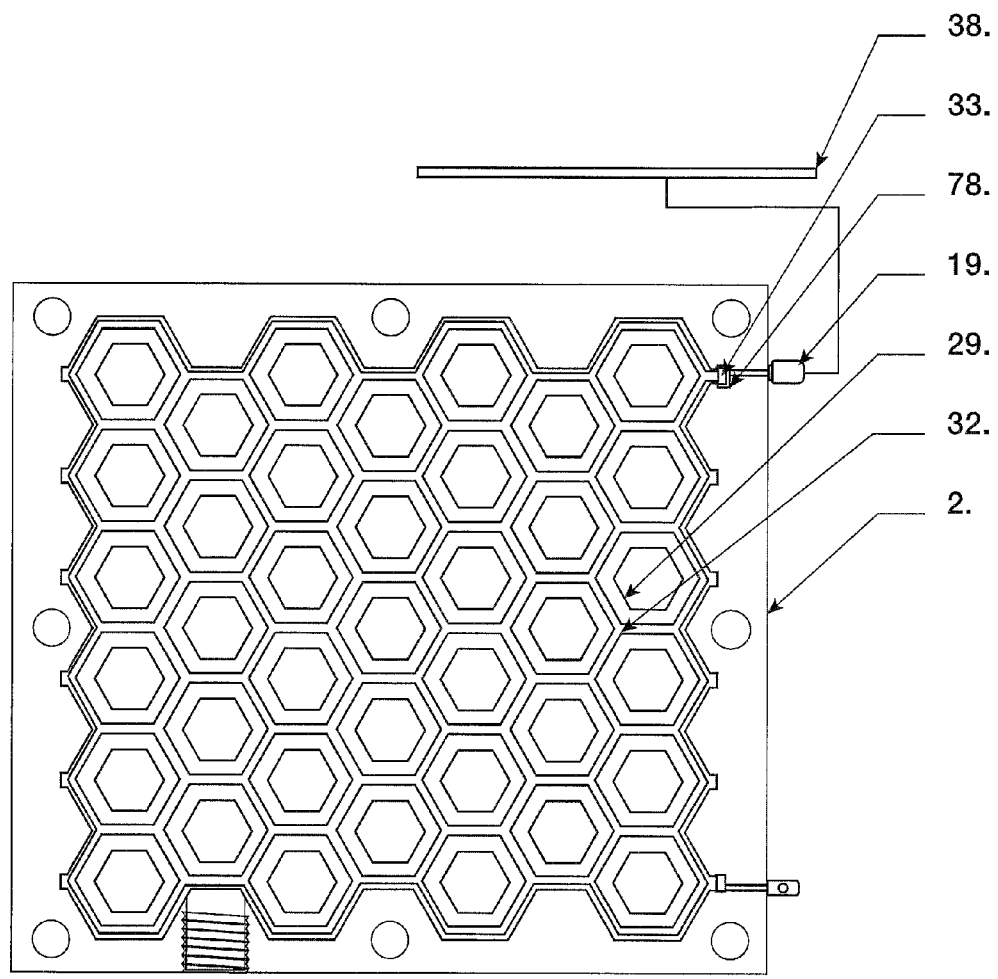
FIGS. 4A and 4B are respectively a top plan view and an exploded isometric view of the Cathode Touch Plate forming part of the hydrogen and oxygen supply system of the present invention.
Figure 4B:
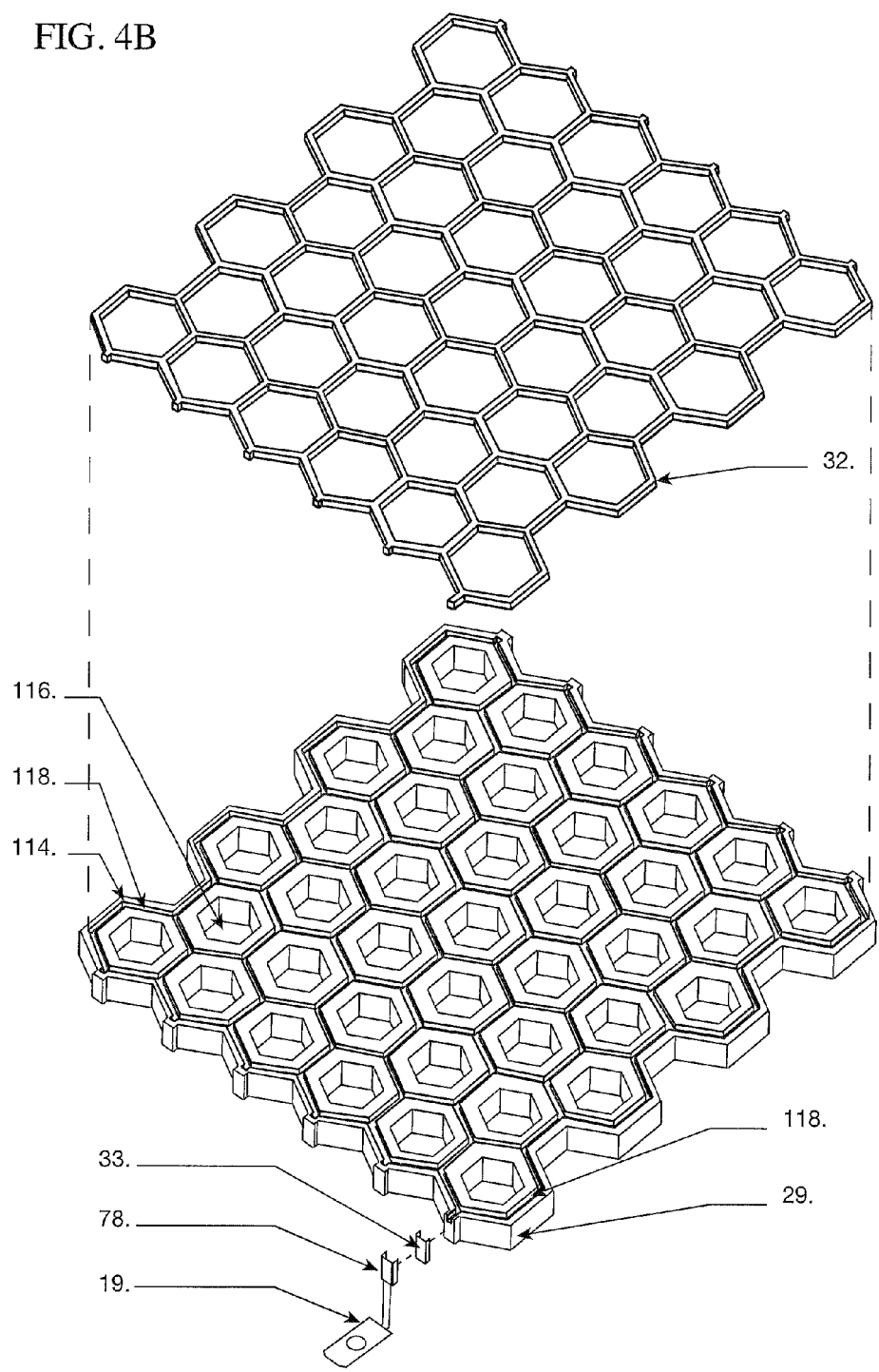
Figure 5A:
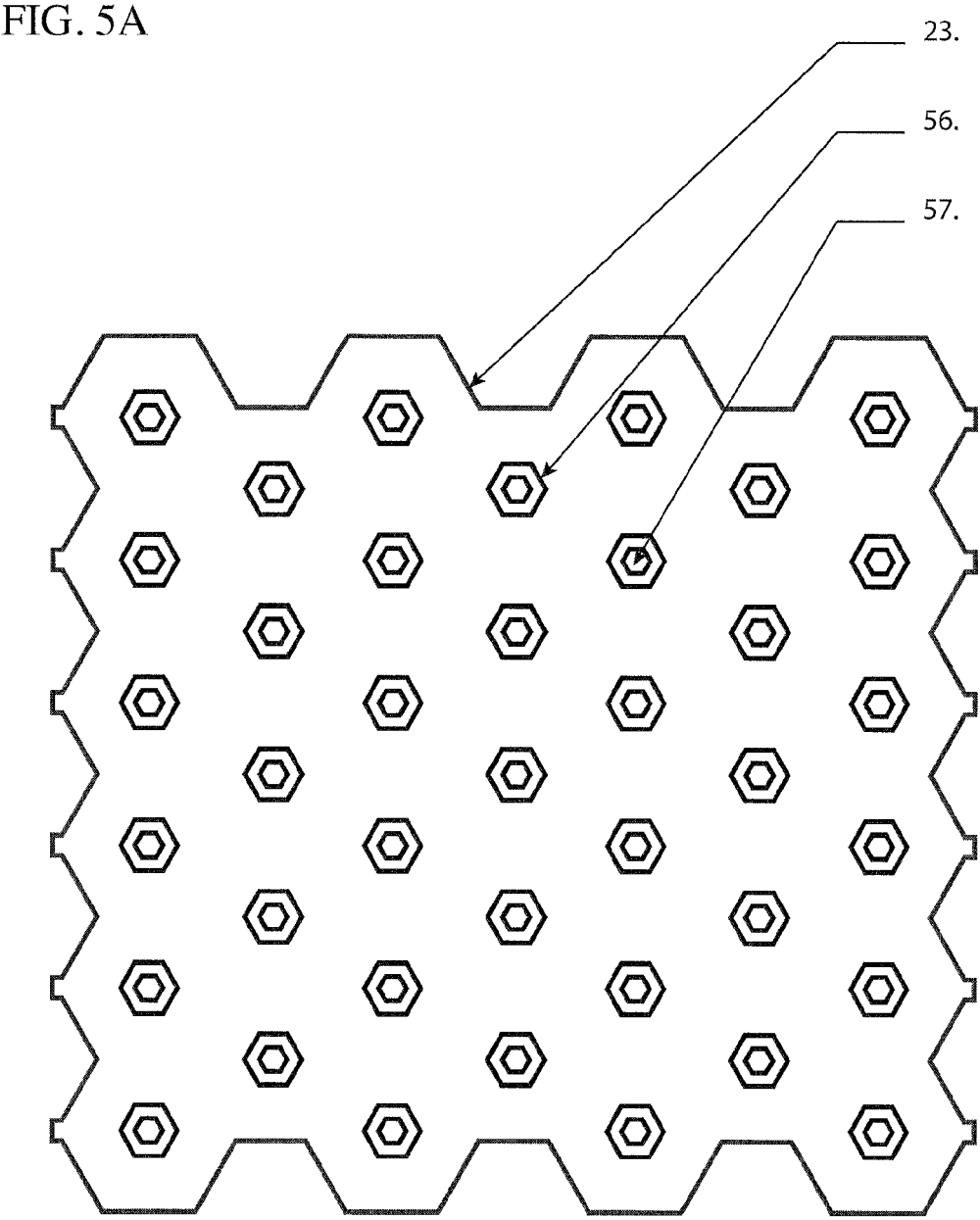
FIGS. 5A, 5B and 5C are respectively a top plan view, a side view and an isometric view of the Collector Gasket forming part of the hydrogen and oxygen supply system of the present invention.
Figure 5B:
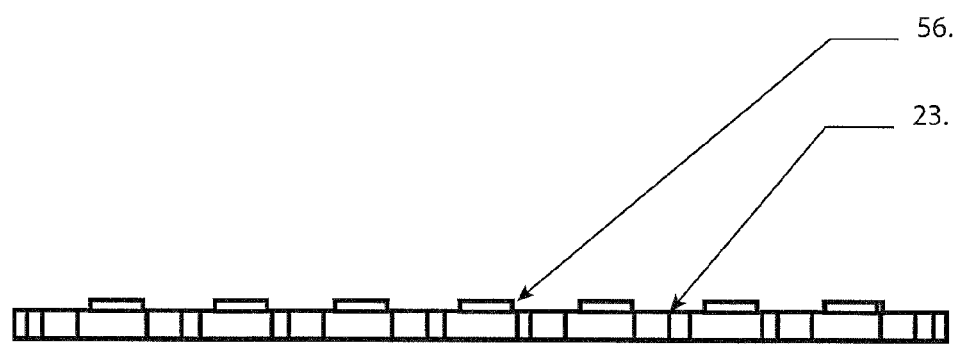
Figure 5C:
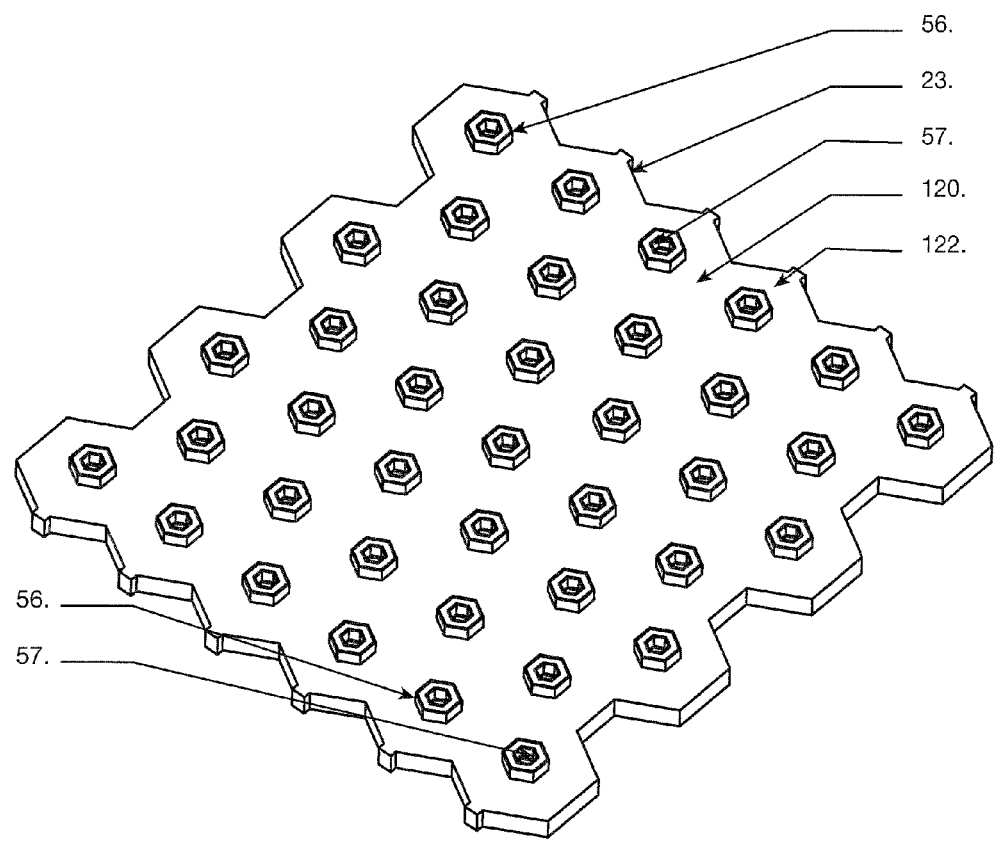
Figure 6A:
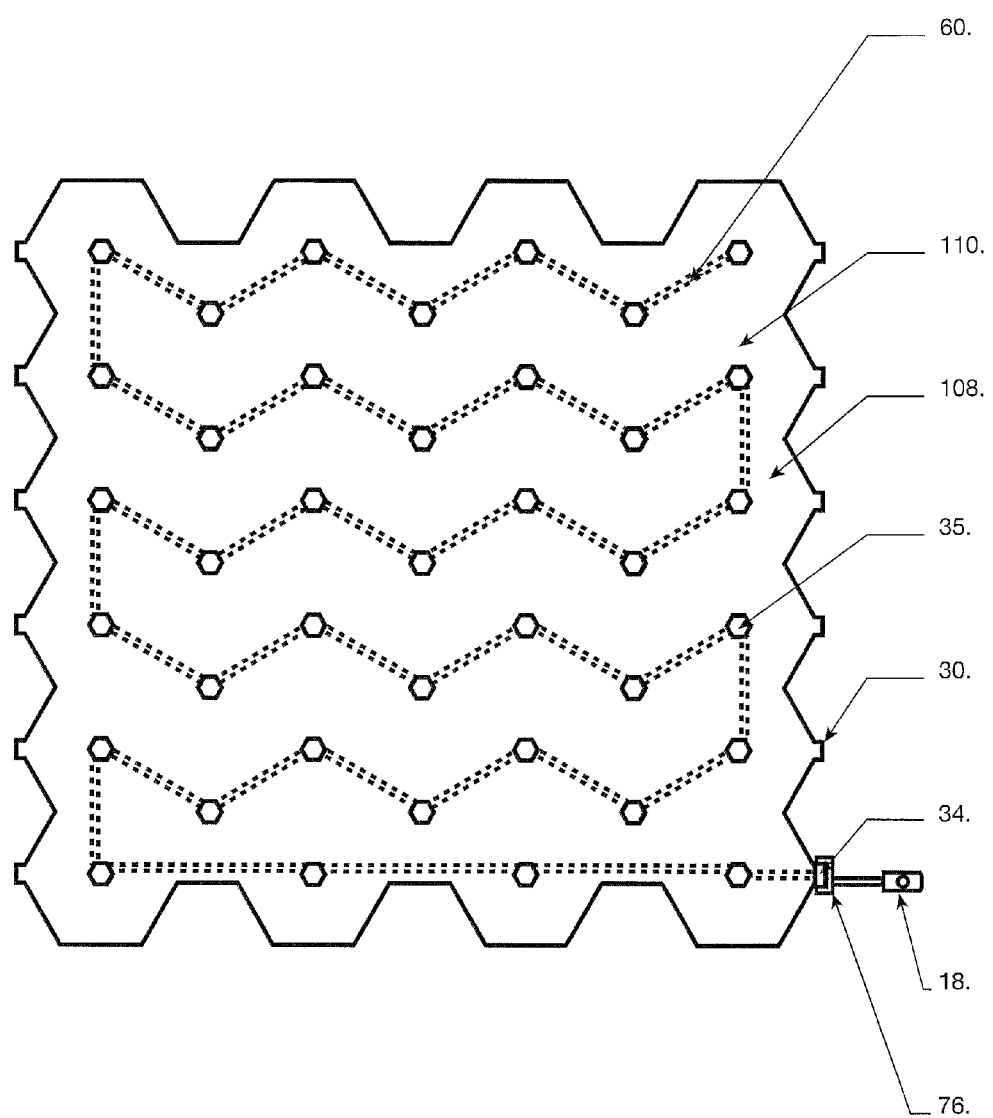
FIGS. 6A, 6B and 6C are respectively a top plan view, an exploded side view and an exploded isometric view of the Anode Touch Plate forming part of the hydrogen and oxygen supply system of the present invention.
Figure 6B:
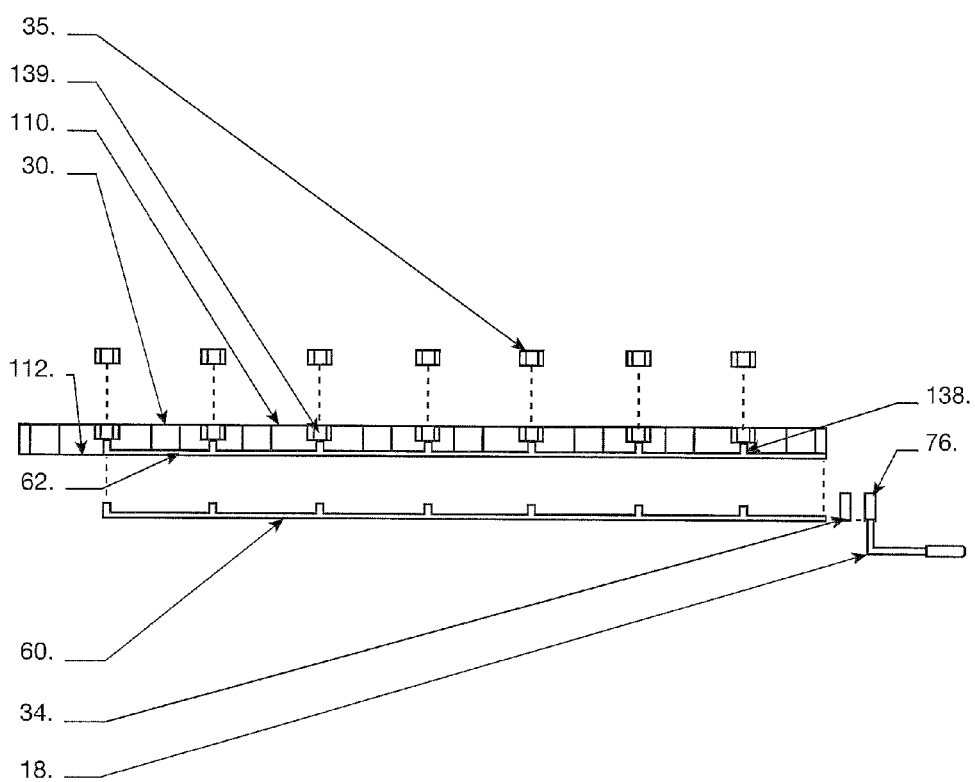
Figure 6C:
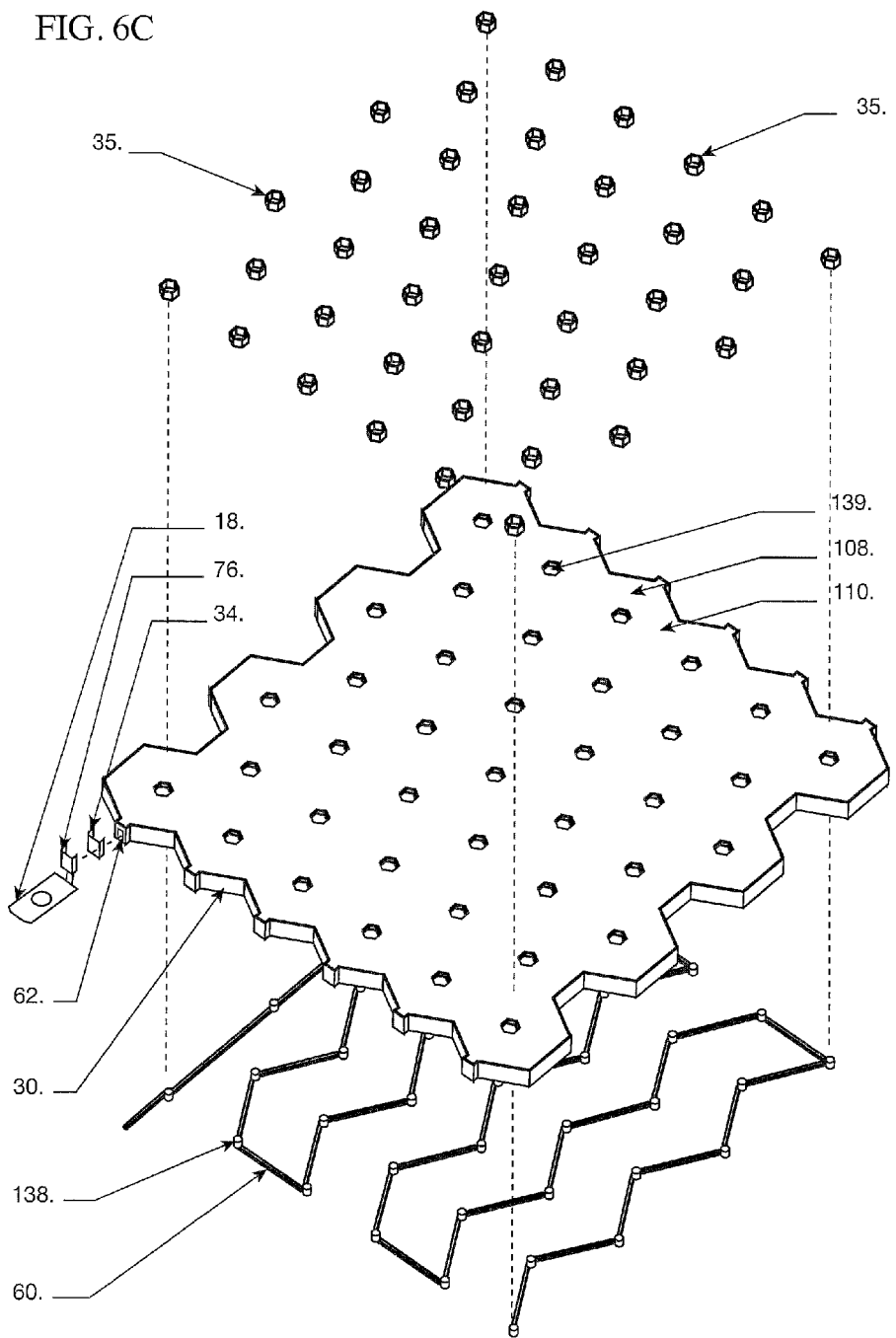
Figure 7A:
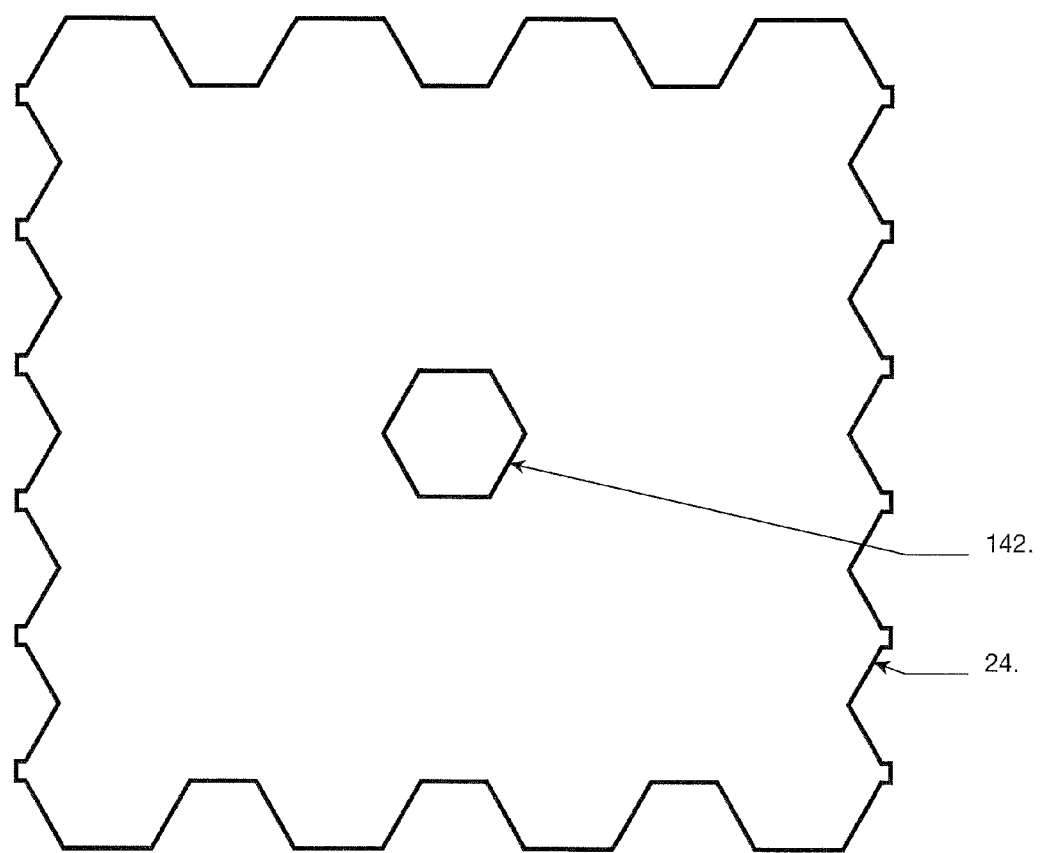
FIGS. 7A, 7B and 7C are respectively a top plan view, a side view and an isometric view of the Seat Gasket forming part of the hydrogen and oxygen supply system of the present invention.
Figure 7B:
Figure 7C:
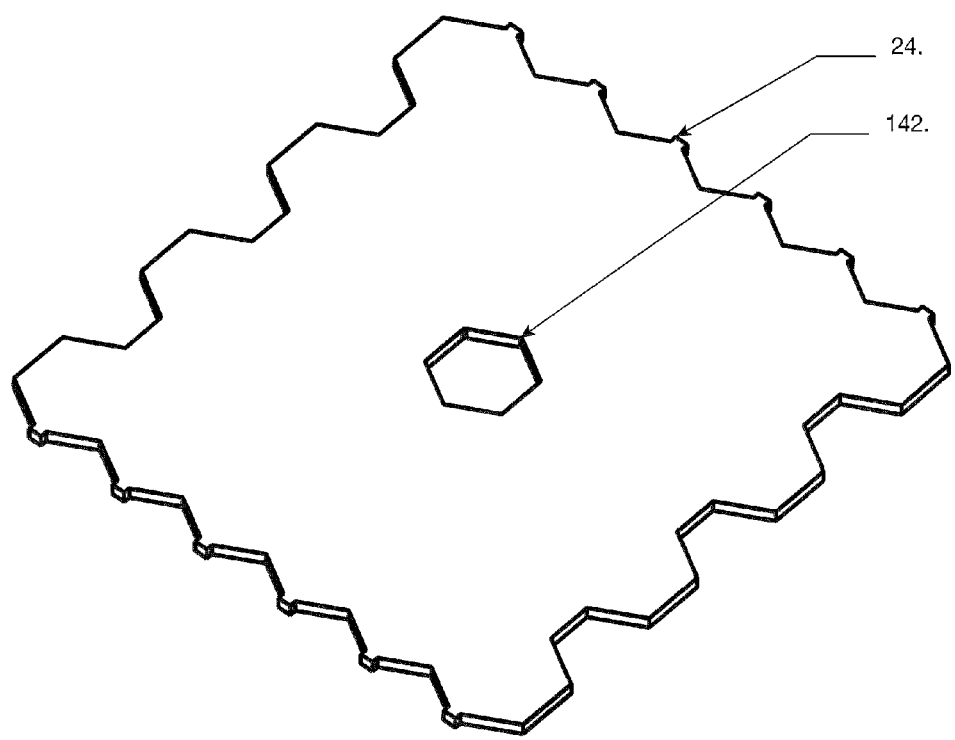
Figure 8A:
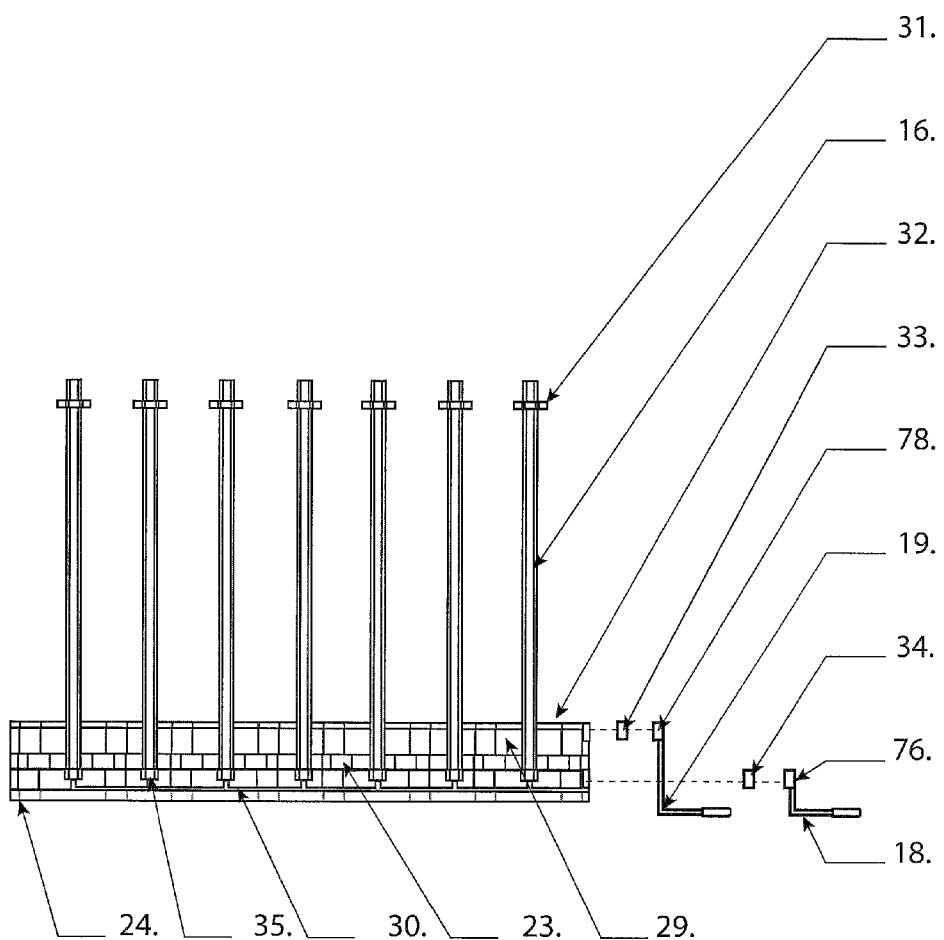
FIGS. 8A and 8B are respectively a side view and an isometric view of the combined electrical assembly of Seat Gasket, Anode Touch Plate, Collector Gasket, Cathode Touch Plate, the negative and positive leads and the Anodes (with the Anode Spacers) inserted in their Anode Push Sockets forming part of the hydrogen and oxygen supply system of the present invention.
Figure 8B:
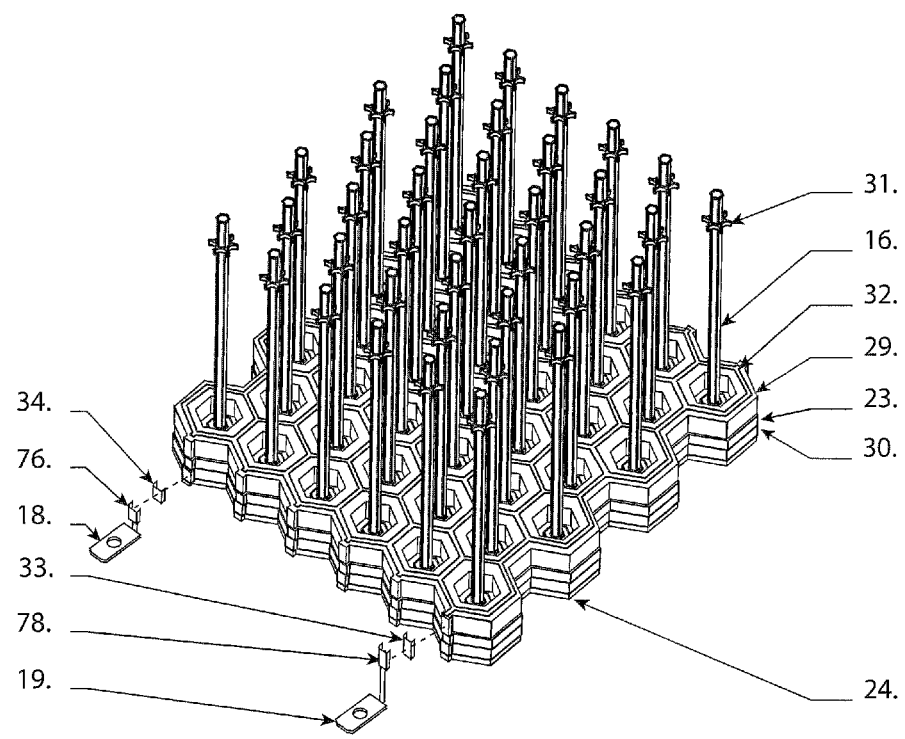
Figure 9A:
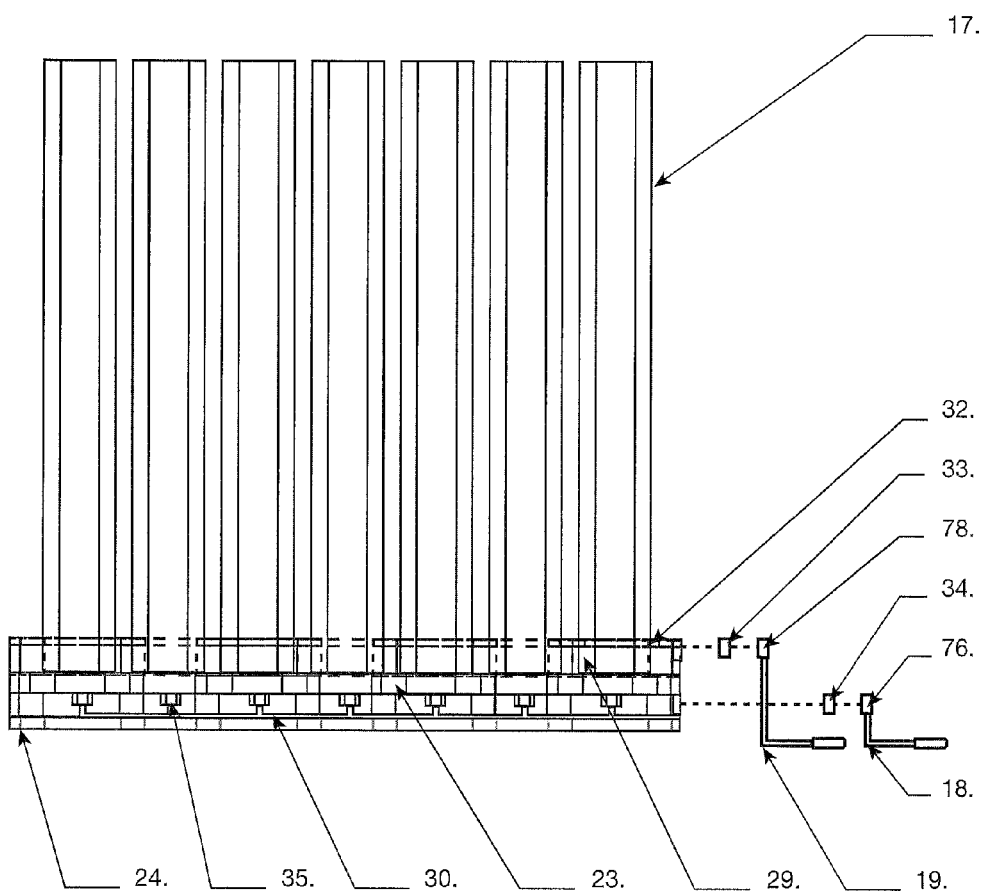
FIGS. 9A and 9B are respectively a side view and an isometric view of the same assembly as shown in FIGS. 8A and 8B but with the Hydrogen Collector Tubes mounted in place forming part of the hydrogen and oxygen supply system of the present invention.
Figure 9B:
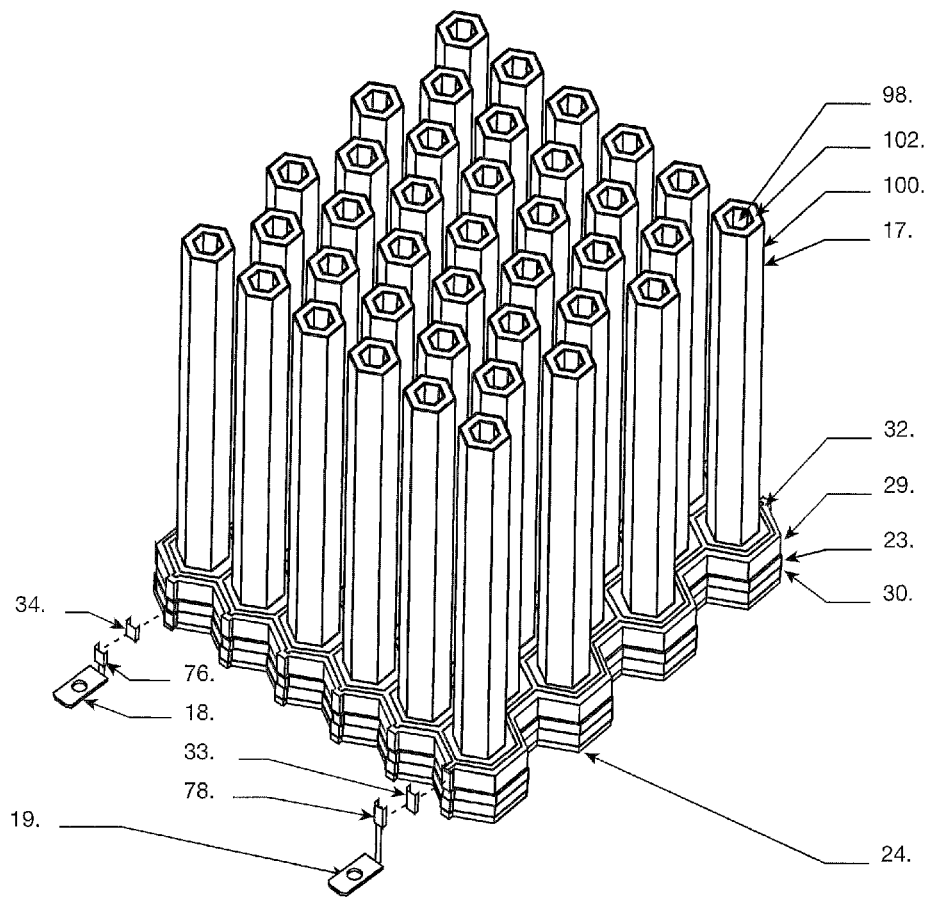
Figure 10A:
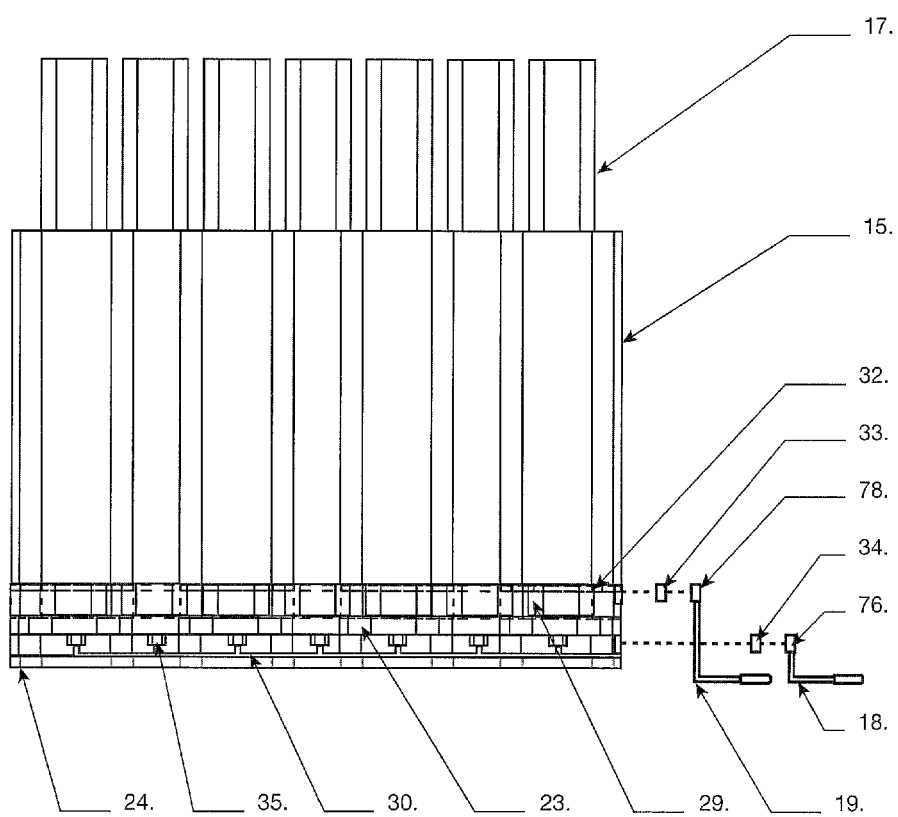
FIGS. 10A and 10B are respectively a side view and an isometric view which show how the Cathode Matrix is mounted on top of the electrical assembly forming part of the hydrogen and oxygen supply system of the present invention.
Figure 10B:
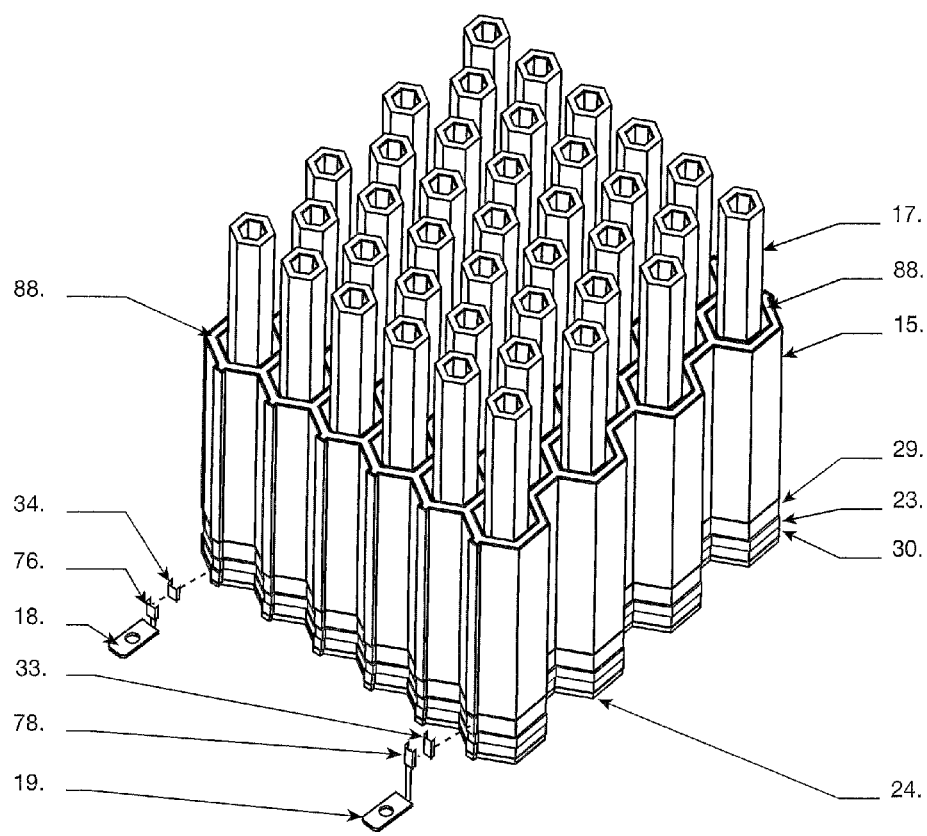
Figure 11A:
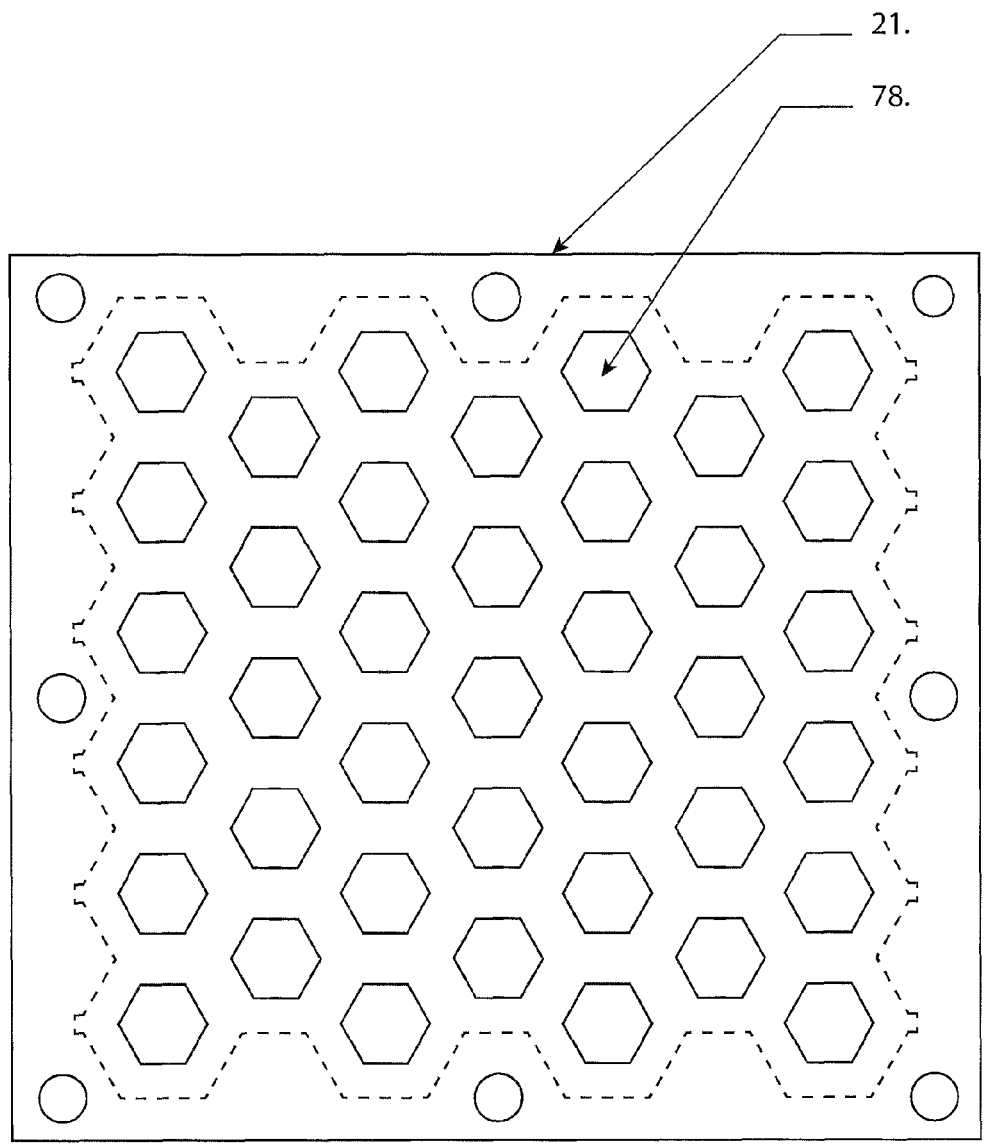
FIGS. 11A, 11B, 11C and 11D are respectively a top plan view, a side view, a top isometric view and a bottom isometric view of the Choke Gasket forming part of the hydrogen and oxygen supply system of the present invention.
Figure 11B:
Figure 11C:
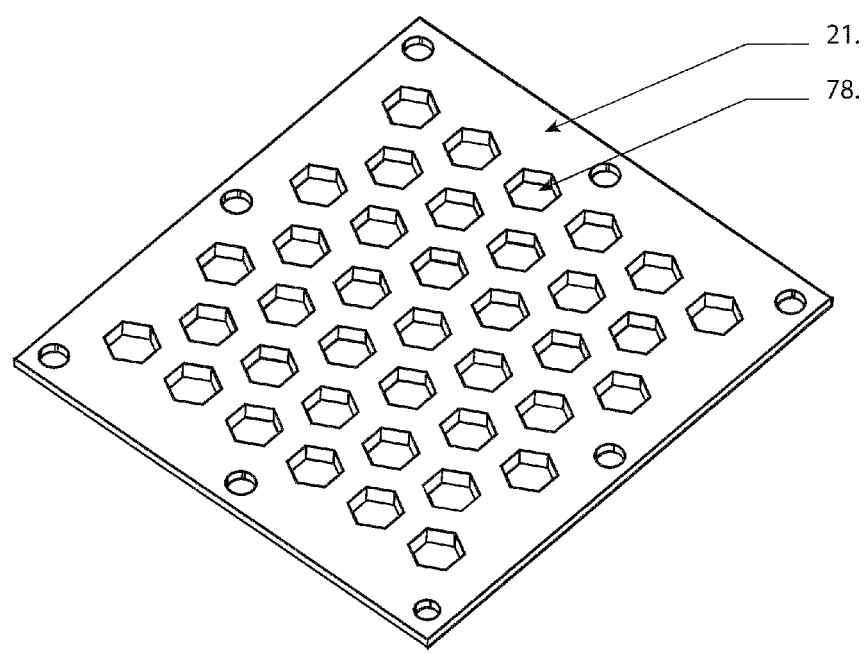
Figure 11D:
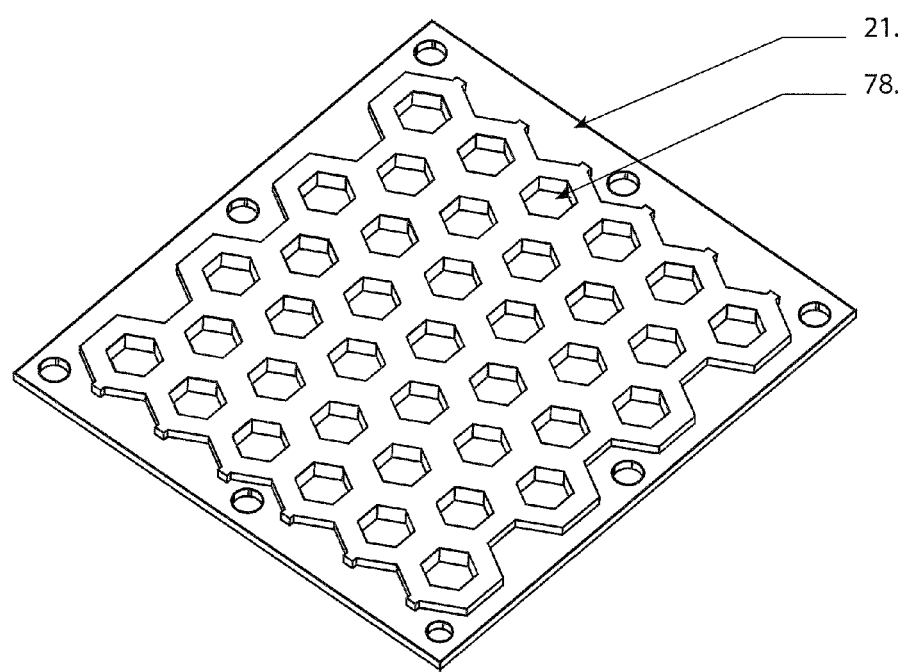
Figure 12A:
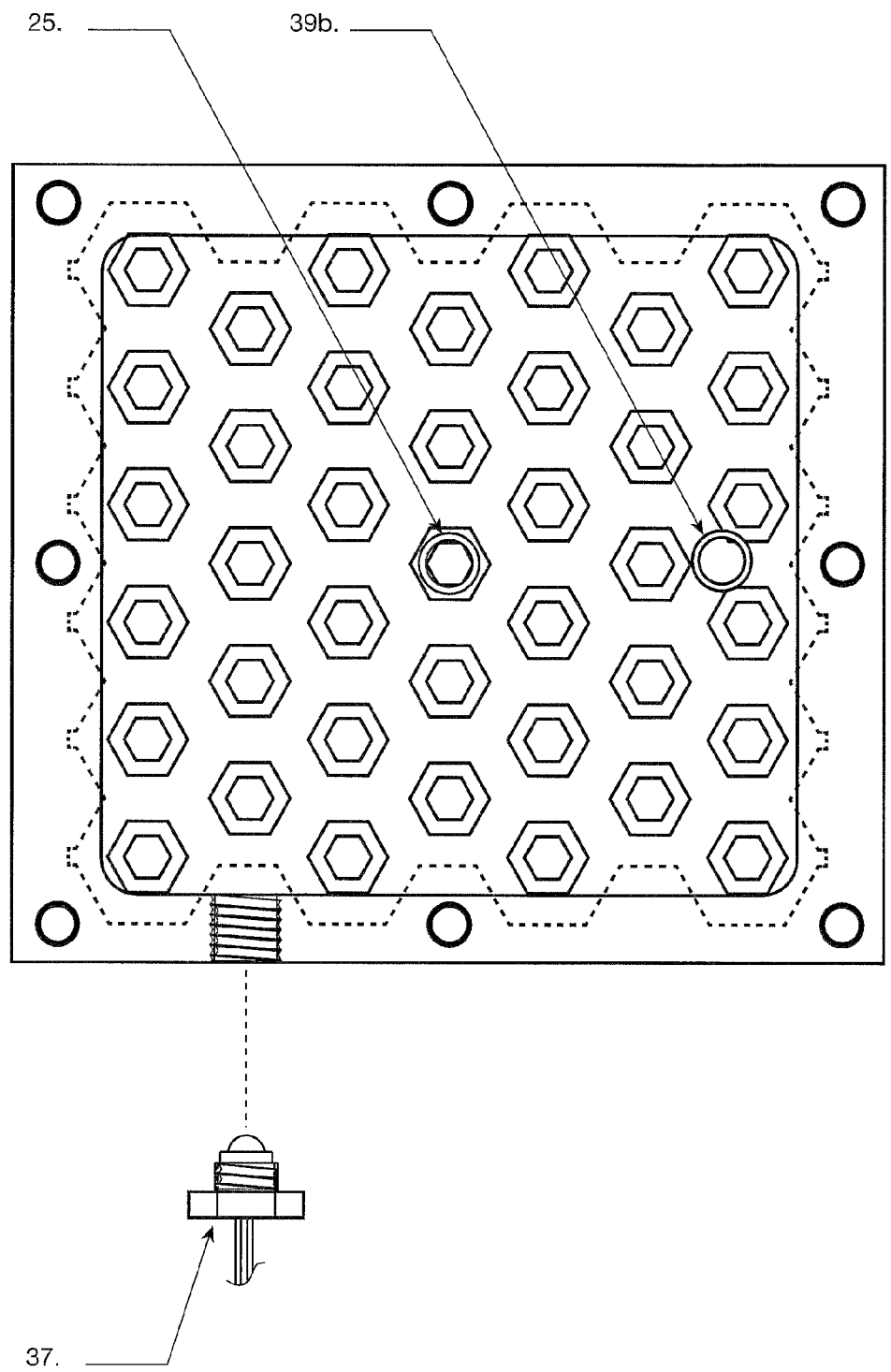
FIGS. 12A, 12B and 12C are respectively a top plan view, a side view and an exploded isometric view of the Hydrogen Trap assembly forming part of the hydrogen and oxygen supply system of the present invention.
Figure 12B:
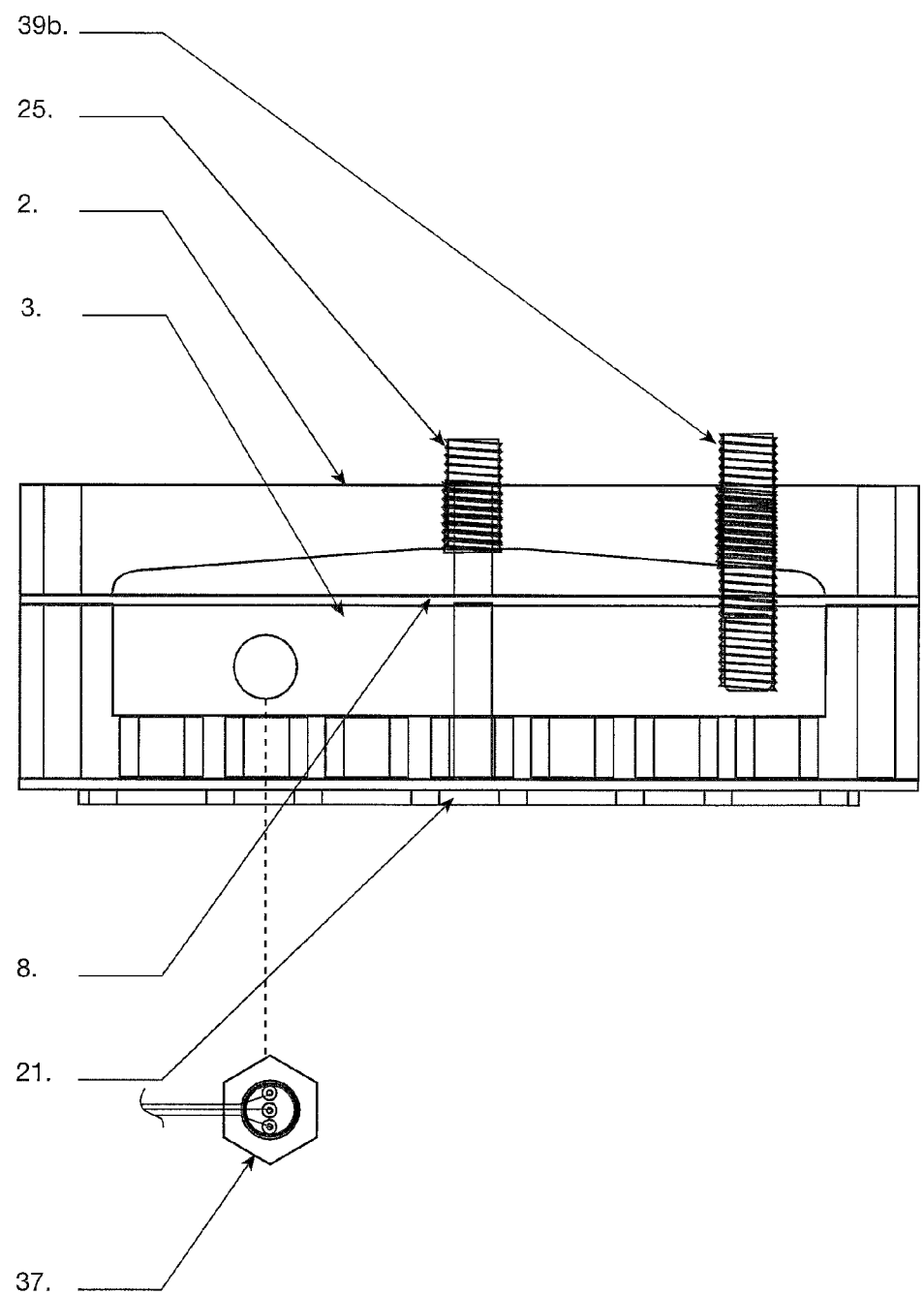
Figure 12C:
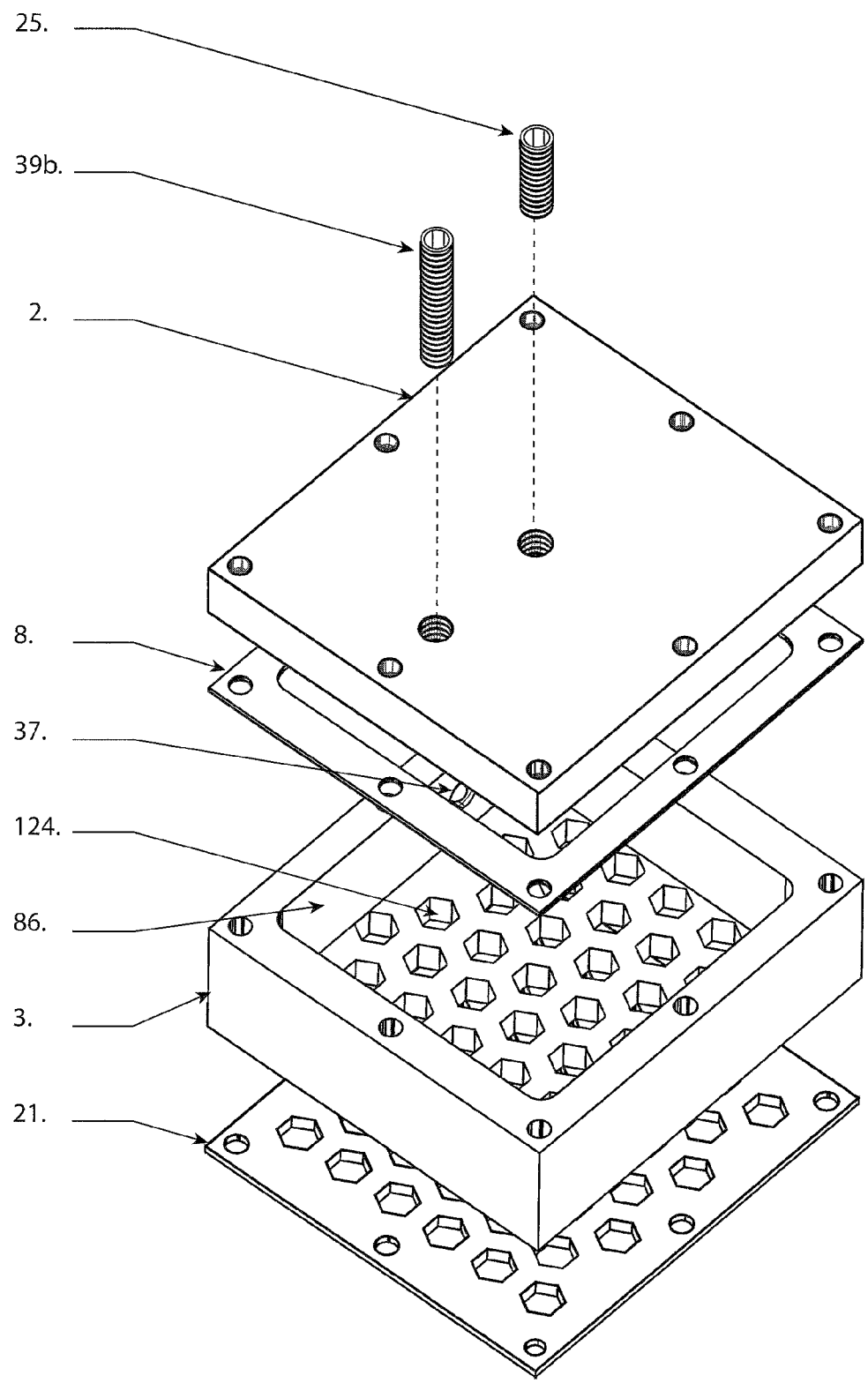
Figure 13A:
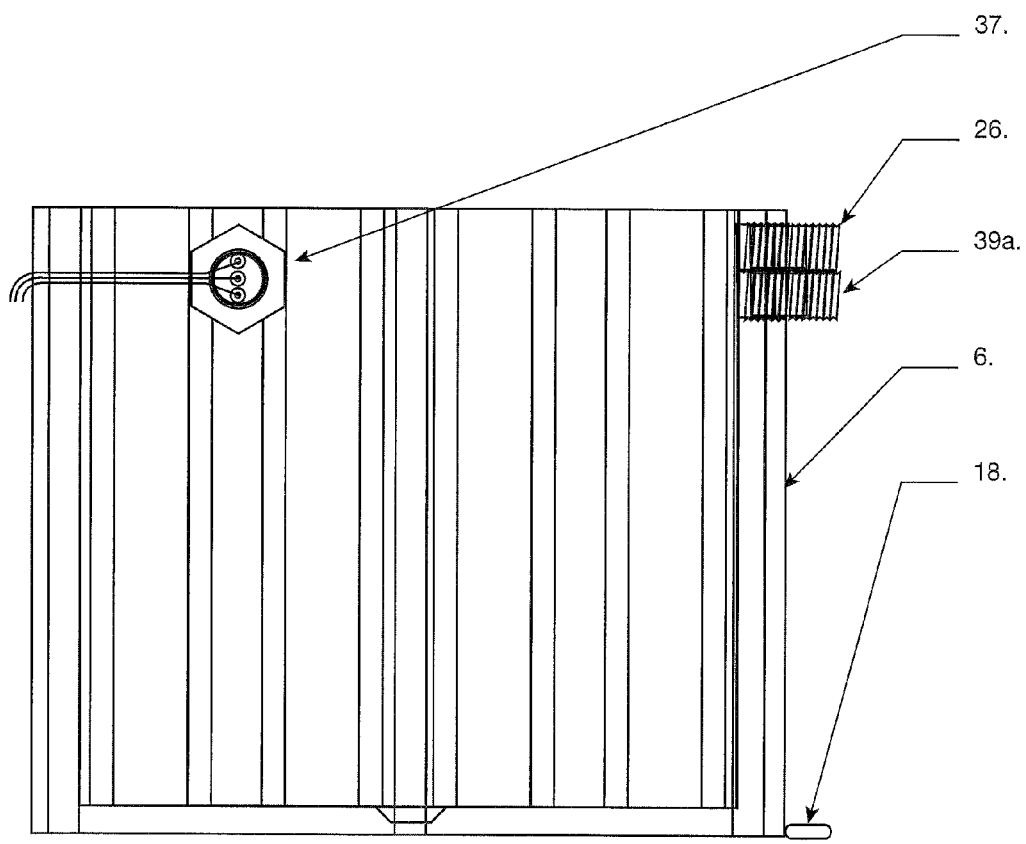
FIGS. 13A, 13B and 13C are respectively a side view, a top plan view and an isometric view of the Redox Chamber Detail with Fluid Vent, Oxygen Escape Vent, the two electrical leads, and the Optical Water Level Switch forming part of the hydrogen and oxygen supply system of the present invention.
Figure 13B:
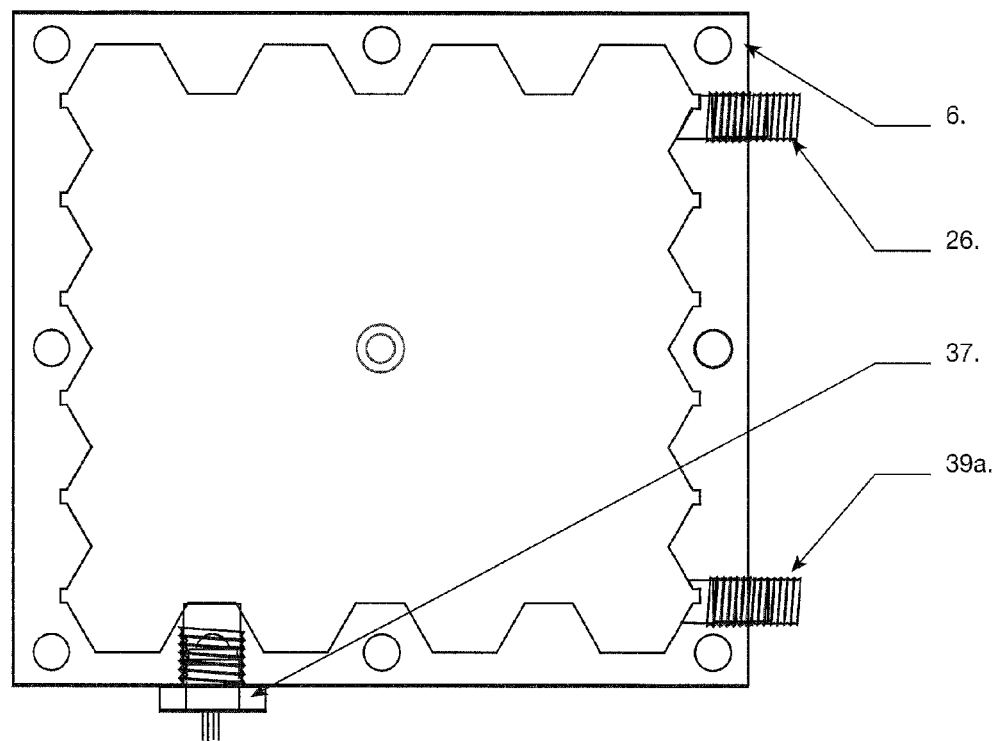
Figure 13C:
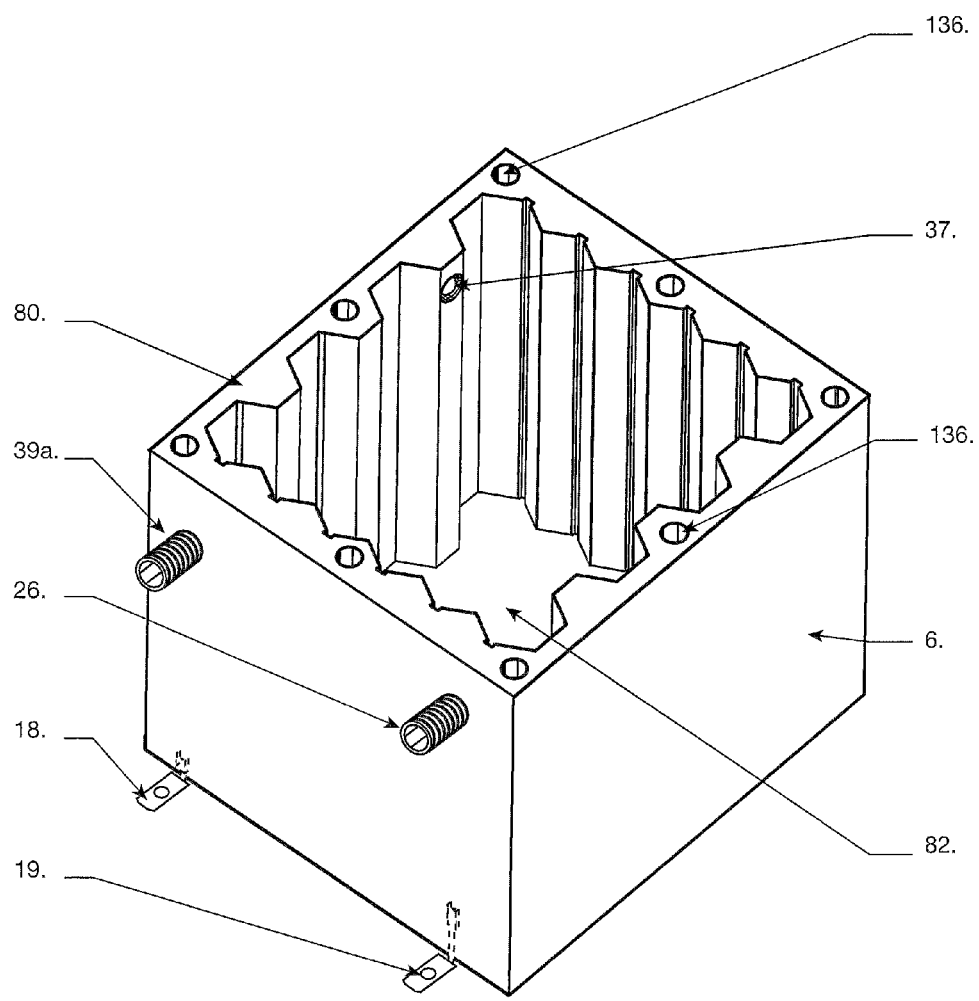
Figure 14A:
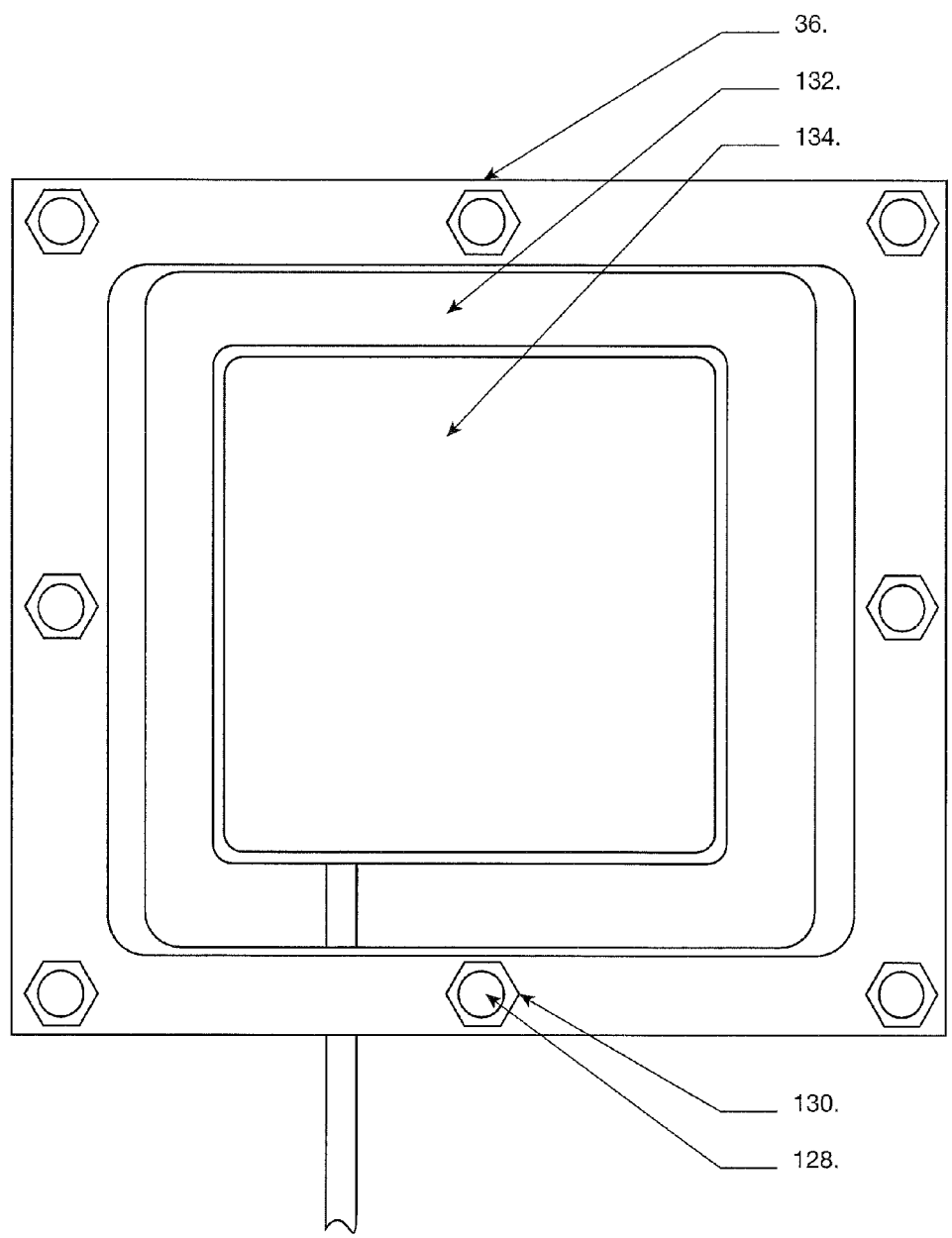
FIGS. 14A, 14B and 14C are respectively a bottom plan view, an exploded side view and an exploded isometric view of the Footer and Footer Gasket forming part of the hydrogen and oxygen supply system of the present invention.
Figure 14B:
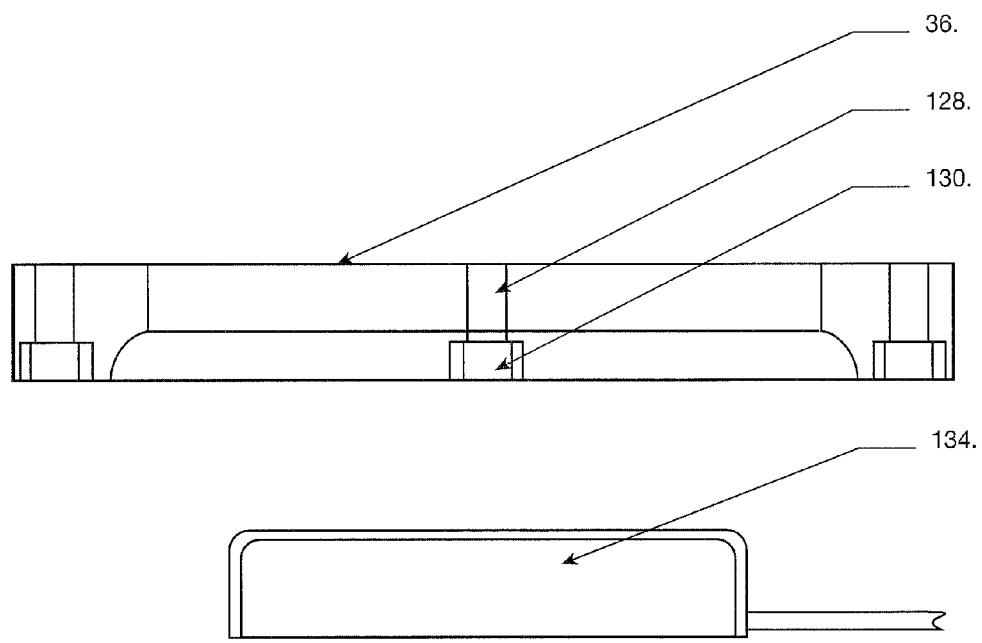
Figure 14C:
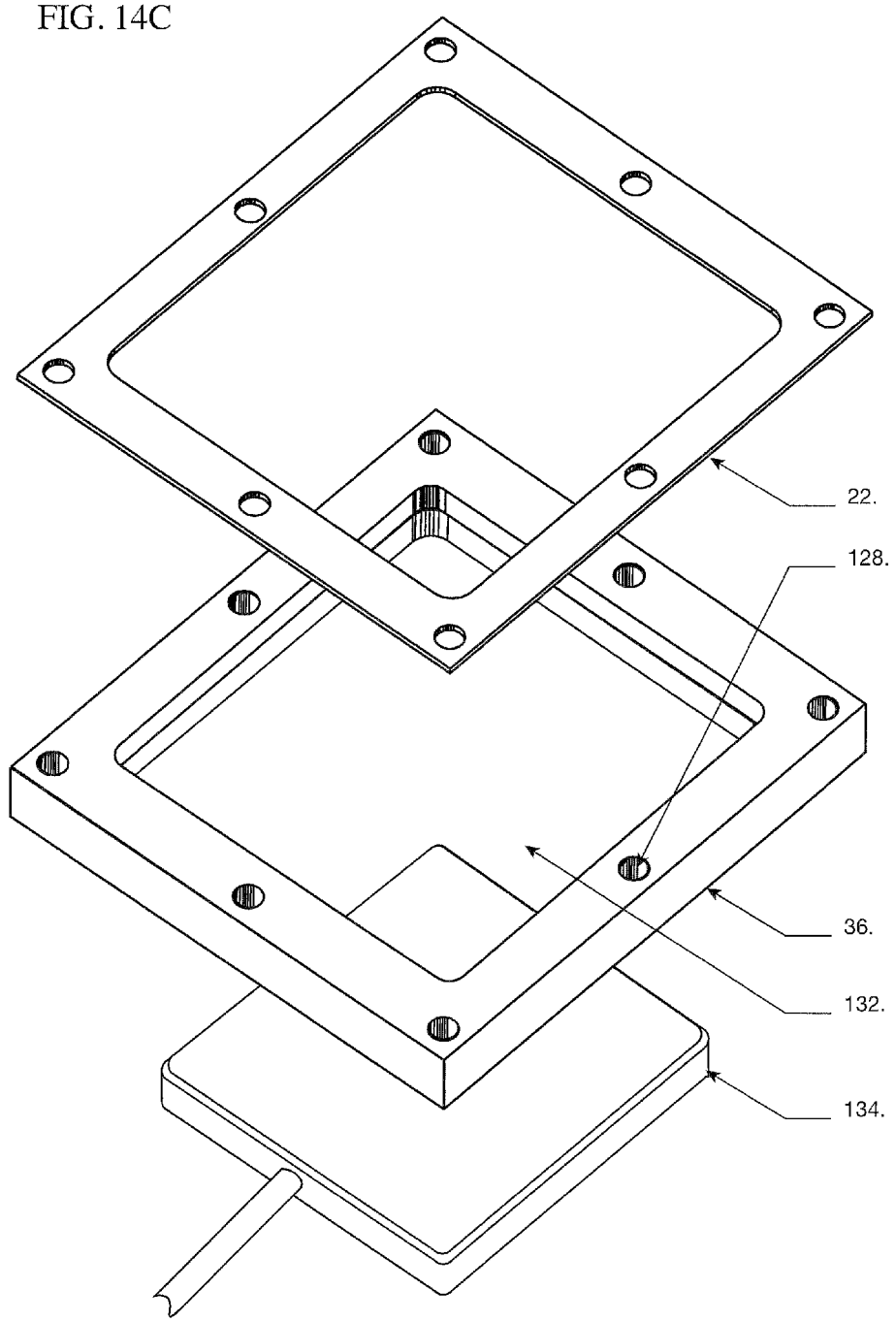
Figure 15:
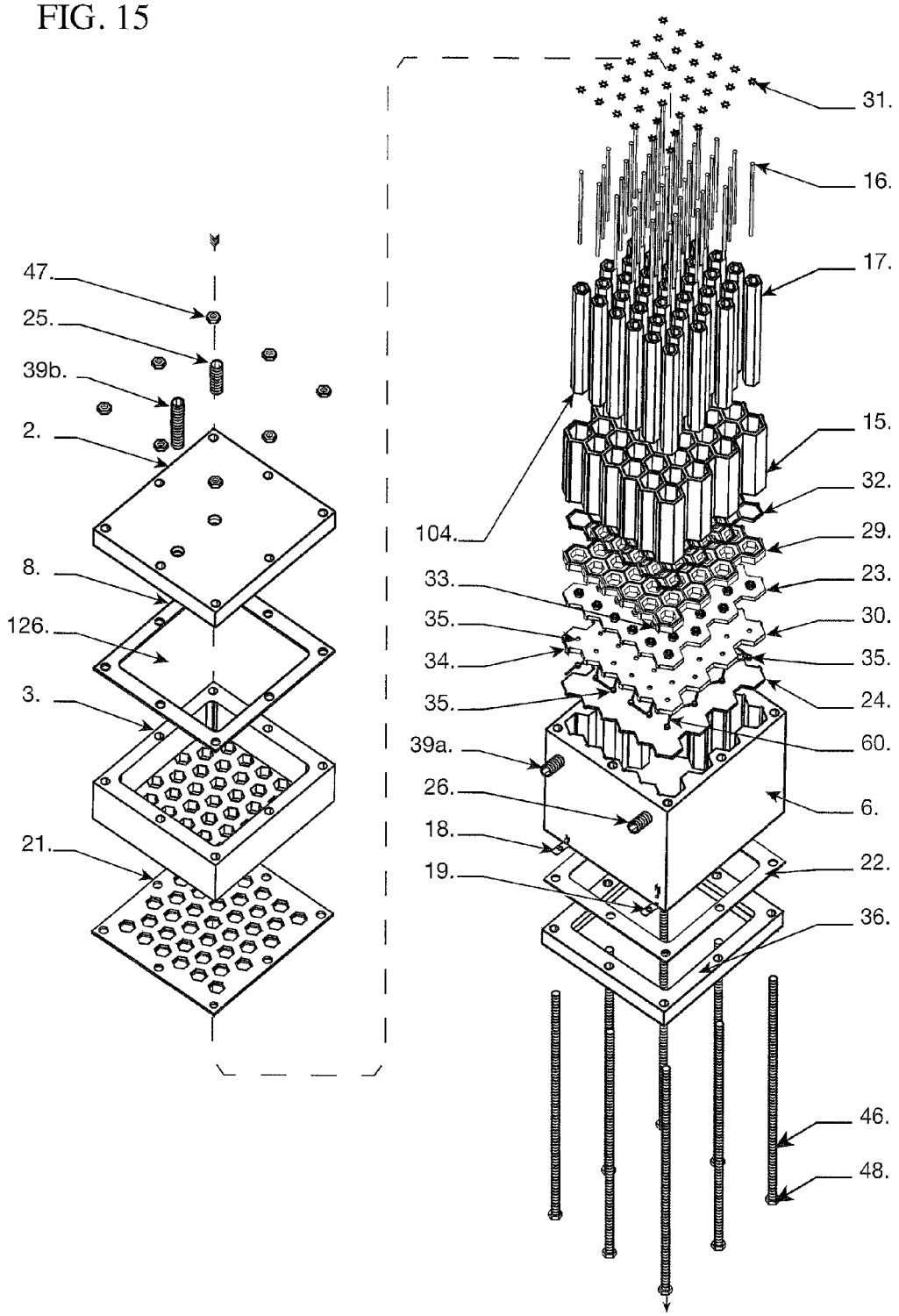
FIG. 15 is an exploded view of the hydrogen and oxygen supply system of the present invention.
Figure 16A:
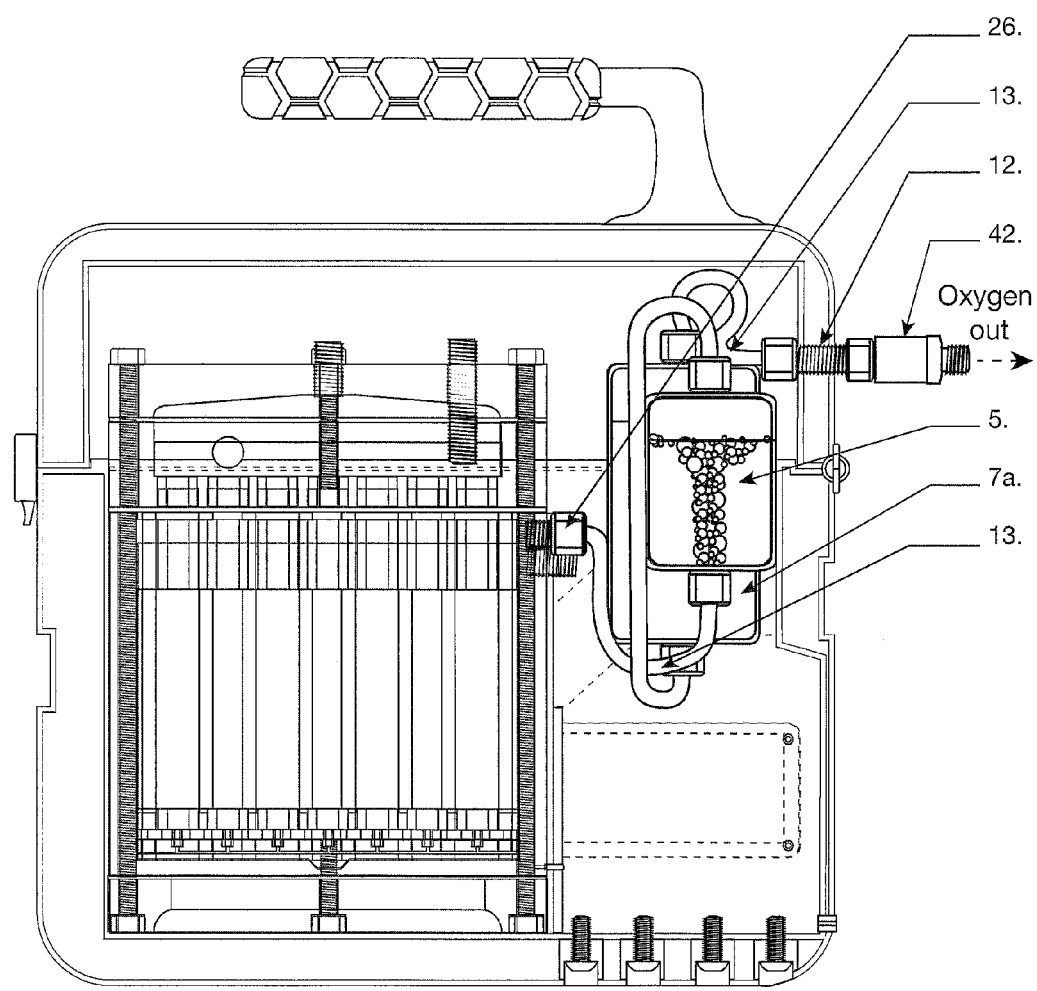
FIGS. 16A and 16B are respectively a longitudinal (side cut) cross-sectional view and a transverse (top cut) cross-sectional view showing the components of the Oxygen Escape Line forming part of the hydrogen and oxygen supply system of the present invention.
Figure 16B:
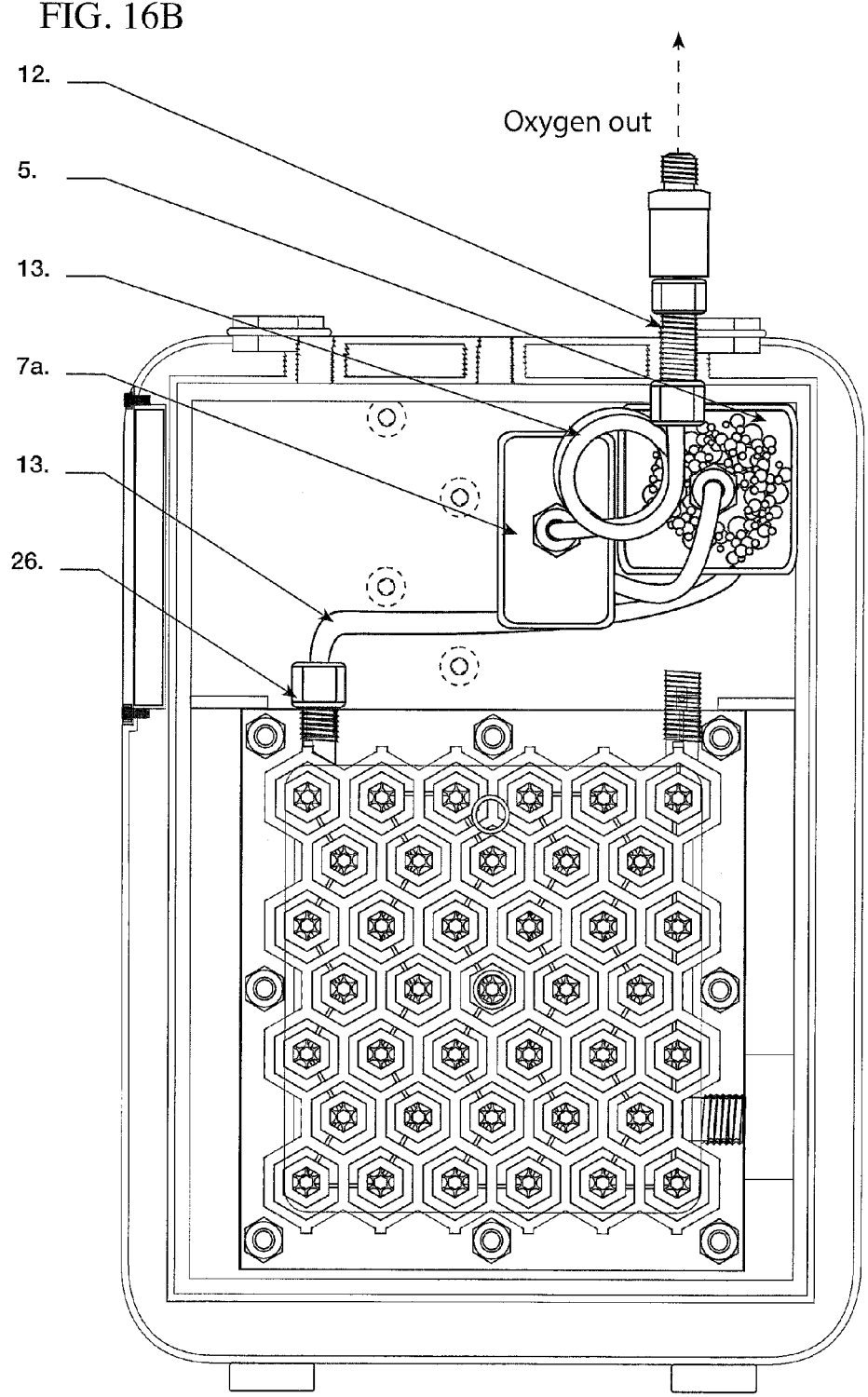
Figure 17A:
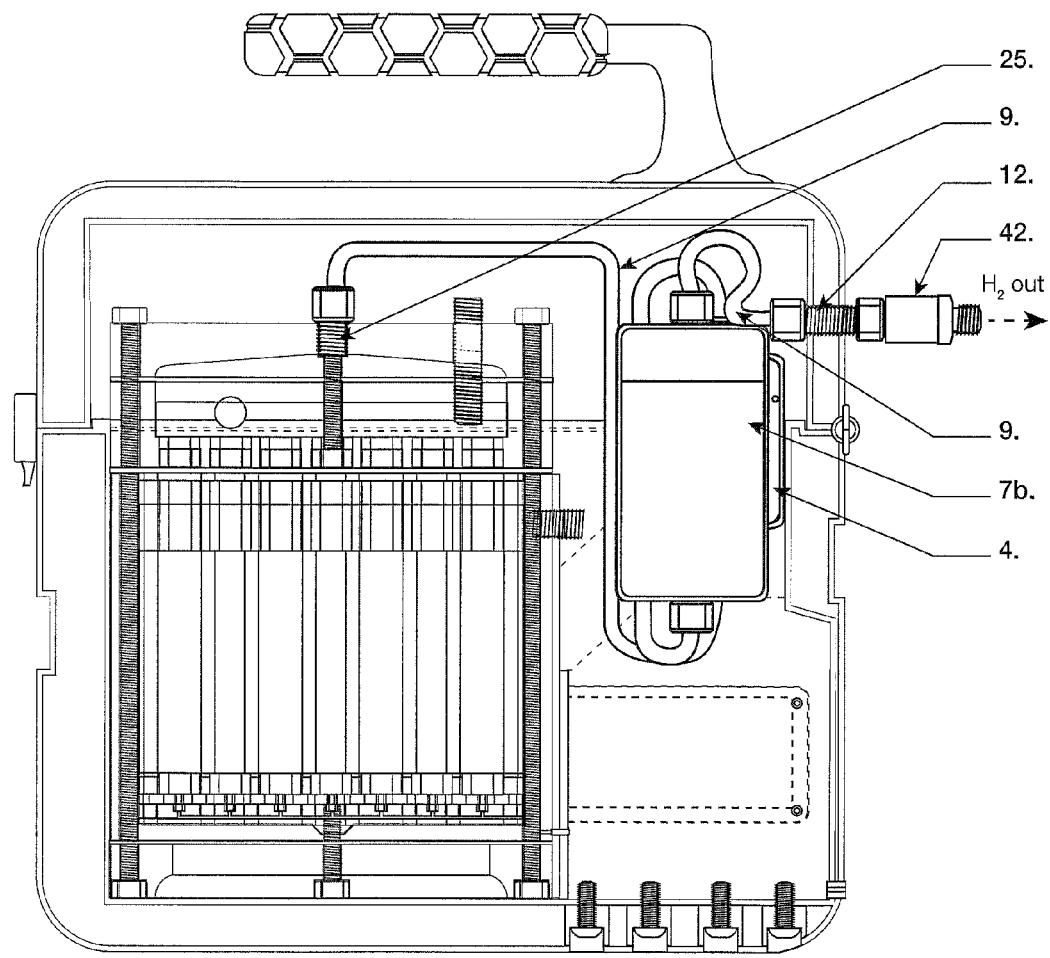
FIGS. 17A and 17B are respectively a longitudinal (side cut) cross-sectional view and a transverse (top cut) cross-sectional view showing the components of the Hydrogen Escape Line forming part of the hydrogen and oxygen supply system of the present invention.
Figure 17B:
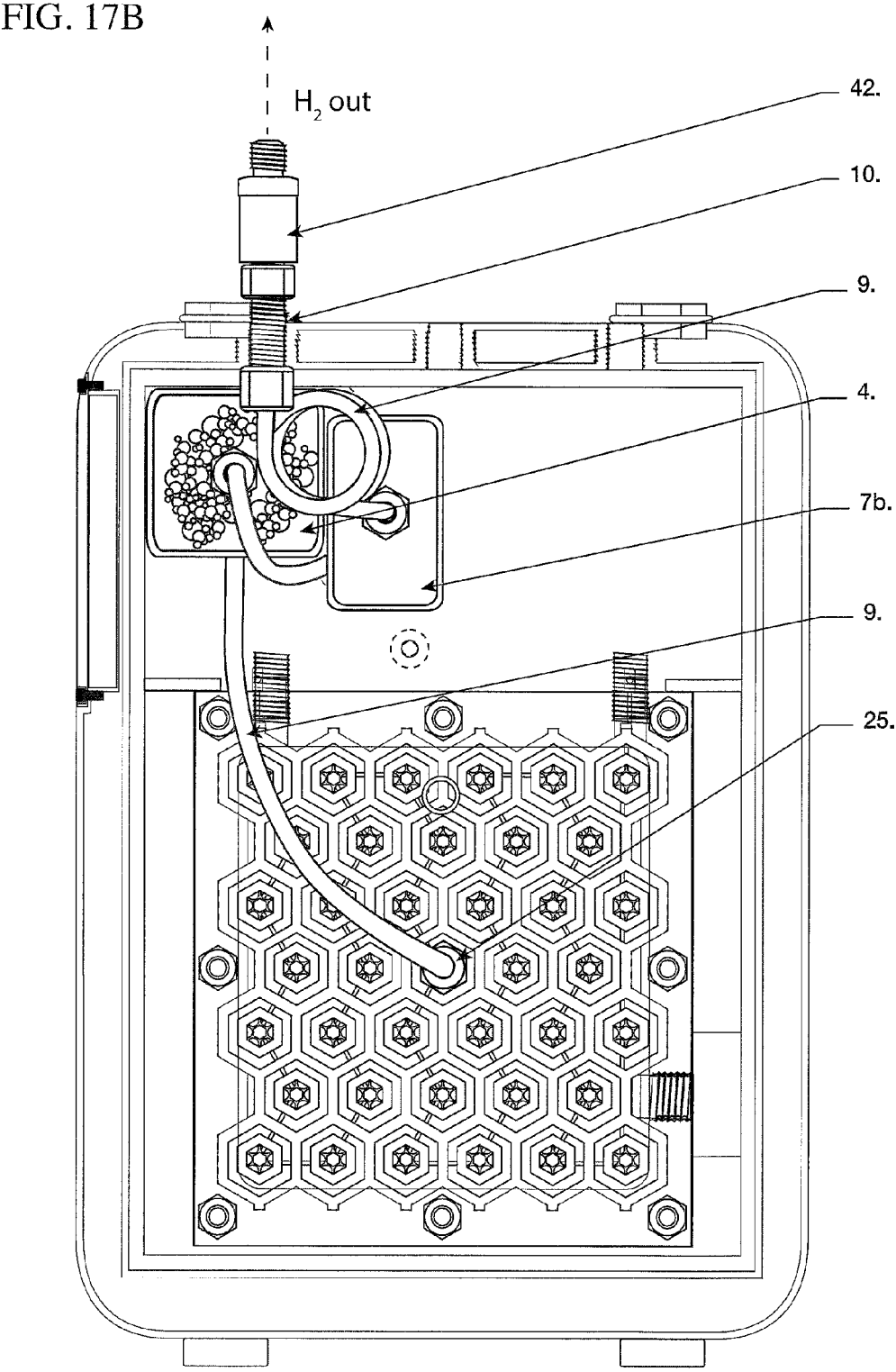
Figure 18A:
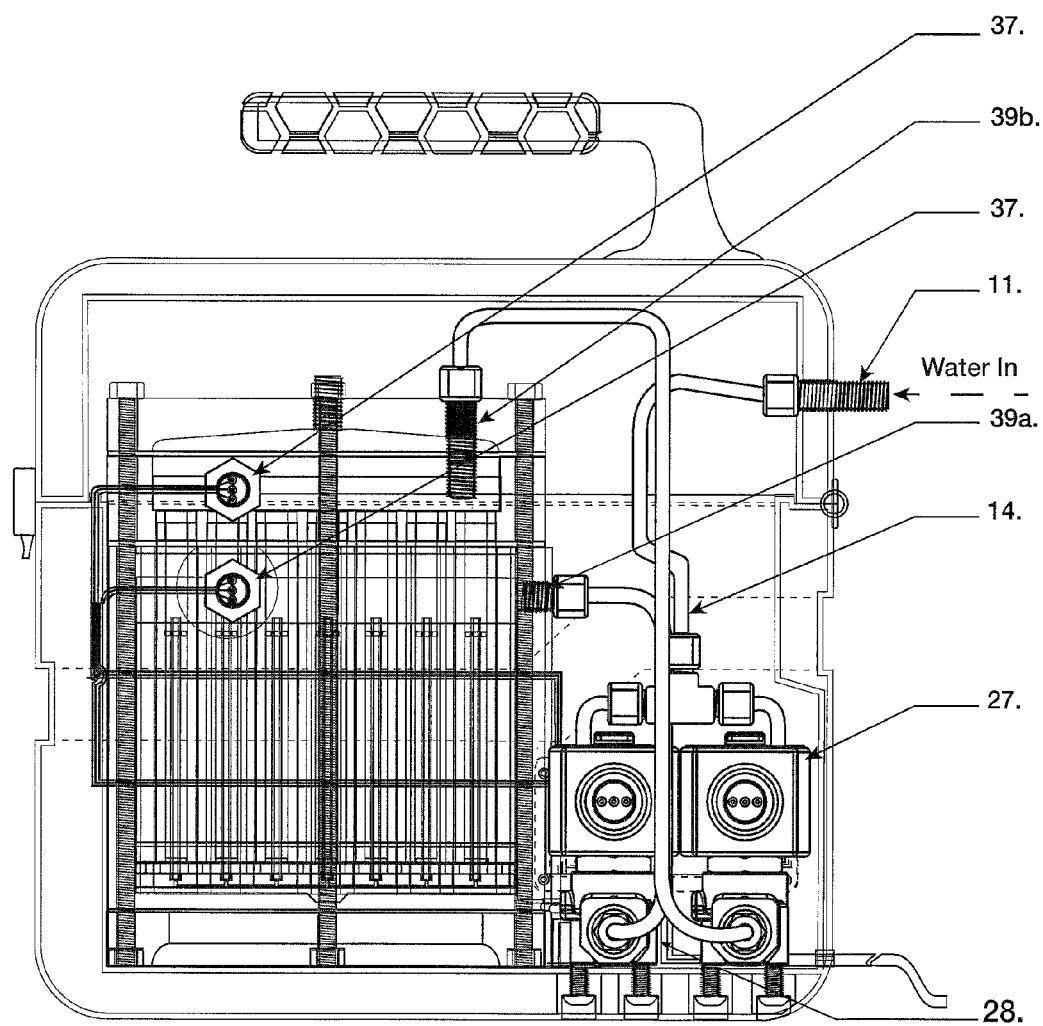
FIGS. 18A and 18B are respectively a longitudinal (side cut) cross-sectional view and a transverse (top cut) cross-sectional view showing the Water Level Control System components forming part of the hydrogen and oxygen supply system of the present invention.
Figure 18B:
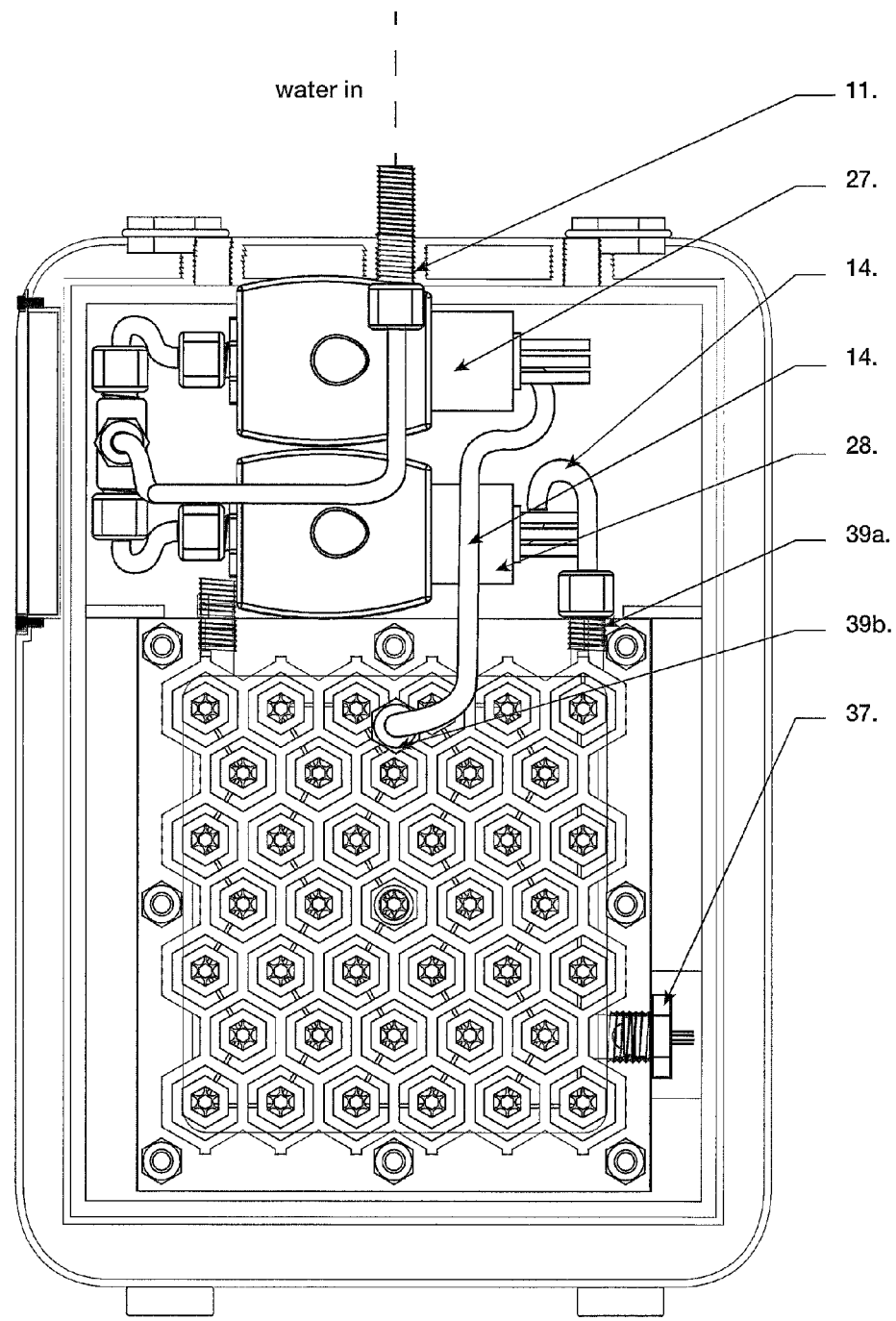
Figure 19A:
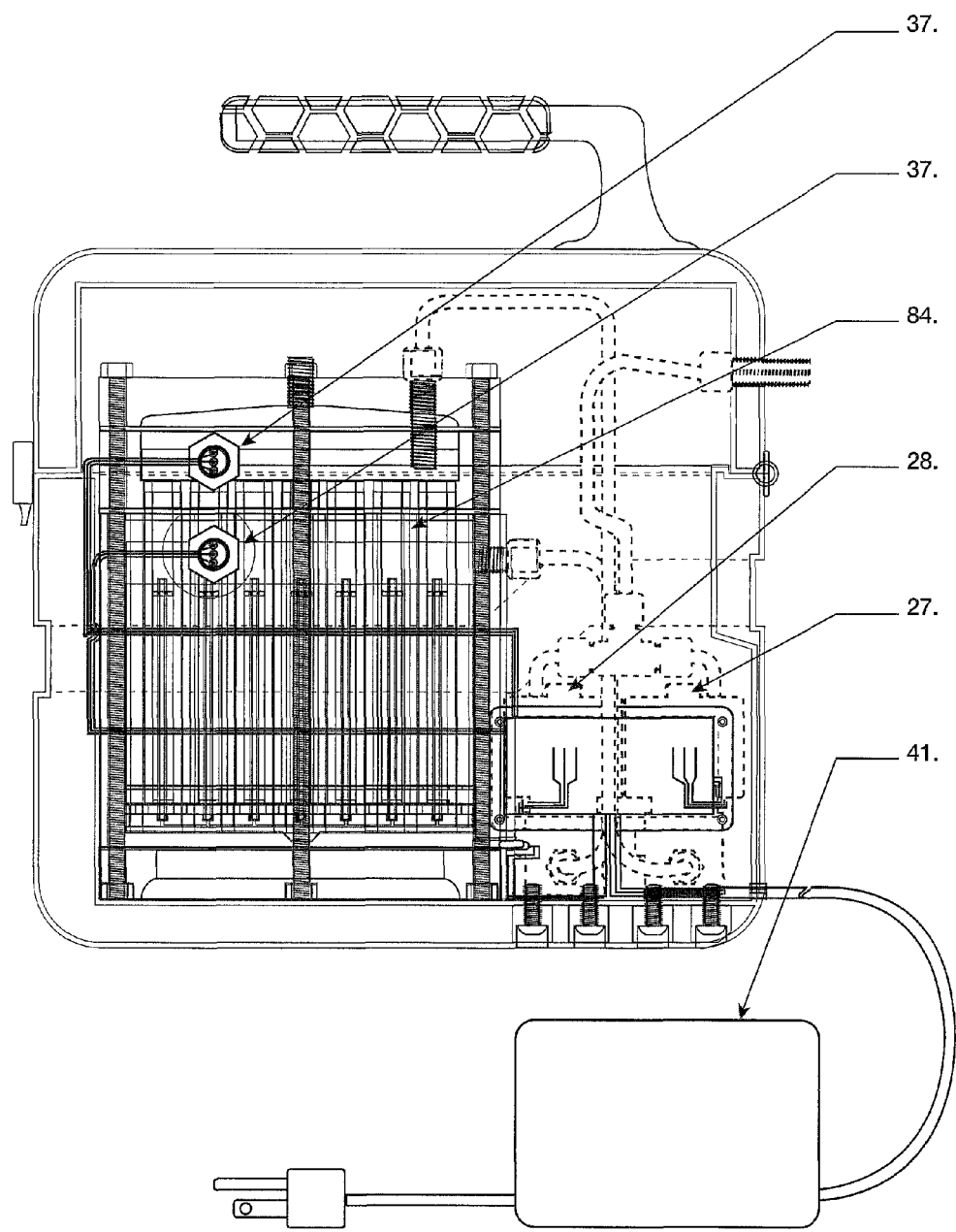
FIGS. 19A and 19B are respectively a longitudinal (side cut) cross-sectional view and a transverse (top cut) cross-sectional view showing the electrical systems forming part of the hydrogen and oxygen supply system of the present invention.
Figure 19B:
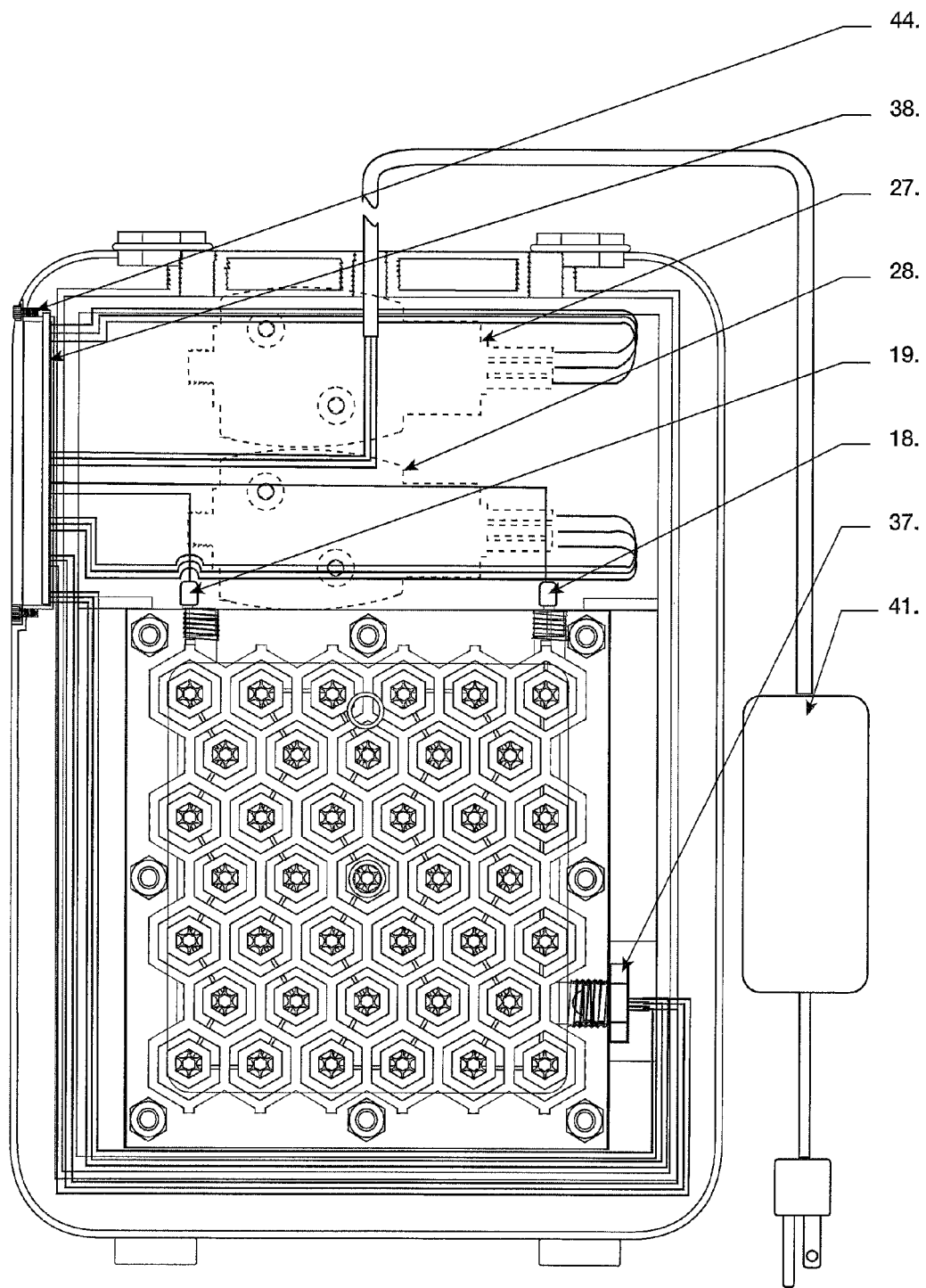
Figure 20:
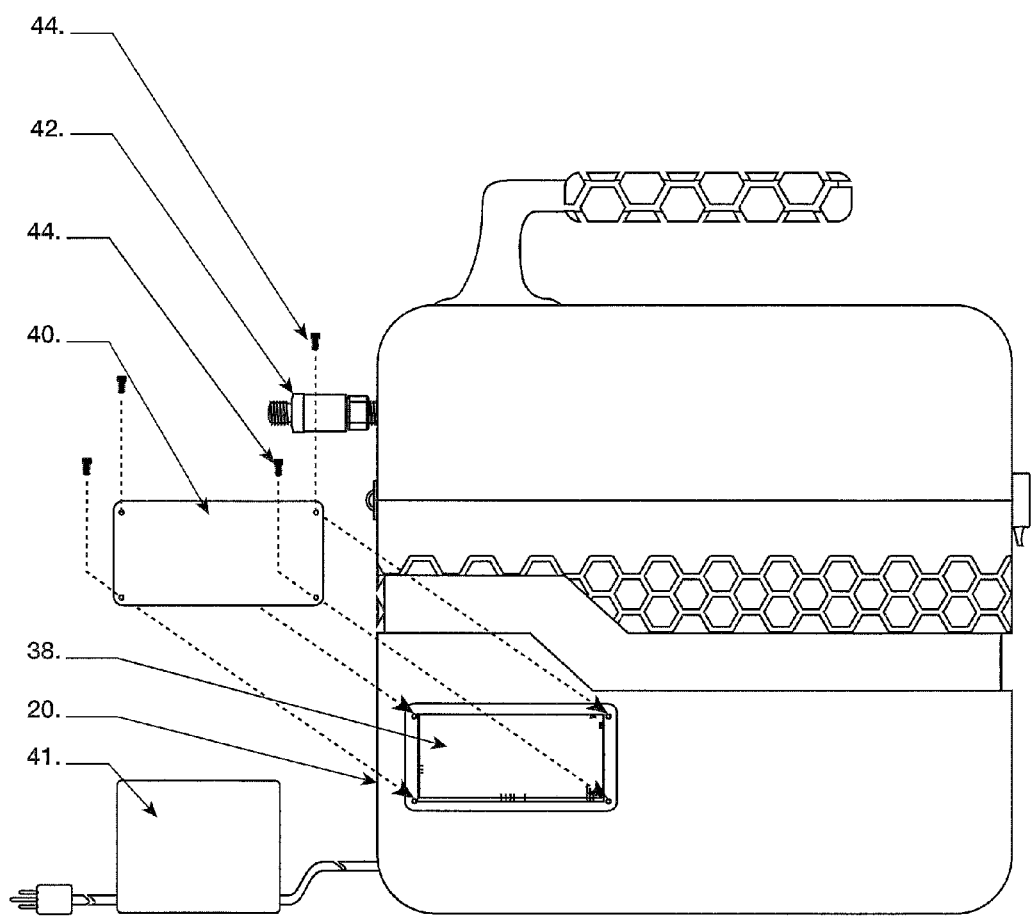
FIG. 20 is a partially exploded side view of the hydrogen and oxygen supply system of the present invention and illustrating the Water Level Control Board and the Water Control Lid and associated components forming part of the hydrogen and oxygen supply system of the present invention.
Figure 21A:
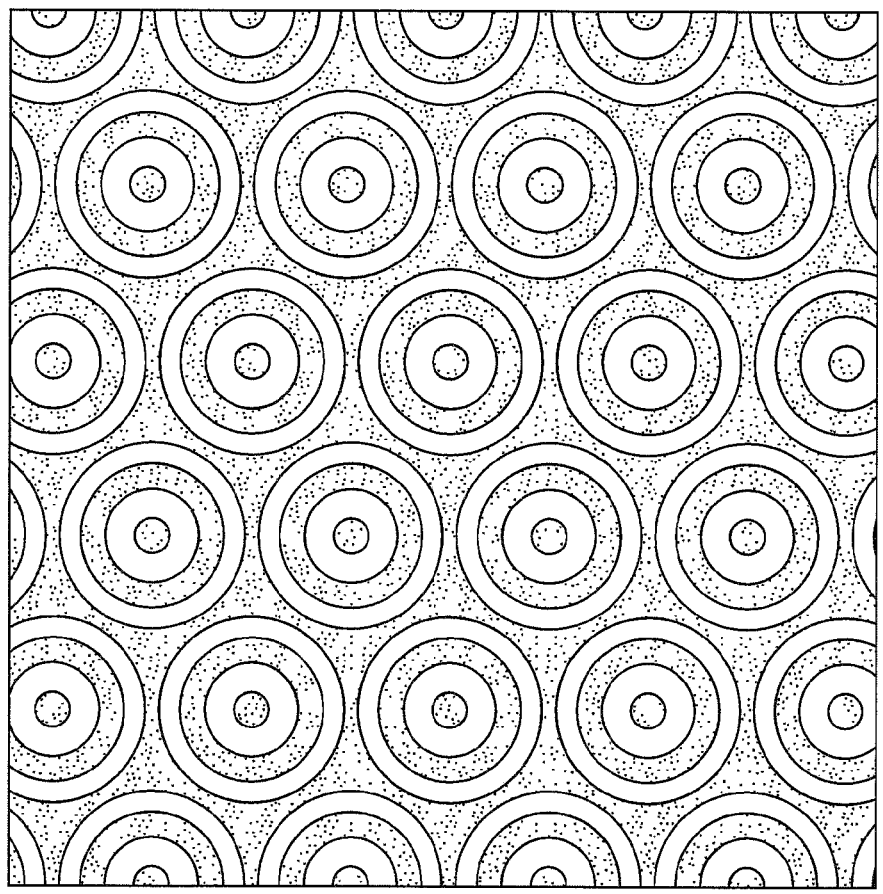
FIGS. 21A, 21B, 21C and 21D are top plan views of four different variations of electro-conductive assemblies the inventor herein has experimented with and considered using in the hydrogen and oxygen supply system of the present invention.
Figure 21B:
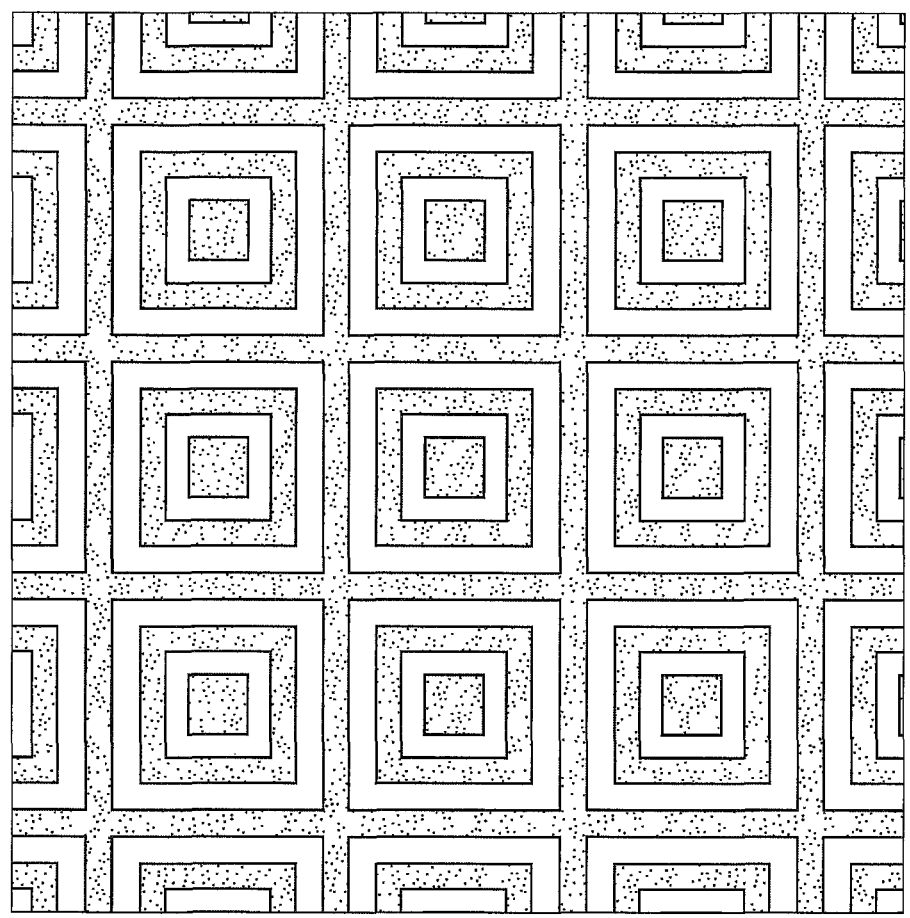
Figure 21C:
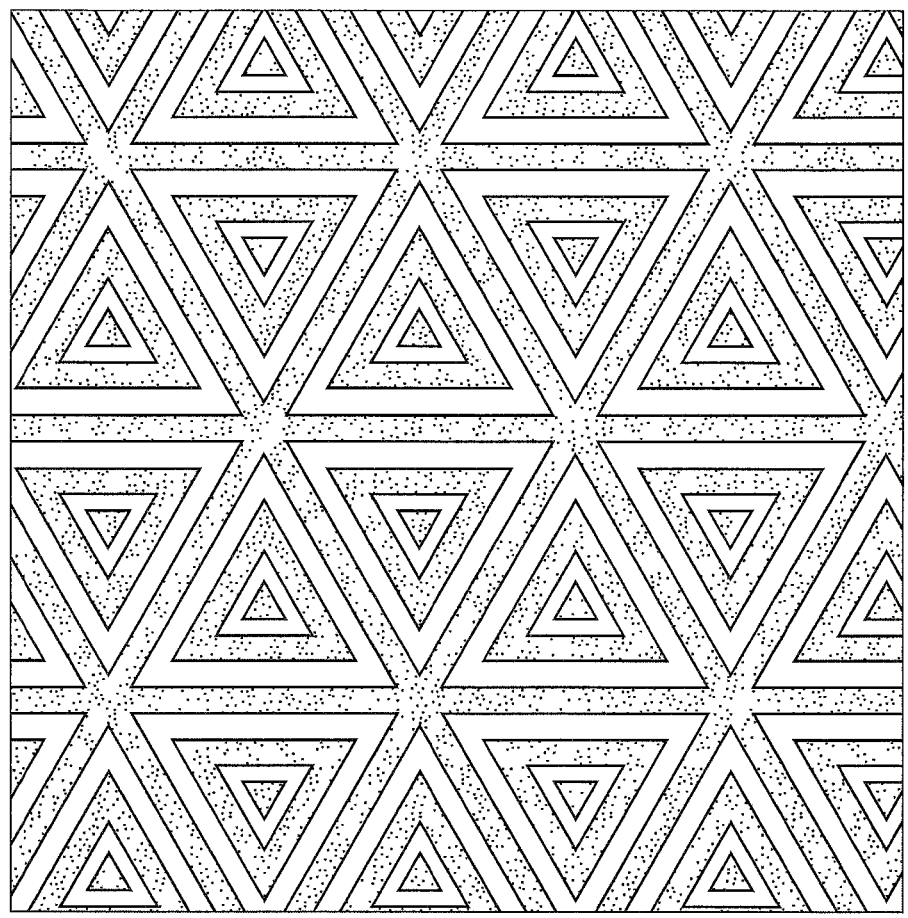
Figure 21D:
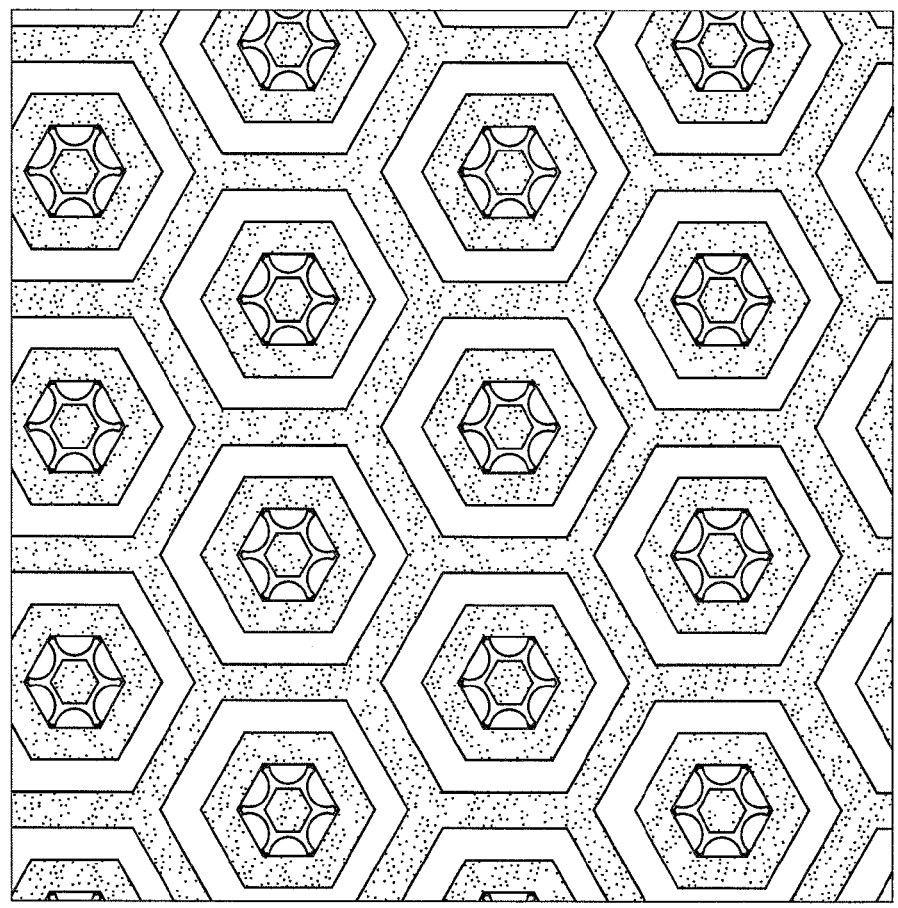
Figure 22A:
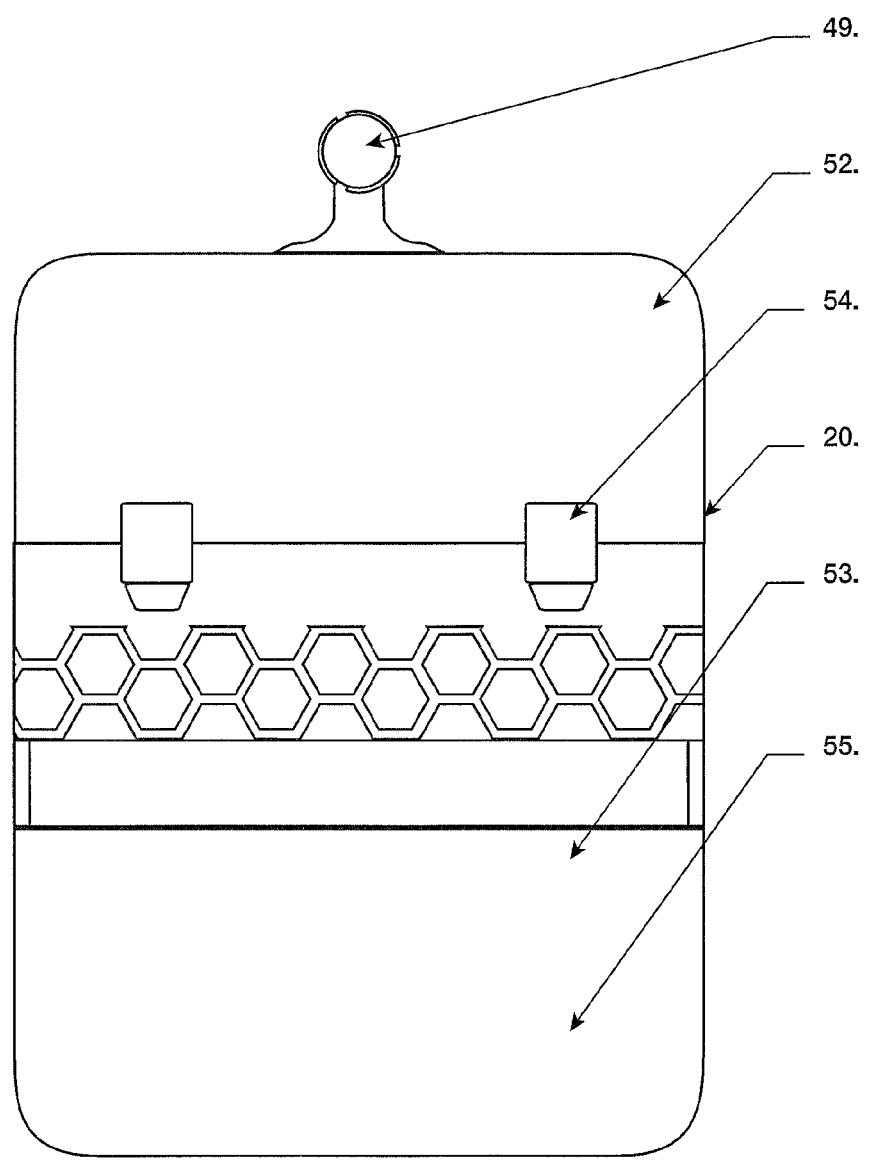
FIGS. 22A, 22B, 22C and 22D are respectively a front view, a side view, a top view and a rear view of the outside housing of a portable hydrogen and oxygen supply system formed in accordance with the present invention.
Figure 22B:
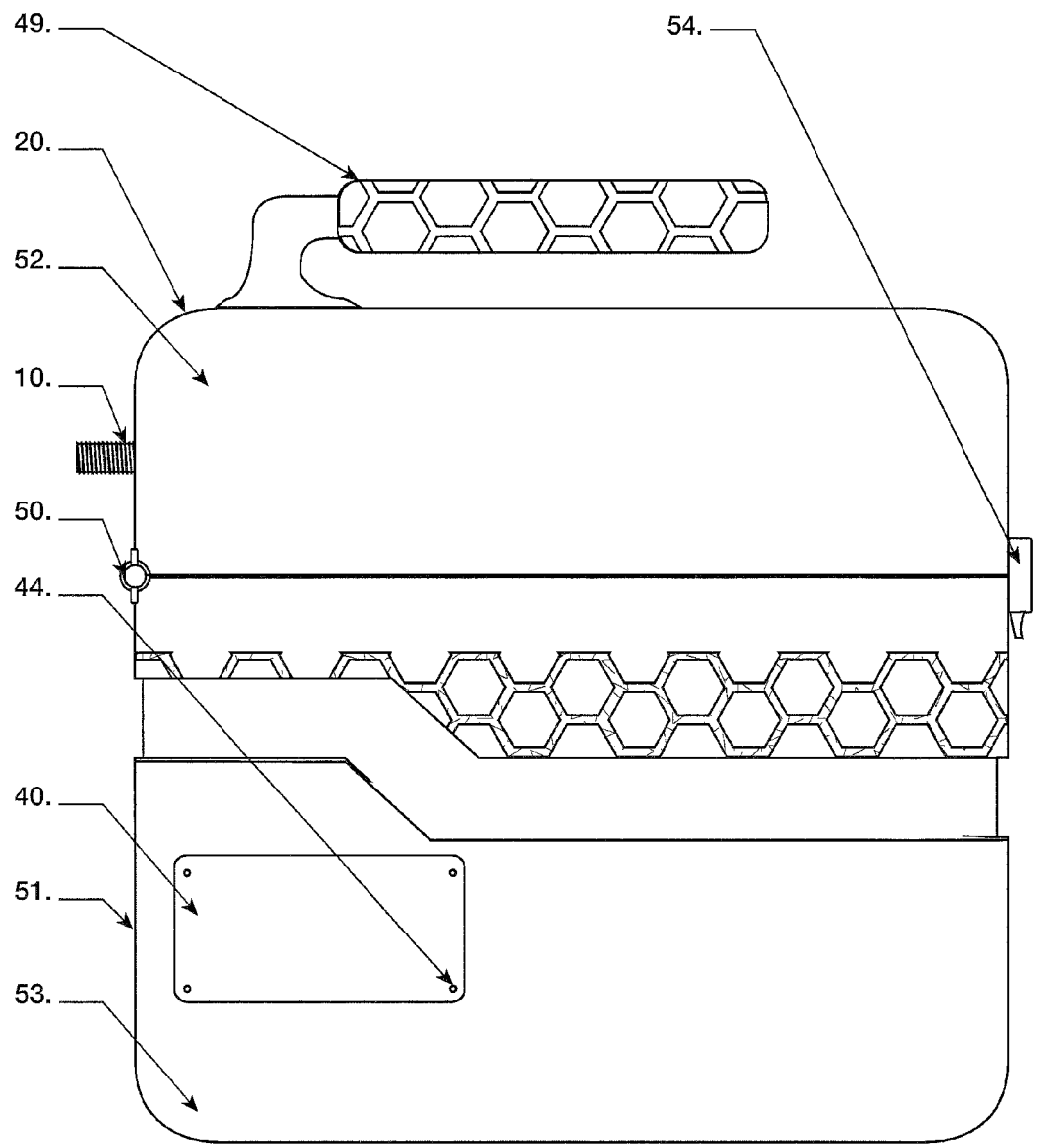
Figure 22C:
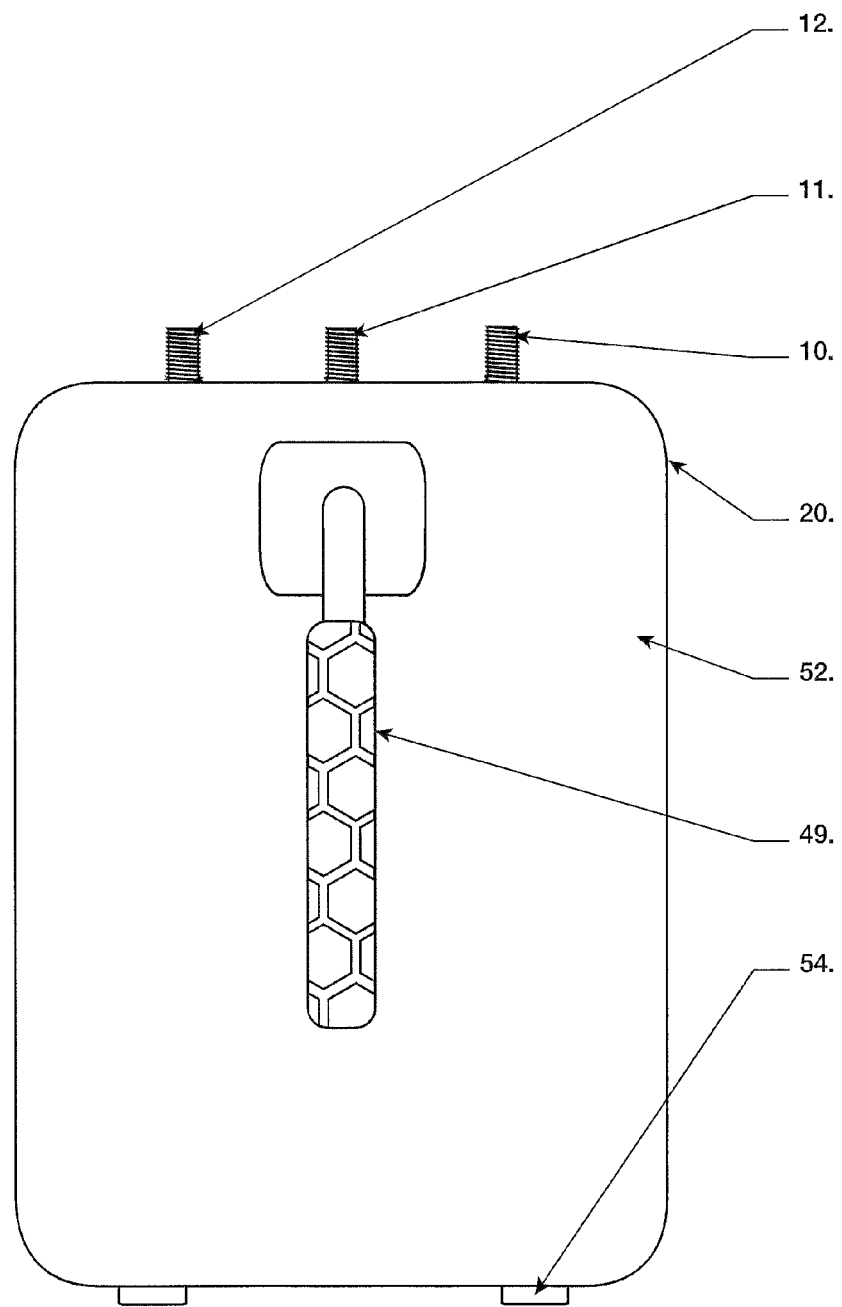
Figure 22D:
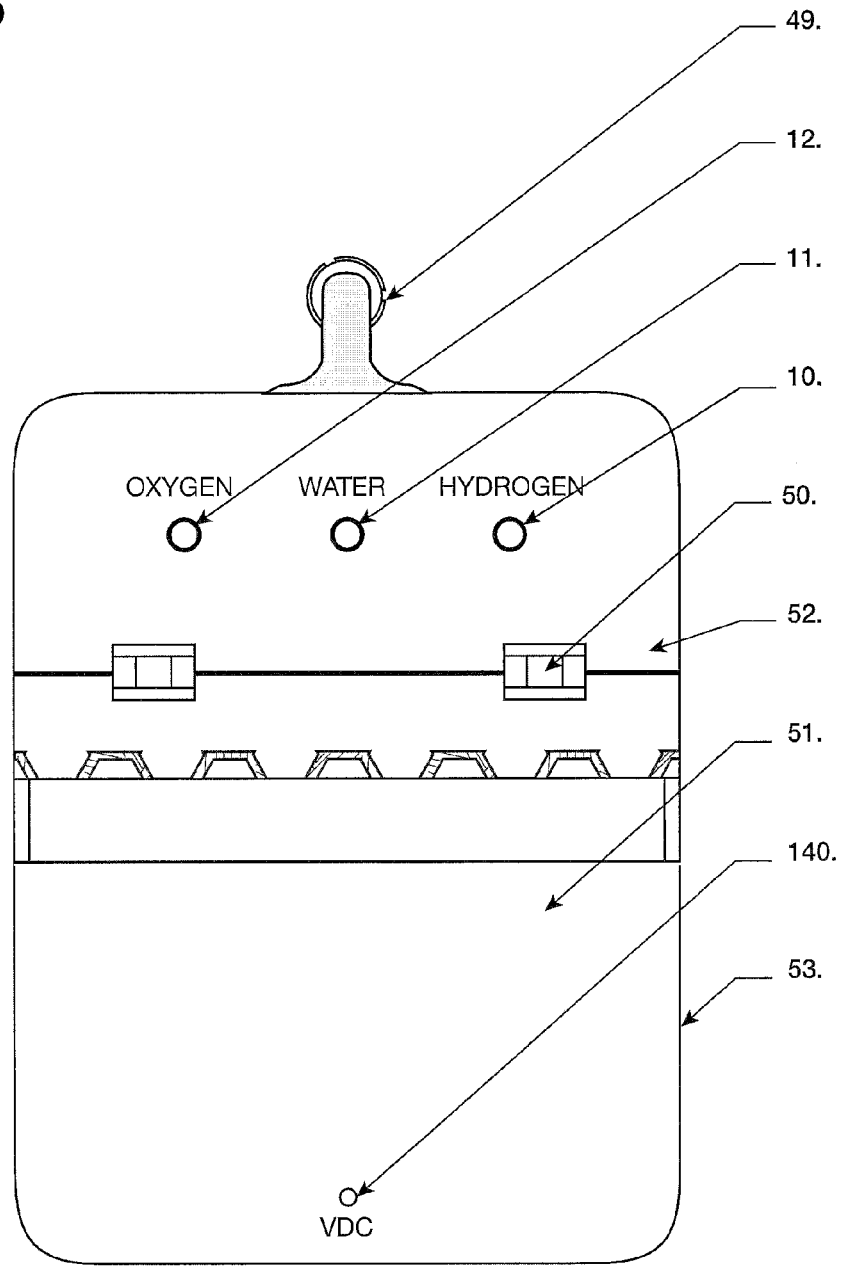

As shown in FIGS. 1-26 of the drawings, it will be seen that the portable hydrogen and oxygen supply system of the present invention preferably includes the following components: Reactor 1; Hydrogen Trap Lid 2; Hydrogen Trap 3; Hydrogen Bubbler 4; Oxygen Bubbler 5; Redox Chamber 6;

Desiccant Cartridges 7a, 7b; Head Gasket 8; Hydrogen Escape Line 9; Hydrogen Output 10; Water Input 11; Oxygen Output 12; Oxygen Escape Line 13; Water Feed 14; Cathode Matrix 15; Anodes 16; Hydrogen Collector Tube 17; Negative Electrical Fitting (−) 18; Positive Electrical Fitting (+) 19; Containment Vessel 20; Choke Gasket 21; Footer Gasket 22; Collector Gasket 23; Seat Gasket: Gasket 24; Hydrogen Escape Vent 25; Oxygen Escape Vent 26; Redox Chamber Explosion Proof Solenoid Switch 27; Hydrogen Trap Explosion Proof Solenoid Switch 28; Cathode Touch Plate 29; Anode Touch Plate 30; Anode Spacer 31; Cathode Electro-Conductive Matrix 32; Cathode Pick Up 33; Anode Pick Up 34; Anode Push Socket 35; Footer 36; Optical Water Level Sensor 37; Water Level Control Board 38; Fluid Vents 39a, 39b; Water Control Lid 40; Power Converter 41; Flashback Arrester 42; Solenoid Switch Fasteners 43; Control Lid Fasteners 44; Reactor Stall 45; Reactor Bolt 46 (eight); top Reactor Nut 47 (eight); and Reactor Bolt Head 48 (eight). Each of the above components will now be described in detail.

Reactor 1 is a series of chambers preferably made with insulating plastic (e.g., ABS, Nylon, etc.). The Reactor 1 is the assembly of the components of the Redox Chamber 6 and all of its internal components, the Hydrogen Trap 3 with its components and the Footer 36.

The Hydrogen Trap Lid 2 is preferably made with insulating plastic (e.g., ABS, Nylon, etc.). This device is designed to hold the hydrogen gas in the top trap (i.e., chamber 86) and allow the gas to channel out through the Hydrogen Escape Vent 25.

The Hydrogen Trap 3 is preferably made with insulating plastic (e.g., ABS, Nylon, etc.). The Hydrogen Trap 3 sits above the Choke Gasket 21. The Hydrogen Trap 3 is filled with water (preferably filtered) leaving preferably about ½ inch of empty space above for the gasses to collect. The Hydrogen Trap 3 is designed with a plurality of spaced apart holes 124 to fit snugly around the Hydrogen Collector Tubes 17 and allow hydrogen to flow up through the water, free of electrical arcs or discharges.

The Hydrogen Bubbler 4 is a chambered component placed along the Hydrogen Escape Line 9, before the Desiccant Cartridge 7b and after the Hydrogen Escape Vent 25. Hydrogen passes through the Hydrogen Escape Line 9 into the bottom of the Hydrogen Bubbler 4, which is preferably filled ⅔rds with water. The hydrogen passes through the water and into the vents at the top of Hydrogen Bubbler 4 and into the next section of the Hydrogen Escape Line 9.

The Oxygen Bubbler 5 is a chambered component placed along the Oxygen Escape Line 13, before the Desiccant Cartridge 7a and after the Oxygen Escape Vent 26. Oxygen passes through the Oxygen Escape Line 13 into the bottom of the Oxygen Bubbler 5, which is preferably filled ⅔rds with water. The oxygen passes through the water and into the vents at the top of Oxygen Bubbler 5 and into the next section of the Oxygen Escape Line 13.

The Redox Chamber 6 is preferably made with insulating plastic. The outside 80 can be a simple box or rectangle, cylinder or any geometric shape that will fit securely inside the Containment Vessel 20. The outer wall 80 of the Redox Chamber 6 has holes (either machined or part of the vacuum molding) that fit the fastening bolts 46 and line up with the other components' holes for their fastening bolts 46. The inside of the Redox Chamber 6 defines a hollow area 82 that is designed for the assembly of the Cathode Matrix 15, the Cathode Touch Plate 29, the Anode Touch Plate 30, the Seat Gasket 24 and the Collector Gasket 23, to fit into snugly. The Redox Chamber 6 also houses the Anodes 16, the Hydrogen Collector Tubes 17, the Anode Touch Plate 30, the Cathode Touch Plate 32, the Choke Gasket 21, the Anode Spacers 31, the Redox Chamber Explosion Proof Solenoid Switch 27 and the Oxygen Escape Vent 26. The Redox Chamber 6 is filled with water, preferably leaving 0.5 inch of empty space on the top of the inside space 82 to provide a chamber 84 for collecting oxygen. The Redox Chamber 6 is then provided with DC voltage that leads in through the electrical feeds 18, 19, into the Anode Touch Plate 30 and the Cathode Touch Plate 29, then into the preferably thirty-nine Anodes 16 and the Cathode Matrix 15 to cause water disassociation and simultaneous gas separation.

The Desiccant Cartridges 7a, 7b are preferably two individual identical but separate containers or chambers with fittings on the top and bottom. Preferably made with ABS plastic, the Desiccant Cartridges 7a, 7b hold desiccant, which dries the gasses by binding water vapor. The gasses enter on the bottom of their respective chambers and rise to the top through the desiccant. The chamber of each Desiccant Cartridge 7a, 7b will also have a carbon filter on the top for the gasses to pass through. The filter will catch tertiary gasses (Chlorine, Argon, Bromine, etc.). The gasses then exit through the top of their respective chambers, and out to their individual lines.

The Head Gasket 8 is a fluoroelastomer seal between the Hydrogen Trap 3 and the Hydrogen Trap Lid 2. The Head Gasket 8 has eight holes for receiving the fastening bolts 46 and a large opening 126 on the inside that mirrors the inner dimensions of the Hydrogen Trap 3.

The Hydrogen Escape Line 9 is a series of standard and/or high pressure, nonconductive air hoses that connects the Hydrogen Escape Vent 25 to the Hydrogen Bubbler 4, then to the Desiccant Cartridge 7b and finally to the Hydrogen Output 10.

The Hydrogen Output 10 is a standard male air hose fitting, preferably constructed of Nylon or insulating plastic. The Hydrogen Output 10 extends through the Containment Vessel 20, and connects the end of the Hydrogen Escape Line 9 with external devices (e.g., Hydride Tanks, compressed hydrogen tanks, air hoses, etc.).

The Water Input 11 is a standard male hose fitting, preferably constructed of Nylon, brass or stainless steel. The Water Input 11 extends through the Containment Vessel 20, and is connected on the inside of the Containment Vessel 20 to the Water Feed 14.

The Oxygen Output 12 is a standard male air hose fitting, preferably constructed of Nylon or insulating plastic. The Oxygen Output 12 extends through the Containment Vessel 20, and connects the end of the Oxygen Escape Line 13 with external devices (e.g., oxygen compression tanks).

The Oxygen Escape Line 13 is a series of standard and/or high pressure, nonconductive air hoses that connects the Oxygen Escape Vent 26 to the Oxygen Bubbler 5, then to the Desiccant Cartridge 7a, and finally to the Oxygen Output 12.

The Water Feed 14 is a series of standard water hose or lines, with preferably ⅜ inch stainless steel fittings, connecting to the Water Input 11, that bring water to the two main chambers (the Redox Chamber 6 and the Hydrogen Trap 3). Liquid level sensors 37 regulate the water control.

The Cathode Matrix 15 is preferably made from a block of highly electro-conductive, Carbon Nanotube enriched, Polymer (e.g., Polyphenylene Sulfide, PEEK (polyether ether ketone), etc.) with an array of individual or interconnected cathode tubes 88 (which may be machine formed with the Cathode Matrix 15) having hexagonal axial bores 90 that house the Hydrogen Collector Tubes 17 and the Anodes 16, both of which are placed concentrically inside each bore 90 of the cathode tubes 88 of the Cathode Matrix 15. The Cathode Matrix 15 supplies the positive DC current and voltage.

The Cathode Matrix 15 described herein preferably resembles honeycombs with hexagonal bores 90. This shape was developed through research. The transverse cross-sectional shape of the bores 90 of the Cathode Matrix 15 can be other geometric types such as square or diamond, or even circular, but these shapes lead to inefficiencies, since it has been found that the hexagonal shape is the most efficient. Through research, it has also been found that the electrical current preferred 60 or 120 degree angles in the shape of the bores 90 of the Cathode Matrix 15 in an aqueous environment.

The Anodes 16 are highly electro-conductive, Carbon Nanotube enriched, Polymer. Each Anode 16 preferably is a hexagonally shaped rod placed inside the center of each Hydrogen Collector Tube 17. The Anodes 16 supply the negative DC current and voltage, drawing hydrogen into the Collector Tubes 17.

The Hydrogen Collector Tube 17 is a highly electro-conductive, Carbon Nanotube enriched, Polymer (optional Graphene film or coating) tube placed in the center of each axial bore 90 of the cathode tubes 88 of the Cathode Matrix 15, with the Anode 16 placed in the center of the Hydrogen Collector Tube 17. The Hydrogen Collector Tube 17 is taller than the cathode tubes 88 of the Cathode Matrix 15 and the Anodes 16. The Hydrogen Collector Tubes 17 reach up through the Choke Gasket 21 and into the Hydrogen Trap 3. The hydrogen is pulled into the inside of the Hydrogen Collector Tube 17, from the negative electrical charge supplied by the Anode 16, and passively floats to the top of the Hydrogen Collector Tube 17, into the Hydrogen Trap 3.

The Negative Electrical Fitting (−) 18 is the outlet for the negative charge to exit the device.

The Positive Electrical Fitting (+) 19 is the inlet for the positive charge to enter the device.

The Containment Vessel 20 can be made from a variety of static free plastics, Polyethylene, or ABS (acrylonitrile butadiene styrene). This is the final external component, which houses all of the other components. The preferred design of the Containment Vessel 20 has a carrying handle 49, making the device portable and easy to carry.

The preferred design of the portable hydrogen and oxygen supply system has five ports. The first two are the Negative Electrical Fitting 18 and the Positive Electrical Fitting 19. Next is the Water Input 11, then the Oxygen Output 12, and finally, the Hydrogen Output 10. The Containment Vessel 20 has two hinges 50 on the rear side 51 thereof and separates into two parts—a lower housing section 53 and an upper housing section 52 pivotally joined to the lower housing section 53 by the hinges 50—for easy access to inside components. The Containment Vessel 20 further has two fasteners 54 on the front side 55 thereof, selectively latching the upper and lower housing sections 52, 53 together.

The Choke Gasket 21 is preferably a rubber (fluoroelastomer) gasket, designed to fit in between the top of the Redox Chamber 6 and the bottom of the Hydrogen Trap 3. The Choke Gasket 21 is also designed to downwardly fit inside the Redox Chamber 6. The Choke Gasket 21 has hexagonal holes 78 that snugly fit the Hydrogen Collector Tubes 17. The Choke Gasket 21 chokes the outside of the Hydrogen Collector Tubes 17 and does not allow oxygen to pass into the Hydrogen Trap 3.

The Footer Gasket 22 is preferably a rubber (fluoroelastomer) gasket, fitting between the Redox Chamber 6 and the Footer 36. The Footer Gasket 22 provides spacing and some shock absorbance.

The Collector Gasket 23 is preferably a rubber (fluoroelastomer) gasket, acting as an insulator and separator for the Anode Touch Plate 30 and the Cathode Touch Plate 29. The Collector Gasket 23 also has hexagonal risers 56 that protrude upwardly through the holes 116 in the Cathode Touch Plate 29 and that fit snugly inside each Hydrogen Collector Tube 17. Each riser 56 has a hexagonal hole 57 in the center thereof that fits snugly around the outside of the Anodes 16.

The Seat Gasket 24 is preferably a rubber (fluoroelastomer) gasket that rests at the bottom of the Redox Chamber 6. The Seat Gasket 24 acts as a spacer and insulator for the Anode Touch Plate 30 and the Redox Chamber 6. The Seat Gasket 24 also provides some shock absorbance.

The Hydrogen Escape Vent 25 is a pipefitting, located on the Hydrogen Trap Lid 2, and is preferably made of Stainless Steel or Nylon. The Hydrogen Escape Vent 25 connects to the Hydrogen Escape Line 9.

The Oxygen Escape Vent 26 is a pipefitting, located on the side of the Redox Chamber 6, and is preferably made of Stainless Steel or Nylon. The Oxygen Escape Vent 26 connects to the Oxygen Escape Line 13.

The Redox Chamber Explosion Proof Solenoid Switch 27 preferably fits on a ⅜ inch pipefitting preferably made of Stainless Steel or Nylon, located on the side of the Redox Chamber 6. The Redox Chamber Explosion Proof Solenoid Switch 27 connects to the Water Feed 14. The Redox Chamber Explosion Proof Solenoid Switch 27 is an electronically controlled, two-way shut off valve (normally closed), that opens when a signal is received from the Water Level Control Board 38 to open.

The Hydrogen Trap Explosion Proof Solenoid Switch 28 preferably fits on a ⅜ inch pipefitting preferably made of Stainless Steel or Nylon, located on the top of the Hydrogen Trap 6. The Hydrogen Trap Explosion Proof Solenoid Switch 28 connects to the Water Feed 14. The Hydrogen Trap Explosion Proof Solenoid Switch 28 is an electronically controlled, two-way shut off valve (normally closed), that opens when a signal is received from the Water Level Control Board 38 to open.

The Cathode Touch Plate 29 is a honeycomb shaped insulating plate preferably made from ABS or Nylon. The Cathode Touch Plate 29 rests directly under the Cathode Matrix 15 and above the Collector Gasket 23. The Cathode Touch Plate 29 has hexagonal holes 116 that fit on the outside of the Hydrogen Collector Tubes 17, has a channel 118 formed in the top surface 114 thereof that fits the Cathode Electro-Conductive Matrix 32, and is fitted with the Cathode Pickup 33.

The Anode Touch Plate 30 is an insulating plate preferably made from ABS or Nylon. The Anode Touch Plate 30 has a series of hexagonal holes in which the Anode Push Sockets 35 are located. The Anode Push Sockets 35 fit inside the holes and pass the electrical current to the Anodes 16, the lower axial ends of which are received by the Anode Push Sockets 35. The Anode Push Sockets 35 are electrically interconnected through soldered flat wires 60 of highly electro-conductive polymer which rest in channels 62 recessed into the bottom side surface 112 of the Anode Touch Plate 30.

The Anode Spacers 31 are preferably Nylon star-shaped spacers, which have a hexagonal center hole 106 that fits tightly on the outside of the Anodes 16. The Anode Spacers 31 provide concentric space between the Anodes 16 and the Hydrogen Collector Tubes 17.

The Cathode Electro-Conductive Matrix 32 is preferably made from highly electro-conductive polymer. The Cathode Electro-Conductive Matrix 32 is a flat (planar) structure that is at least partially received by the channel 118 formed in the top surface 114 of the Cathode Touch Plate 29. The Cathode Electro-Conductive Matrix 32 also reaches to connect to the Cathode Pick Up 33. The Cathode Matrix 15 presses against the Cathode Touch Plate 29, and lines up directly over the Cathode Electro-Conductive Matrix 32, covering the Cathode Electro-Conductive Matrix 32 completely. The Cathode Electro-Conductive Matrix 32 is thus in electrical contact with the Cathode Matrix 15, and sends positive DC current to the bottom of the Cathode Matrix 15, allowing the current to move upward through the Cathode Matrix 15.

The Cathode Pick Up 33 is a clip preferably made from highly electro-conductive polymer that connects the Cathode Electro-Conductive Matrix 32 to the positive electrical lead through Positive Electrical Fitting 19.

The Anode Pick Up 34 is a clip preferably made from highly electro-conductive polymer that connects the series of Anode Push Sockets 35 to the negative electrical lead through Negative Electrical Fitting 18.

The Anode Push Socket 35 is a shallow hexagonal cup preferably made of highly electro-conductive polymer (or diode material for prototype purposes). Each Anode Push Socket 35 is situated inside the holes formed in the upper surface 110 of the Anode Touch Plate 30, with the open side of the Anode Push Sockets 35 facing up. There are a plurality of such Anode Push Sockets 35 mounted on the Anode Touch Plate 30 and spaced apart from other. All of the Anode Push Sockets 35 are electrically connected together through a series of soldered wire or electro-conductive polymer lines 60. The Anode Push Sockets 30 fit the bottom axial ends of the Anodes 16 and provide the necessary negative DC current and voltage for the Anodes 16.

The Footer 36 is preferably a polymer pedestal located at the bottom of the Reactor 1. The Footer 36 has eight bores 128 through which the Reactor Bolts 46 can fit. These bores 128 have a hex shaped receptacle 130 formed in the bottom side surface of the Footer 36 that are just recessed deep enough to fit the Heads 48 of the Reactor Bolts 46. From the hex shaped receptacle, each bore 128 continues up into a cylindrical shaft through the thickness of the Footer 36 to accommodate the threaded shank of the Reactor Bolts 46. The hex shaped receptacles 130 prevent the Reactor Bolts 46 from turning while being tightened. Also, it has a hollow section 132 in the center for application of a VDC low heat heating element 134.

The Optical Water Level Sensor 37 is a water level sensor (e.g., preferably optical liquid level sensors from SST Sensing Ltd of Coatbridge, U.K.) that is spark-less. The Optical Water Level Sensor 37 sends off a signal to a controlling board (e.g., Water Level Control Board 38) to open or close any valves (e.g., Redox Chamber Explosion Proof Solenoid Switch 37 and Hydrogen Trap Explosion Proof Solenoid Switch 38) based on the water level being too low or too high according to its scans.

The Water Level Control Board 38 is preferably formed as a printed circuit board (PCB) or other suitable structure. The Board 38 takes direct current voltage (VDC) from the power supply (e.g., Power Converter 41) and separates it into two lines, the first for the Reactor 1 and the second for the water level control systems. After the Water Level Control Board 38 receives a signal from the Optical Water Level Sensors 37, the Board 38 then sends a signal to open the Redox Chamber Explosion Proof Solenoid Switch 27 or the Hydrogen Trap Explosion Proof Solenoid Switch 28 to raise the water level in the Redox Chamber 6 or the Hydrogen Trap 3.

The Fluid Vent 39 is a nipple fitting preferably made from Nylon or similar material that has a standard threading (e.g., ⅜ inch, ¼ inch, etc.) that allows water to flow into the Hydrogen Trap 3 and the Redox Chamber 6.

The Water Control Lid 40 fits over a hollowed out or recessed section, forming a separate compartment, on the outside right side surface of the Containment Vessel 20. The Water Control Lid 40 covers the Water Level Control Board 38 and is fastened down with four Control Lid Fasteners 44. The Water Control Lid 40 is made from the same polymer as that of the Containment Vessel 20 and is designed to contour and be flush with the outside surface of the Containment Vessel 20.

The Power Converter 41 preferably provides either 12VDC or 24VDC. The Power Converter 41 can be a standard VAC to VDC power converter from any reputable vendor.

There are preferably two different Flashback Arresters 42 on the Reactor 1, one to handle hydrogen flashbacks, and the other to handle oxygen flashbacks.

The Solenoid Switch Fasteners 43 are preferably 18-8 stainless steel, button head, socket cap screws that fit each of the Redox Chamber Explosion Proof Solenoid Switch 27 and the Hydrogen Trap Explosion Proof Solenoid Switch 28 through two holes on the bottom side of each Switch 27, 28. The Solenoid Switch Fasteners 43 insert through four individual holes located on the bottom side of the Containment Vessel 20.

The Control Lid Fasteners 44 are preferably (four) size 6 mm 316 stainless steel, socket head screws. The Control Lid Fasteners 44 insert through four holes in the Water Control Lid 40 and fasten the Water Control Lid 40 to the Containment Vessel 20 and so that the Water Control Lid 40 covers the Water Level Control Board 38.

The Reactor Stall 45 is part of the Containment Vessel 20. The Reactor Stall 45 can be cast with the rest of the Containment Vessel 20 or made as a separate part. The Reactor Stall 45 rests inside the Containment Vessel 20 and defines a rectangular cavity 64 that fits the entire Reactor 1. The Reactor Stall 45 has an open area 66 facing the back thereof that allows access to the back of the Reactor 1. The Reactor Stall 45 also has two lip edges 68 that hold the back side of the Reactor 1 in place so that it does not move backwards. There is a ledge 70 in the top of the Reactor Stall 45 surrounding the left side, front side and right side of the Reactor 1. The ledge 70 also has a recess 72 on the left side to accommodate the lower of the two Optical Water Level Sensors 37. Additional support to the Reactor 1 can be supplied by securing straps (not shown), fastened to the top of the ledge 70, so that the Reactor 1 does not move or jostle in an upward direction within the Containment Vessel 20.

There are preferably eight Reactor Bolts 46. Each Reactor Bolt 46 is preferably a 316 stainless steel hex bolt that is as long as the Reactor's assembly is tall. The Reactor Bolts 46 fit in eight pre-drilled or pre-formed shafts or bores formed in the Footer 36, the Footer Gasket 22, the Redox Chamber 6, the Choke Gasket 21, the Hydrogen Trap 3, the Head Gasket 8, and the Hydrogen Trap Lid 2. These components are further secured by the eight Reactor Nuts 47 which are inserted on the ends of each Reactor Bolt 46 on top of the Hydrogen Trap Lid 2. It is preferred that washers (not shown) be used between the Hydrogen Trap Lid 2 and each Reactor Nut 47. Once each Reactor Bolt 46 is in place, they secure and tighten together the components forming the assembly of the Reactor 1.

There are preferably eight Reactor Nuts 47. Each Reactor Nut 47 is preferably a standard 316 stainless steel hex nut that fits on a corresponding Reactor Bolt 46.

A further explanation of the portable hydrogen and oxygen supply system of the present invention, and its preferred components, will now be described.

The device is comprised of many different chambers. The two chambers where the reactions take place and/or the disassociated gasses are collected are the Redox Chamber 6 and the Hydrogen Trap 3.

The Redox Chamber 6 can be modified to any exterior dimension so long as it fits securely inside the Containment Vessel 20. The inside of the Redox Chamber 6 must have a hollow area or interior cavity 82 that is designed to receive the Cathode Matrix 15, the Cathode Touch Plate 29, the Anode Touch Plate 30, the Seat Gasket 24, the Collector Gasket 23, and the Cathode Electro-Conductive Matrix 32 to fit into snugly inside or secured so that these components do not move around inside the Redox Chamber 6.

The Redox Chamber 6 also houses the Anodes 16, the Hydrogen Collector Tubes 17, the Collector Gasket 23, the Anode Spacers 31, one of the two Water Vents 39*a*, the Oxygen Escape Vent 26, and the Choke Gasket 21 which sits on the top of the assembly under the Hydrogen Trap 3. The Redox Chamber assembly allows the Hydrogen Collector Tubes 17 to pass through the various holes and bores provided by the components of the Redox Chamber assembly and go into their intended holes 124 in the Hydrogen Trap 3.

The Redox Chamber 6 has several holes 136 for securing bolts (i.e., Reactor Bolts 46) located in eight places between its exterior side and its interior side defining the interior cavity 82. The Redox Chamber 6 is automatically filled and maintained with water by pumps and sensors, leaving empty space on the top of the interior cavity 82 thereof to provide a chamber 84 where oxygen gas can collect. The interior cavity 82 is then charged with DC voltage that leads in through the electrical feeds, into the Anode Touch Plate 30 and the Cathode Touch Plate 29, then into the thirty-nine (in the preferred embodiment) Anodes 16 and the single Cathode Matrix 15. This introduction of DC electricity causes the water in the interior cavity 82 of the Redox Chamber 6 to disassociate into its two key elements, oxygen and hydrogen. The gaseous elements are then attracted to the diodes (defined by the Anodes 16 and the Cathode Matrix 15) with the opposite charge to theirs. The oxygen (being negatively charged) will go to the positively charged Cathode Matrix 15, whereas the positively charged hydrogen will go to the array of Anodes 16 that are negatively charged. However, before the hydrogen gets to the Anode 16, it must pass through a barrier, that is, the Hydrogen Collector Tubes 17. This is necessary to separate the two gaseous elements (hydrogen and oxygen) and to send the hydrogen into the Hydrogen Trap 3, as the Hydrogen Collector Tubes 17 reach through the top of the Redox Chamber 6 and into the Hydrogen Trap 3.

The Hydrogen Trap assembly is comprised of five pieces: the Hydrogen Trap 3, the Hydrogen Trap Lid 4, the Head Gasket 8, the Hydrogen Escape Vent 25 and a second Fluid Vent 39*b*, which connects the Hydrogen Trap 3 to the Hydrogen Trap Explosion Proof Solenoid Switch 28.

If desired, the current polarity can be reversed to the assembly so that the Cathode Matrix 15 acts as an anode and the Anodes 16 become cathodes; the device will produce oxygen inside the Hydrogen Collector Tubes 17 and will flow to the top of the Hydrogen Trap 3, whereas the top of the Redox Chamber 6 will collect hydrogen. It is important to remember that, when one reverses the DC polarity, one will end up with hydrogen where the oxygen was originally going to come out, and oxygen will now be where hydrogen was expected to come out. So, if there are any external feed lines to the two outputs, it must be remembered to transpose the two so serious accidents do not occur.

Once the hydrogen bubbles to the top of the Hydrogen Trap 3 where the hydrogen collection chamber 86 is situated, the hydrogen will gather over the water and vent through the Hydrogen Escape Vent 25. Then, it will pass through the Hydrogen Escape Line 9 and will enter the Hydrogen Bubbler 4 from the bottom port thereof.

The Hydrogen Bubbler 4 is a box or cylinder preferably made of static free plastic (e.g., ABS, Nylon, PLA (polylactic acid)) filled preferably ⅔rds with water. The hydrogen passes through the water and into the vents at the top of the Hydrogen Bubbler 4. The Hydrogen Bubbler 4 is important for two reasons:

1. It passively cleans the hydrogen from tertiary gasses such as chlorine, argon, bromine and arsenic.

2. It is another safeguard against any flame flashbacks. In the event that a flashback should occur this far inside the system, the water will act as a firewall and not allow the combustion to go any further.

The Hydrogen Bubbler 4 is designed so that the gasses enter through the bottom of the chamber thereof and so that the hydrogen gas passes through the water in the chamber. The Hydrogen Bubbler 4 can be any shape, like a cylinder, or rectangular like a tall box, just as long as it is designed to be taller than it is wide so that the hydrogen gas passes upward therethrough and has no place to get trapped inside. The bottom wall of the Hydrogen Bubbler 4 is designed to be thinner than the other walls defining the interior chamber so that, if a flashback occurs and exerts pressure on the water inside the Hydrogen Bubbler 4, the force thereof will push out the bottom wall of the Hydrogen Bubbler 4 in the safest direction.

After the hydrogen gas passes though the top vent of the Hydrogen Bubbler 4, the gas passes to the rest of the Hydrogen Escape Line 9 to the next component, the Desiccant Cartridge 7*b*. The Desiccant Cartridge 7*b* is one of two identical containers 7*a*, 7*b* with fittings on the top wall and bottom wall thereof to allow the gasses to escape. Preferably made with ABS plastic, the Desiccant Cartridges 7*a*, 7*b* are preferably filled ⅔ with fine desiccant, which dries the gasses by binding water vapor. The gasses enter on the bottom of the internal chamber defined by each Desiccant Cartridge 7*a*, 7*b* and rise to the top through the desiccant. Each Desiccant Cartridge 7*a*, 7*b* will also have a filter, possibly Carbon, on the top portion of the internal chamber thereof, filling the other ⅓ of the cartridge chamber. As gasses pass through the filter, the filter will catch tertiary gasses (Chlorine, Argon, Bromine, etc.). The design of the Desiccant Cartridges 7*a*, 7*b* is similar to that of the Hydrogen Bubbler 4 in that each Desiccant Cartridge 7*a*, 7*b* is taller than it is wide, because the gas will pass upwardly therethrough. Also, the bottom wall of each Desiccant Cartridge 7*a*, 7*b* is preferably the thinnest wall of all of its walls so that, in the case of a flashback happening, the bottom wall of the Desiccant Cartridge 7*a*, 7*b* will be compromised and will push its contents downward. The Desiccant Cartridge 7*a*, 7*b* can be periodically replaced or recycled when the desiccant becomes saturated.

The gas, in this case hydrogen, exits through the top of the Desiccant Cartridge 7b and out to the rest of the Hydrogen Escape Line 9. The gas then passes out of the Containment Vessel 20 through the Hydrogen Output 10. The Hydrogen Output 10 can be a standard male air hose fitting, preferably constructed of Nylon or insulating plastic, but it can be any configuration that can connect the end of the Hydrogen Escape Line 9 to any outside lines, hydrogen compression tank, Hydride Tank or any device that one needs to connect hydrogen to. It is preferred if the Hydrogen Output 10 is fitted with a Flashback Protector (such as manufactured or provided by a reputable vendor). It is important to mark on the outside surface of the Containment Vessel 20 near this Hydrogen Output 10, "Hydrogen", in some way and put safety notices near the Output 10, as well.

Meanwhile, inside the Redox Chamber 6, on the outside of all of the Hydrogen Collector Tubes 17, the Cathode Matrix 15 pulls oxygen towards it and hangs onto the oxygen shortly, until the oxygen bubbles get too big to stick or adhere to the Cathode Matrix 15, or the power is cut off. Then, the oxygen floats to the top of the water inside the Redox Chamber 6 and into the oxygen collection chamber 84 above the water level. Then, the oxygen gas vents through the Oxygen Escape Vent 26 and into the Oxygen Escape Line 13. The oxygen gas will then pass into the bottom of the Oxygen Bubbler 5.

The Oxygen Bubbler 5 is a device similar in structure to that of the Hydrogen Bubbler 4. The Oxygen Bubbler 5 can be smaller or shorter than the Hydrogen Bubbler 4, because there is less oxygen in water than hydrogen, or it can be identical in size to the Hydrogen Bubbler 4. Like in the Hydrogen Bubbler 4, the gasses, in this case oxygen, pass up through the bottom vent and rise to the top of the water inside the chamber of the Oxygen Bubbler 5. This passively cleanses the oxygen and also serves as a firewall. Oxygen gas then passes to the top vent and enters the second part of the Oxygen Escape Line 13 where it goes into the bottom of the Oxygen Desiccant Cartridge 7a, which can be the same as the Desiccant Cartridge 7b on the Hydrogen Escape Line 9, or slightly smaller. The function of the Oxygen Desiccant Cartridge 7a is the same as that of the Hydrogen Desiccant Cartridge 7b, except it is drying oxygen. Oxygen gas flows through the bottom of the Oxygen Desiccant Cartridge 7a and passes through the desiccant, drying as it reaches the filter at the top portion of its internal chamber, where tertiary gasses are bonded to the cartridge's filter. The oxygen then vents out the top port of the Oxygen Desiccant Cartridge 7a and goes into the third part of the Oxygen Escape Line 13 and through the Oxygen Output 12.

The Oxygen Output 12 can be a similar device to the Hydrogen Output 10. The Oxygen Output 12 can be a standard fitting for air hose or gas hose.

It is preferred if the Oxygen Output 12 is fitted with a Flashback Protector (such as manufactured or provided by a reputable vendor). It is also important to mark on the outer surface of the Containment Vessel 20 near this Oxygen Output, "Oxygen", in some way and put safety notices near the Output 12, as well.

DC electricity is important to the process and it needs to be supplied to the components of the Redox Chamber assembly. Electricity is supplied from a DC power source (e.g., Power Converter 41) that feeds through the back wall and bottom wall of the Containment Vessel 20. Then, the voltage is separated into one positive electrical wire that leads to the Positive Electrical Fitting 19 and one negative electrical wire that leads to the Negative Electrical Fitting 18.

The Positive Electrical Fitting 19 can be made out of electro-conducting metal or polymers. Preferably, a highly electro-conductive polymer is chosen so as not to introduce oxidized metal into the Redox Chamber 6.

Located on the outside of the Redox Chamber 6 (in this example, the lower right side thereof), the Positive Electrical Fitting 19 extends through the outer wall 80 of the Redox Chamber 6, extending inside and reaching up to the height where the Cathode Touch Plate 29 would sit. At this height, the Positive Electrical Fitting 19 flanges out to a C-shaped clip 74. This clip 74 is provided so that the Cathode Pick Up 33 on the Cathode Touch Plate 29 will fit inside the clip 74 snugly.

The Cathode Pick Up 33 is C-shaped as well, and is preferably made from a highly electro-conductive polymer. The Cathode Pick Up 33 is soldered to fit on the outside edge of the Cathode Touch Plate 29 and placed to connect with the Positive Electrical Fitting 19. The Cathode Pick Up 33 also touches and supplies electricity to the Cathode Electro-Conductive Matrix 32 which is located on the Cathode Touch Plate 29.

The Cathode Touch Plate 29 is preferably made from an electrically insulating polymer and is preferably designed to substantially the same lateral dimensions as the Cathode Matrix 15 but is far shorter in height. The Cathode Touch Plate 29 also has a channel 118 formed in the top surface 114 thereof to fit the Cathode Electro-Conductive Matrix 32 inside it. The channel 118 is shallow and is designed to allow the top surface of the Cathode Electro-Conductive Matrix 32 to sit flush with the top surface 114 of the Cathode Touch Plate 29.

The Cathode Electro-Conductive Matrix 32 takes positive DC current supplied from the Cathode Pick Up 33, and distributes it to the bottom of the Cathode Matrix 15. The Cathode Electro-Conductive Matrix 32 is not limited to one cathode pick up, but it is limited to one polarity at a time. For instance, one cannot supply positive current and negative current to different places on the Cathode Electro-Conductive Matrix 32; the Matrix 32 must be all positive, or all negative if one so chooses.

The Cathode Matrix 15 takes the positive DC current supplied to the bottom of it and (because of its low resistance or impedance (Ohms) properties) spreads the current evenly so that it sends out the current into the filtered water.

The Negative Electrical Fitting 18 is similar in structure to that of the Positive Electrical Fitting 19. The Negative Electrical Fitting 18 reaches from the outside of the Redox Chamber 6 and goes through the outer wall 80 to the inside and extends to the height where the Anode Pick Up 34 would meet it. The Negative Electrical Fitting 18 also flanges in a C-shaped clip 76 to envelop the Anode Pick Up 34, to which it supplies the negative DC charge.

The Anode Pick Up 34 is also C-shaped and fits snugly into the flanged C-shaped clip section 76 of the Negative Electrical Fitting 18. The Anode Pick Up 34 is also soldered to an edge of the Anode Touch Plate 30.

The Anode Touch Plate 30 is preferably made from PCB (printed circuit board) substrate plastic (or phenolic or fiberglass) and has an array of spaced apart hexagonal holes 139 where the Anode Push Sockets 35 are located that fit the ends of the Anodes 16 perpendicularly.

On the bottom side surface 112 of the Anode Touch Plate 30 are formed channels 62 that receive a series of highly electro-conductive polymer flat wires 60 that electrically connect the Anode Pick Up 34 to the Anode Push Sockets 35. These wires 60 are preferably flush with or slightly shorter in depth than the bottom surface 112 of the Anode Touch Plate 30. The Anode Push Sockets 35 are preferably simply small electrically conductive cups that receive the bottom axial end of the rod-like Anodes 16. The Anode Push Sockets 35 can be as deep as the Anode Touch Plate 30 is thick or slightly shorter. The Anode Push Sockets 35 may be formed as electrically conductive cups mounted on the upper surface 110 of the Anode Touch Plate 30 or recessed on the upper surface 110 and located in the holes 139 formed in the Anode Touch Plate 30. Preferably, there is provided an electrically conductive via or hole 138 for each of these Anode Push Sockets 35 formed in the Anode Touch Plate 30 that extends from the bottom surface 112 of the Anode Touch Plate 30 where the wires 60 are located and is aligned with each of the holes 139 on the top of Anode Touch Plate 30 where the Anode Push Sockets 35 are situated to electrically connect the wires 60 with each Anode Push Socket 35 through the thickness of the Anode Touch Plate 30. If desired, the structure of the Anode Touch Plate 30 can be designed so that the assembly of flat wires 60 and Anode Push Sockets 35 can be sandwiched with the Anode Touch Plate 30 and integrally formed as a printed circuit board (PCB). Or, alternatively, the Anode Touch Plate 30 may be formed as a laminate, with an additional insulative layer of PCB substrate material (e.g., phenolic or fiberglass) covering the bottom side 112 and the wires 60 thereon. However, it should not be necessary to design the structure of the Anode Touch Plate 30 and Anode Push Socket 35 in this latter alternative arrangement, because of the Seat Gasket 24, which is a fluoroelastomer gasket which sits below the Anode Touch Plate 30 and above the bottom of the Redox Chamber 6.

The Seat Gasket 24 preferably has the same outer dimensions as the Anode Touch Plate 30, only taller in height (i.e., thicker). The Seat Gasket 24 provides electro-insulation and some passive shock resistance from bumps below. The Seat Gasket 24 is preferably at least 0.25 inch thick to provide shock absorbance. The Seat Gasket 24 preferably has formed centrally through its thickness a pressure relief hole 142.

Situated above the Anode Touch Plate 30 is the Collector Gasket 23, which also sits below the Cathode Touch Plate 29. The Collector Gasket 23 can be made from fluoroelastomers or an insulating polymer (e.g., Nylon, ABS, etc.). The Collector Gasket 23 has the same outer shape as the Anode Touch Plate 30 and has similar holes 57 that fit the Anodes 16 snugly. The Collector Gasket 23 also has a series of raised supporters, or risers, 56 on the top surface 122 thereof designed to fit the inside dimensions of the Hydrogen Collector Tubes 17 perfectly. The supporters 56 are placed so that they are concentric with the relief holes 57 for receiving the Anodes 16.

Each supporter 56 is preferably at least 0.2 inches in height. Each supporter 56 preferably reaches concentrically at least partially through the openings 116 in the Cathode Touch Plate 29.

The Anodes 16 pass through the holes 57 in the Collector Gasket 23, and into the holes in the Anode Touch Plate 30 where the Anode Push Sockets 35 are located to connect electrically with the Anode Push Sockets 35. Each Anode 16 is preferably placed firmly in each Anode Push Socket 35 to ensure good contact.

Once the Anodes 16 are in place inside each tubular bore 90 of the Cathode Matrix 15, and water is introduced, one could supply the Anodes 16 and Cathode Matrix 15 with their respective currents and a reaction will occur. But, without the Hydrogen Collection Tubes 17, the end results will be that one will end up with Brown's Gas and not pure hydrogen or pure oxygen. Also, it may be hard to keep even spaces with the Anodes 16, as the Anodes 16 may slightly tip and not be maintained parallel to the inner tubular bore walls 92 of the Cathode Matrix 15. Therefore, it is preferred to install the Anode Spacers 31 on the Anodes 16 in the Hydrogen Collector Tubes 17.

The Anode Spacers 31 are preferably star-shaped (in this instance, six points) with a central hole 106 that fits the outside of the Anodes 16 tightly. The Anode Spacers 31 are made from an electrically insulating polymer. The outer dimensions of the Anode Spacers 31 are designed to fit the inside of the Hydrogen Collector Tubes 17 while letting gasses flow through the spaces 104 in their star-like design. The Anode Spacers 31 are preferably placed 0.25 inches (6.35 mm) down the Anode shaft from the top of the Anode 16. Each Anode 16 can be designed with a notch (not shown) to hold the Anode Spacers 31 at a particular elevation thereon.

The Hydrogen Collector Tubes 17 install over the Anodes 16 and the Anode Spacers 31, and should fit snugly in the openings 116 in the Cathode Touch Plate 29 and fit over the risers 56 on the Collector Gasket 23 and are preferably inserted as far as the upper surface 122 of the Collector Gasket 23. The Hydrogen Collector Tubes 17 are designed to be concentric with the inner tubular bores 90 of the Cathode Matrix 15 and the Anodes 16 that are inside the Hydrogen Collector Tubes 17. The Hydrogen Collector Tubes 17 preferably reach up past the top of the Redox Chamber 6 in this preferred design about 0.25 inches.

The Hydrogen Collector Tubes 17 are crucial to the Reactor 1. Once in place and proper amounts of water are provided to the Redox Chamber 6 and the Hydrogen Trap 3 and DC current is applied, one will get the intended reaction and simultaneous separation of gasses. The Hydrogen Collector Tubes 17 act similarly to a Proton Exchange Membrane (PEM) in that they act like a barrier between the negative and positive charges. However, unlike a PEM, the Hydrogen Collector Tubes 17 are made out of the same or similar material as the diodes. Each Hydrogen Collector Tube 17 allows the hydrogen to pass through to the inside bore 98 thereof, but is dense enough to keep the oxygen on the outside of the Hydrogen Collector Tube 17. Also, the Hydrogen Collector Tubes 17 do not have to be extremely thin to work (unlike a PEM), making it possible for injection molding the Tubes 17. The Hydrogen Collector Tubes 17 also act as a guide for the free floating hydrogen to reach the Hydrogen Trap 3.

The water will start to disassociate as the Cathode Matrix 15 attracts the oxygen atoms towards it, and, as the hydrogen is attracted to the Anode 16, the hydrogen must pass from the outside to the inside of the Hydrogen Collector Tube 17. The Hydrogen Collector Tubes 17 can be integrally made a part of the Hydrogen Trap 3 to act as a single unit, so long as it is designed so that the structure defining the hydrogen collection chamber 86 on top is composed of an insulating material. Preferably, the Hydrogen Collector Tubes 17 are made from highly electro-conductive polymer, and the design of the Tubes 17 is such that the Tubes 17 line up concentrically with the Anodes 16 and the tubular bores 90 of the Cathode Matrix 15. The Hydrogen Collector Tubes 17 can be designed with all of the Anodes 16 sealed inside all of the Hydrogen Collector Tubes 17, so long as the Anodes 16 and the Hydrogen Collector Tubes 17 are concentric and do not touch their active surfaces.

The Hydrogen Collector Tubes 17 are connected to the Hydrogen Trap 3 through the Choke Gasket 21. The Choke Gasket 21 is designed to have the outer shape of the Redox Chamber 6 and has eight holes to fit the fastening bolts (i.e., Reactor Bolts 46), and relief areas (i.e., openings 78) shaped to fit tightly around the outside of the Hydrogen Collector Tubes 17, so that the Hydrogen Collector Tubes 17 fit through the openings 78 without leaking oxygen. The Choke Gasket 21 is preferably made from a fluoroelastomer or an insulating material that can elastically make a tight seal (choke around the Hydrogen Collector Tubes 17).

Under the Redox Chamber 6 is the Footer 36. The Footer 36 acts as a pedestal for the Redox Chamber 6. The Footer 36 is preferably provided for further shock absorbance, giving the device some ground clearance if it is pulled out of the Containment Vessel 20, and also to terminate securely the fastening bolts (i.e., the Reactor Bolts 46). The Footer 36 is preferably designed to match the lateral outer dimensions of the Redox Chamber 6. The inside of the Footer 36 has a large hollow space 132 and eight flanged holes 128 to fit the fastening bolt heads and shafts (i.e., the hexagonal Reactor Bolt Heads 48 and the Reactor Bolts 46).

In between the Footer 36 and the Redox Chamber 6 is the Footer Gasket 22. The Footer Gasket 22 also provides shock absorbance. Shock absorbance to the device is important because some of the highly electro-conductive polymers or highly electro-conductive carbon aerogels do not have much tensile strength and cannot take an impact. Since most of the impact forces will be approaching from the direction of the ground, all of the gaskets are designed to lie flat in the assembly so that they protect their components above them. The Footer Gasket 22 is preferably constructed from fluoroelastomer and mirrors the lateral dimensions of the Footer 36.

The assembly of the Hydrogen Trap Lid 2, the Hydrogen Trap 3, the Redox Chamber 6, the Footer 36 and all of the interior components inside, collectively define the Reactor 1. When assembled, the Reactor 1 should look like an elongated block with two pipe nipple fittings 25, 39b on the top, two pipe nipple fittings 26, 39a on one side and two electrical fittings 18, 19 on the bottom of the Redox Chamber 6. The Reactor 1 should fit securely inside the Containment Vessel 20 with room enough to connect the wiring to the two electrical fittings 18, 19 and all four pipe nipple fittings 25, 26, 39a, 39b. Also, the Containment Vessel 20 should have hollowed fitting areas for the two Bubblers 4, 5 and the two Desiccant Cartridges 7a, 7b. There preferably is a hollowed section, or compartment, within the confines of the Containment Vessel 20 (covered by Water Control Lid 40) for any electrical boards that control water flow to the Redox Chamber 6 and the Hydrogen Trap 3. The hollowed out section, or compartment, should be separated from the interior cavity of the Containment Vessel 20 where the Reactor 1 resides and should be accessible from the outside of the Containment Vessel 20. This separation is preferred in order to limit stray electrical currents going inside the Containment Vessel 20 and possibly igniting any escaped gasses.

The Containment Vessel 20 is preferably made out of any static resistant polymer that can hold the weight of all of the components inside and preferably have enough strength to hold any nipple fittings that are being placed through it. The Containment Vessel 20 can have any outer configuration but it should have a way to access the inside components and have three nipples fitted on it: the Water Input 11, the Oxygen Output 12 and the Hydrogen Output 10. Also, the Containment Vessel 20 is fitted with a DC Electric Receptacle 140 to which the wire or cable connected to the output of the Power Converter 41 externally located from the Containment Vessel 20 and having a mating plug may be connected. In the aforementioned separate compartment, accessible by the outside only, the Water Level Control Board 38 is secured.

The Water Level Control Board 38 regulates the water levels to the Hydrogen Trap 3 and the Redox Chamber 6. The water flows in through the Water Input 11 and into the Water Feed 14. The Water Feed 14 branches into two lines, one leading to the Redox Chamber 6 and one leading to the Hydrogen Trap 3. Both lines preferably pass through valves, either the Hydrogen Trap Explosion Proof Solenoid Switch 28 or the Redox Chamber Explosion Proof Solenoid Switch 27, before entering their respective chambers. The Explosion Proof Solenoid Switches 27, 28 are designed to fit on the nipples (i.e., Fluid Vents 39a, 39b) going into the Redox Chamber 6 and the Hydrogen Trap 3. When the Water Level Control Board 38 provides control signals to the inputs of the Explosion Proof Solenoid Switches 27, 28, the Switches 27, 28 respond by either opening to let more water into the Redox Chamber 6 or the Hydrogen Trap 3, or close to prevent water flow. The states of the Explosion Proof Solenoid Switches 27, 28 are determined by the Water Level Sensors 37 which are fluid sensors, placed in four spots of the Reactor 1 that read the levels of the water and send a responsive signal when the levels are too low (to open the Redox Chamber Explosion Proof Solenoid Switch 27 or the Hydrogen Trap Explosion Proof Solenoid Switch 28) or close the valves (i.e., Switches 27, 28) when the levels get too high. These Water Level Sensors 37 are wired directly to the Water Level Control Board 38, and the wires reach through the inside of the Containment Vessel 20 to the inside of the compartment where the Water Level Control Board 38 is located through a series of holes.

Through design research, many shapes for the reaction chambers were considered (see FIGS. 21A-D), including circular (FIG. 21A), square or rectangular (FIG. 21B) and triangular (FIG. 21C), all being shown in transverse cross-section. However, the preferred transverse cross-sectional shape of the reaction chambers is hexagonal, as described previously and shown in FIG. 21D, in order to enhance the efficiency of the reaction and to minimize the possible introduction of electro-conductive cold spots and hot spots where some of the DC current would weaken due to the different thicknesses in the Cathode Matrix 15.

Although all of the examples of reaction chamber shapes shown in FIGS. 21A-D would create the targeted gasses, a hexagonal chamber (see FIG. 21D) was chosen due to its performance, longevity (due to the even wear of its surface) and the ability to spread the current in an even fashion.

With reference in particular to FIGS. 3 and 23-25 of the drawings, the operation of the portable hydrogen and oxygen supply system of the present invention will now be described.

Figure 23:
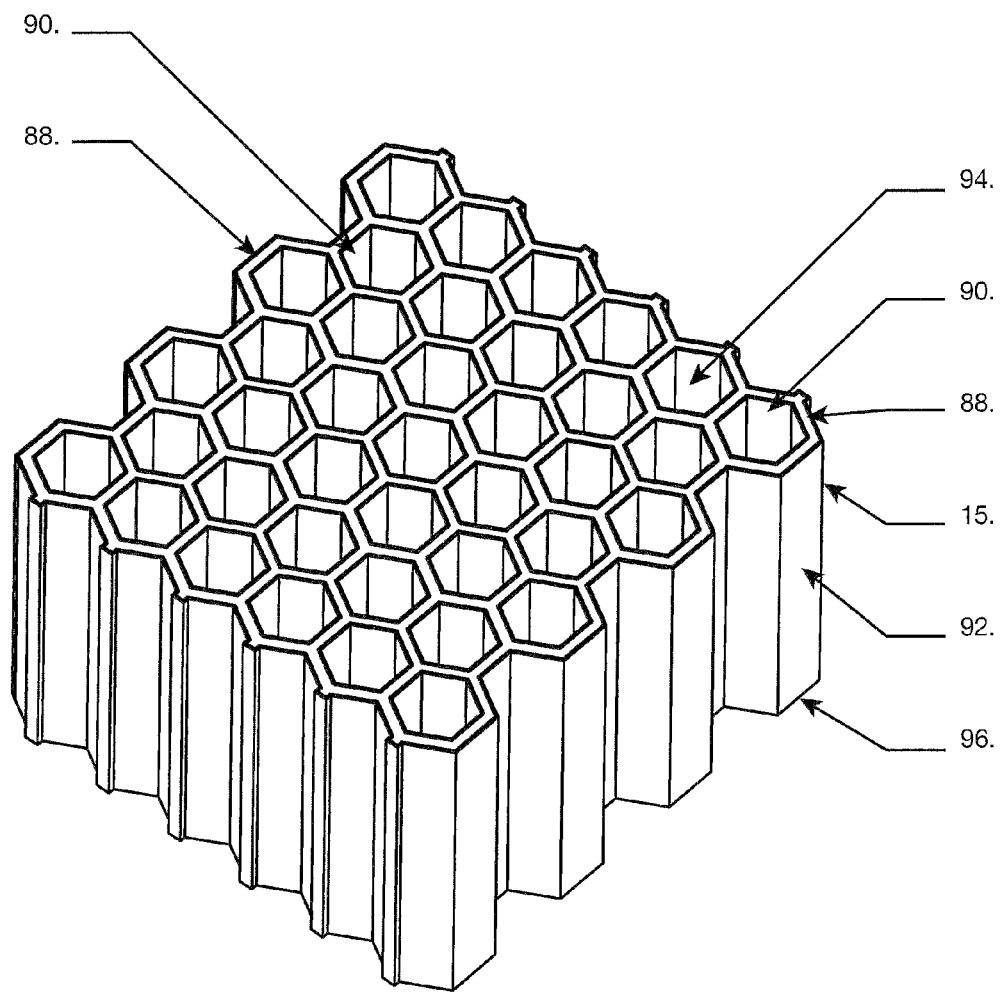
FIG. 23 is a perspective view of the Cathode Matrix forming part of the hydrogen and oxygen supply system of the present invention.

Positive DC voltage is supplied to the Cathode Matrix 15 while immersed in tap water (see FIG. 23). Then, the negatively charged Anodes 16 cause the water to separate into hydrogen and oxygen. The Anodes 16 draw the positively charged hydrogen atoms to them. The Cathode Matrix 15 draws the negatively charged atoms to it (see FIG. 3).

Figure 24:
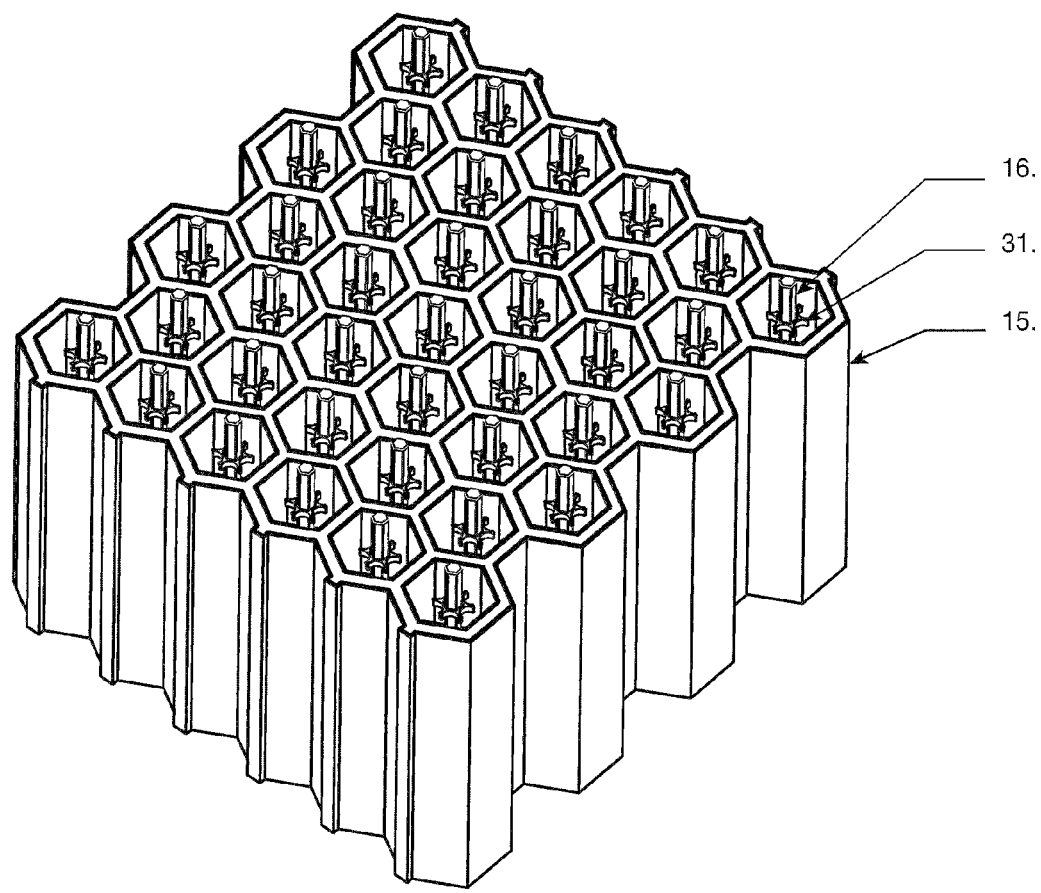
FIG. 24 is a perspective view of the Cathode Matrix, Anodes and Anode Spacers forming part of the hydrogen and oxygen supply system of the present invention.
Figure 25:
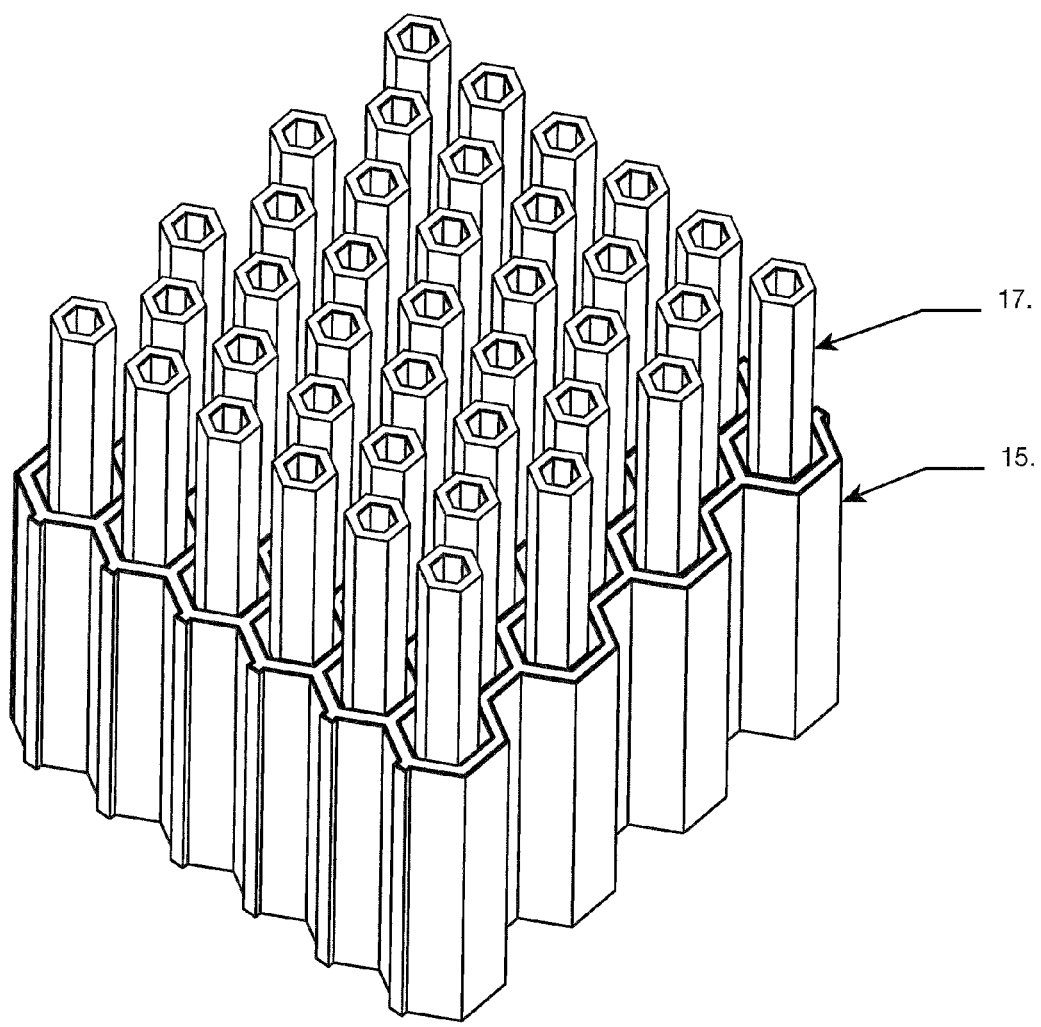
FIG. 25 is a perspective view of the Cathode Matrix and Hydrogen Collector Tubes received thereby forming part of the hydrogen and oxygen supply system of the present invention.
Figure 26A:
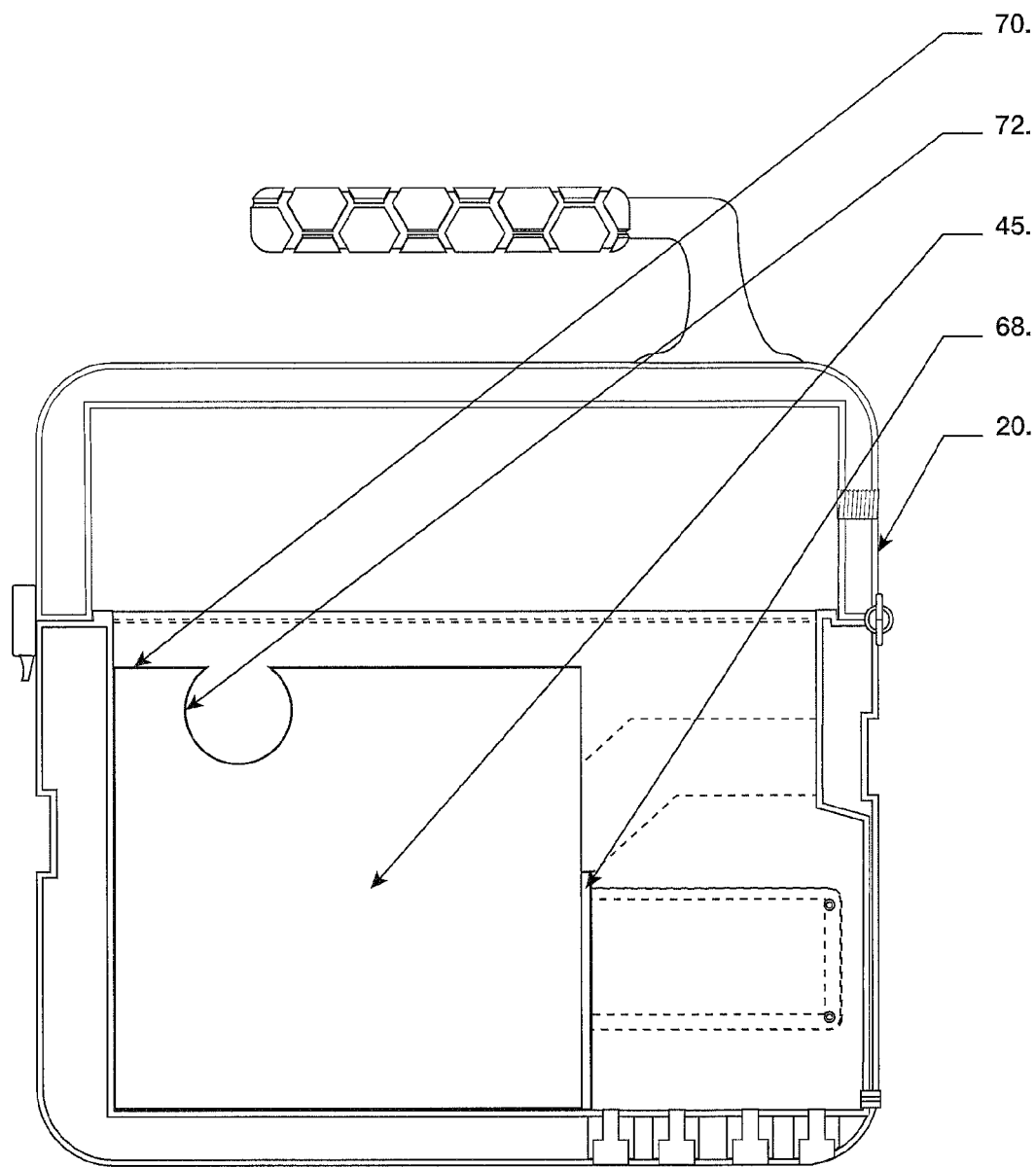
FIG. 26A is a partially cut away side view of the hydrogen and oxygen supply system of the present invention showing the Reactor Stall forming part of the hydrogen and oxygen supply system of the present invention.
Figure 26B:
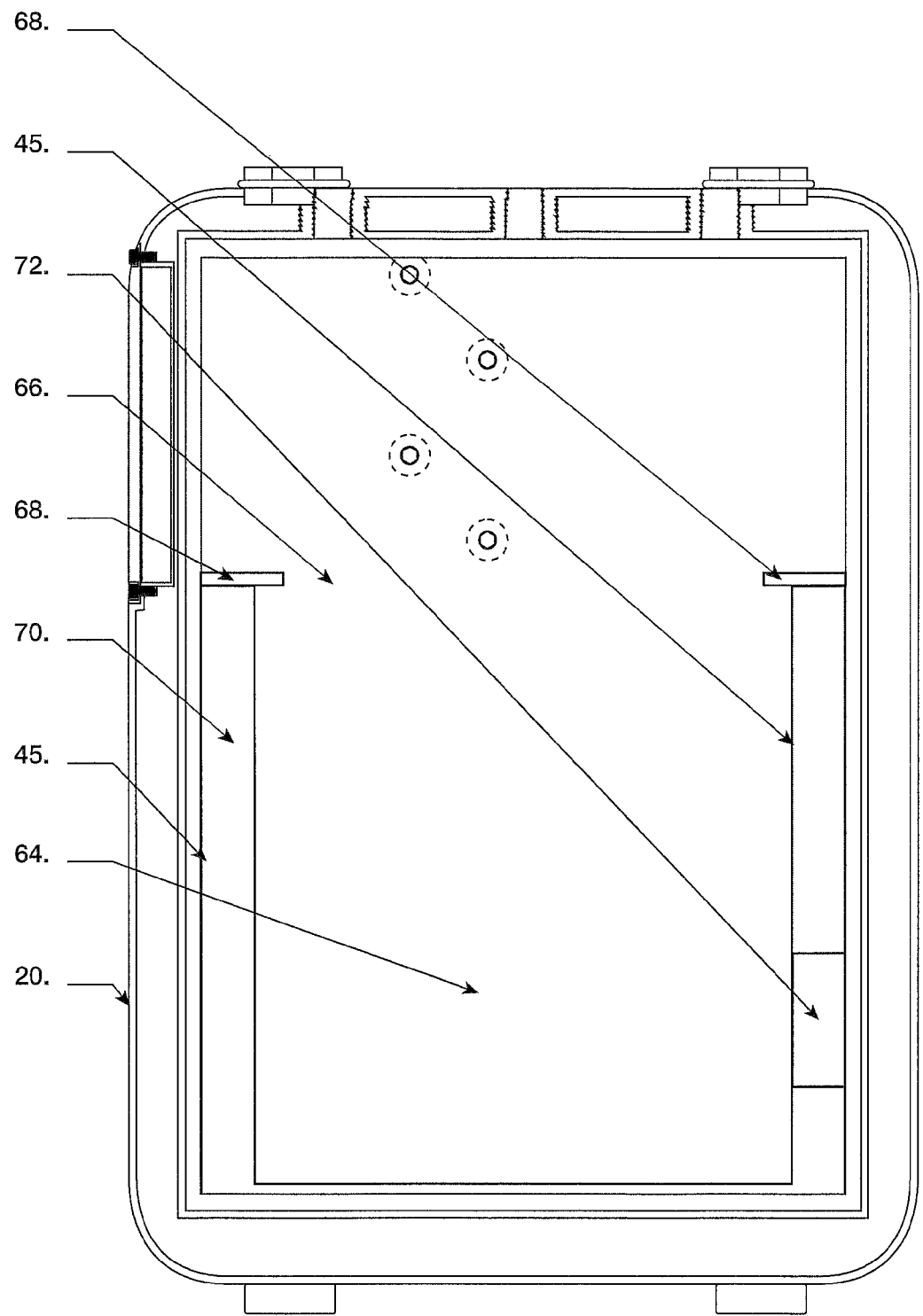
FIG. 26B is a partially cut away top view of the hydrogen and oxygen supply system of the present invention showing the Reactor Stall forming part of the hydrogen and oxygen supply system of the present invention.
Figure 26C:
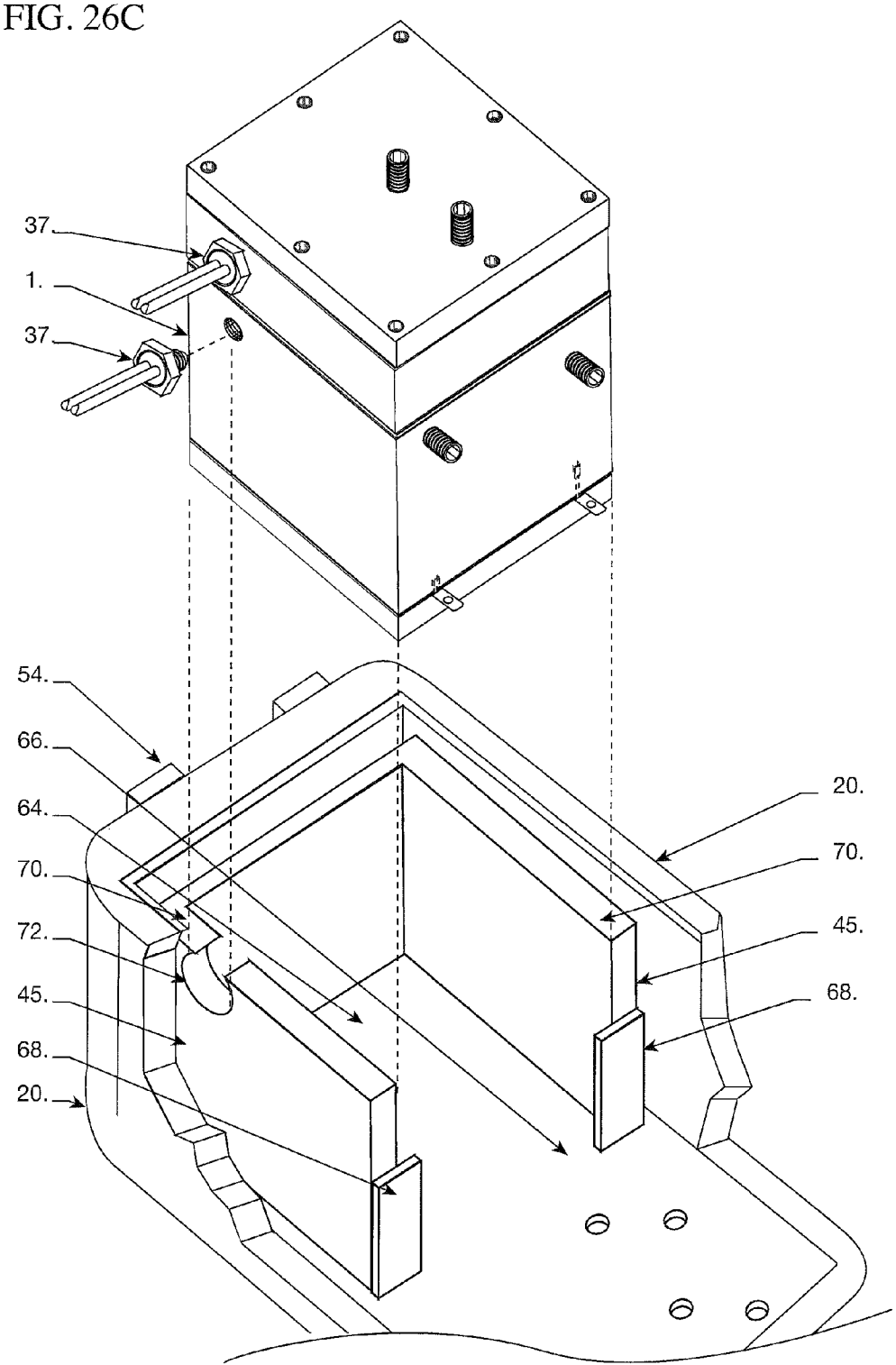
FIG. 26C is a partially cut away, exploded, isometric view of the hydrogen and oxygen supply system of the present invention showing the Reactor Stall forming part of the hydrogen and oxygen supply system of the present invention.

Before the hydrogen atoms can reach the Anodes 16, they must pass through the walls 100 of the Hydrogen Collector Tubes 17 (see FIGS. 24 and 25). The Collector Tubes 17 are highly electro-conductive polymers or highly electro-conductive carbon aerogels that contain an enrichment of carbon nanotubes. The oxygen cannot pass through the barrier of the Hydrogen Collector Tubes 17. Both elemental gasses on the inside and the outside of the Hydrogen Collector Tubes 17 float up to the top of the water surface. The Hydrogen Collector Tubes 17 are taller than the Anodes 16 and the Cathode Matrix 15. The Tubes 17 connect inside a top chamber 86 (i.e., in the Hydrogen Trap 3) filled with water, where the hydrogen is collected. The oxygen rises up out of the Cathode Matrix 15 and floats to the top of the lower chamber 84 (i.e., below the Choke Gasket 21), where it is collected and vented out.

As can be seen from the foregoing description, and as shown in the drawings, a hydrogen and oxygen supply system formed in accordance with the present invention includes a Reactor 1, the Reactor 1 defining an internal cavity for containing water and for causing the water to disassociate into hydrogen gas and oxygen gas; a first port 25 in fluid communication with the internal cavity of the Reactor 1 for venting therethrough the disassociated hydrogen gas; and a second port 26 in fluid communication with the internal cavity of the Reactor 1 for venting therethrough the disassociated oxygen gas.

The Reactor 1 of the hydrogen and oxygen supply system includes a Redox Chamber 6. The Redox Chamber 6 has an outer wall 80, the outer wall 80 at least partially defining interiorly thereof an interior space 82, and a first chamber 84 for collecting disassociated oxygen gas. The second port 26 of the Reactor 1 is in fluid communication with the first chamber 84 of the Redox Chamber 6.

The Reactor 1 also includes a Hydrogen Trap 3. The Hydrogen Trap 3 is mounted on the Redox Chamber 6. The Hydrogen Trap 3 at least partially defines a second chamber 86 for collecting disassociated hydrogen gas. The first port 25 of the Reactor 1 is in fluid communication with the second chamber 86 of the Hydrogen Trap 3.

The Reactor 1 further includes a Cathode Matrix 15. The Cathode Matrix 15 is situated within the interior space 82 of the Redox Chamber 6. The Cathode Matrix 15 includes a plurality of upstanding cathode tubes 88, each cathode tube 88 having an axial length and defining a bore 90 extending axially therein. Each cathode tube 88 has a side wall 92 and an open top axial end 94 and an opposite open bottom axial end 96.

The Reactor 1 also includes structure (for example, Negative Electrical Fitting 18 and/or Cathode Electro-Conductive Matrix 32) for providing a first voltage potential on the Cathode Matrix 15. The first voltage potential providing structure is in electrical communication with the Cathode Matrix 15 and the plurality of upstanding cathode tubes 88 thereof.

In addition, the Reactor 1 includes a plurality of Anodes 16, each Anode 16 being in the form of an elongated member.

Furthermore, the Reactor 1 has structure (for example, Positive Electrical Fitting 19 and/or Anode Touch Plate 30) for providing a second voltage potential on the Anodes 16. This second voltage potential providing structure is in electrical communication with the Anodes 16. The second voltage potential is different in magnitude from that of the first voltage potential.

The Reactor 1 also includes a plurality of Hydrogen Collector Tubes 17. Each Hydrogen Collector Tube 17 has an axial length and defines a bore 98 extending axially therein. Each Hydrogen Collector Tube 17 also has a side wall 100, an open top axial end 102 and an opposite open bottom axial end 104.

Each Anode 16 is received by the bore 98 of a respective Hydrogen Collector Tube 17 and is spaced therewithin so as not to contact the side wall 100 of the respective Hydrogen Collector Tube 17 in which the Anode 16 is received. Furthermore, each Hydrogen Collector Tube 17 is received by the bore 90 of a respective cathode tube 88 of the Cathode Matrix 15 and is spaced therewithin so as not to contact the side wall 92 of the respective cathode tube 88 in which the Hydrogen Collector Tube 17 is received.

The Reactor 1 also includes a separator element (for example, Choke Gasket 21) disposed between the Redox Chamber 6 and the Hydrogen Trap 3. The separator element separates the first chamber 84 of the Redox Chamber 6 from the second chamber 86 of the Hydrogen Trap 3 so that the first chamber 84 is not in gaseous communication with the second chamber 86.

Preferably, the axial length of each of the Hydrogen Collector Tubes 17 is greater than the axial length of each of the cathode tubes 88 of the Cathode Matrix 15. Also, the open top axial end 102 of each Hydrogen Collector Tube 17 preferably extends to the Hydrogen Trap 3 such that the bore 98 of each Hydrogen Collector Tube 17 is in gaseous communication with the second chamber 86 of the Hydrogen Trap 3. Furthermore, the open top axial end 94 of each cathode tube 88 of the Cathode Matrix 15 preferably extends upwardly in the Redox Chamber 6 such that the space within the bore 90 of each cathode tube 88 defined between the side wall 92 of the cathode tube 88 and the side wall 100 of the Hydrogen Collector Tube 17 received thereby is in gaseous communication with the first chamber 84 of the Redox Chamber 6.

The separator element (e.g., Choke Gasket 21) of the Reactor 1 may be a planar member having a plurality of openings 78 formed through the thickness thereof. In this version, each opening 78 closely receives a respective Hydrogen Collector Tube 17 and forms a substantially gastight seal therewith. This separator element may be a Choke Gasket 21 having elastic properties, and/or the separator element may be made from at least one of a fluoroelastomer and an electrically insulating material.

The Cathode Matrix 15 of the hydrogen and oxygen supply system, in a preferred embodiment, is formed with a honeycomb shape in transverse cross-section. In such an embodiment, the Cathode Matrix 15 includes cathode tubes 88 which are adjacent to other cathode tubes 88. More specifically, the side wall 92 of a cathode tube 88 of the Cathode Matrix 15 is joined to the side wall 92 of an adjacent cathode tube 88. Also, the side wall 92 of each cathode tube 88 of the Cathode Matrix 15 preferably defines the bore 90 of the cathode tube 88 with a hexagonal shape in transverse cross-section, or each cathode tube 88 of the Cathode Matrix 15 is formed with a hexagonal shape in transverse cross-section.

Preferably, the Cathode Matrix 15 and the plurality of cathode tubes 88 thereof are formed from an electro-conductive material, and/or are formed from a carbon nanotube enriched polymer. The Cathode Matrix 15 and the plurality of cathode tubes 88 thereof may be formed from one of polyphenylene sulfide and polyether ether ketone (PEEK) polymer.

Preferably, each Anode 16 is formed from an electro-conductive material, and/or is formed from a carbon nanotube enriched polymer. Each Anode 16 is preferably formed with a hexagonal shape in transverse cross-section.

Also, in a preferred form of the present invention, each Hydrogen Collector Tube 17 is formed with a hexagonal shape in transverse cross-section. The side wall 100 of each Hydrogen Collector Tube 17 may define the bore 98 of the Hydrogen Collector Tube 17 with a hexagonal shape in transverse cross-section.

Preferably, each Hydrogen Collector Tube 17 is formed from an electro-conductive material, and/or is formed from a carbon nanotube enriched polymer. Each Hydrogen Collector Tube 17 may include one of a graphene coating and a graphene film. Also, each Hydrogen Collector Tube 17 may be made from a material which is substantially permeable to hydrogen and is substantially impermeable to oxygen.

In yet another preferred form of the present invention, the Reactor 1 of the hydrogen and oxygen supply system further includes a plurality of Anode Spacers 31. Each Anode Spacer 31 is mounted on and extends radially outwardly from a respective Anode 16. Each Anode Spacer 31 maintains a space between the respective Anode 16 on which the Spacer 31 is mounted and the side wall 100 of a Hydrogen Collector Tube 17 in which the Anode 16 is received.

Each Anode Spacer 31 preferably has a substantially planar body 102 and includes openings 104 formed through the thickness of the planar body 102 to allow hydrogen gas to pass therethrough. Each Anode Spacer 31 may be formed as a permeable member to allow hydrogen gas to pass through the thickness thereof.

Preferably, each Anode Spacer 31 is formed from an electrically insulative material. More specifically, each Anode Spacer 31 may be formed from an aliphatic polyamide synthetic polymer.

In a preferred form, each Anode Spacer 31 has a substantially star-shaped planar body 102 and a central opening 106 formed through the thickness of the planar body 102, the central opening 106 of the Anode Spacer 31 receiving therein a respective Anode 16.

In yet another preferred form of the present invention, the structure which provides a second voltage potential on the plurality of Anodes 16 includes an Anode Touch Plate 30. The Anode Touch Plate 30 preferably has a planar main body 108, the planar main body 108 having an upper surface 110 and a plurality of spaced apart Anode Push Sockets 35 situated on the upper surface 110. Each Anode Push Socket 35 is preferably dimensioned to at least partially receive the bottom axial end of a respective Anode 16.

More specifically, the planar main body 108 of the Anode Touch Plate 30 is preferably formed of an electrically insulative material. Also, each Anode Push Socket 35 is preferably formed of an electrically conductive material. Even more specifically, each Anode Push Socket 35 may be formed from an electro-conductive polymer. The Anode Touch Plate 30 may further include a plurality of electrically conductive members 60 electrically interconnected to the Anode Push Sockets 35.

In a preferred form, the planar main body 108 of the Anode Touch Plate 30 has a lower surface 112 situated opposite the upper surface 110, and the lower surface 112 of the planar main body 108 has formed therein a plurality of channels 62 recessed from the lower surface 112, the channels 62 receiving the electrically conductive members 60. The electrically conductive members 60 of the Anode Touch Plate 30 may be formed from electro-conductive polymer material, or the electrically conductive members 60 of the Anode Touch Plate 30 may include electrically conductive wires.

The hydrogen and oxygen supply system of the present invention, in a preferred form, includes a Cathode Touch Plate 29. The Cathode Touch Plate 29 has an upper surface 114 and a plurality of spaced apart openings 116 formed in the upper surface 114. Each opening 116 of the Cathode Touch Plate 29 at least partially receives a bottom axial end 104 of a respective Hydrogen Collector Tube 17. Furthermore, the structure for providing a first voltage potential on the Cathode Matrix 15 and the cathode tubes 88 thereof preferably includes a Cathode Electro-Conductive Matrix 32. The Cathode Electro-Conductive Matrix 32 is preferably mounted on the upper surface 114 of the Cathode Touch Plate 29 and is in electrical communication with the Cathode Matrix 15 and the cathode tubes 88 thereof. The Cathode Electro-Conductive Matrix 32 may be formed from an electro-conductive polymer, and the Cathode Touch Plate 29 may be formed from an electrically insulating material.

In accordance with a further embodiment of the present invention, the Cathode Touch Plate 29 has formed in the upper surface 114 thereof a channel 118, the channel 118 at least partially receiving the Cathode Electro-Conductive Matrix 32.

As stated previously, the hydrogen and oxygen supply system of the present invention preferably includes an Anode Touch Plate 30, where the Anode Touch Plate 30 preferably has a planar main body 108, the planar main body 108 having an upper surface 110 and a plurality of spaced apart Anode Push Sockets 35 situated on the upper surface 110, and where each Anode Push Socket 35 is dimensioned to at least partially receive an axial end of a respective Anode 16. The hydrogen and oxygen supply system may also include a Collector Gasket 23. The Collector Gasket 23 preferably has a substantially planar main body 120. More specifically, the planar main body 120 of the Collector Gasket 23 has an upper surface 122, a plurality of spaced apart openings 57 formed through the thickness of the main body 120, and a plurality of spaced apart collector tube support projections 56 extending outwardly from the upper surface 122 of the main body 120. Each collector tube support projection 56 surrounds a respective opening 57 formed through the thickness of the main body 120.

In the above-described embodiment, the bottom axial end of each Anode 16 passes through a respective opening 57 formed in the main body 120 of the Collector Gasket 23, and each of the collector tube support projections 56 of the Collector Gasket 23 is dimensioned to be received by the bore 98 of a respective Hydrogen Collector Tube 17 at the bottom axial end 104 thereof.

In an even more preferred form of the present invention, the hydrogen and oxygen supply system further includes a Hydrogen Bubbler 4 and an Oxygen Bubbler 5. The Hydrogen Bubbler 4 has an input port and an output port, the input port of the Hydrogen Bubbler 4 being in gaseous communication with the first port 25 of the Reactor 1 and receiving disassociated hydrogen gas collected in the second chamber 86 of the Hydrogen Trap 3. Similarly, the Oxygen Bubbler 5 has an input port and an output port, the input port of the Oxygen Bubbler 5 being in gaseous communication with the second port 26 of the Reactor 1 and receiving disassociated oxygen gas collected in the first chamber 84 of the Redox Chamber 6.

The hydrogen and oxygen supply system of the present invention also preferably includes a first Desiccant Cartridge 7a and a second Desiccant Cartridge 7b. The first Desiccant Cartridge 7a has a housing defining an internal chamber and further has a desiccant contained in the chamber, the internal chamber and desiccant of the first Desiccant Cartridge 7a being in fluid communication with the output port of the Oxygen Bubbler 5 and receiving disassociated oxygen gas collected in the first chamber 84 of the Redox Chamber 6 and received by the Oxygen Bubbler 5. Similarly, the second Desiccant Cartridge 7b has a housing defining an internal chamber and further has a desiccant contained in the chamber, the internal chamber and desiccant of the second Desiccant Cartridge 7b being in fluid communication with the output port of the Hydrogen Bubbler 4 and receiving disassociated hydrogen gas collected in the second chamber 86 of the Hydrogen Trap 3 and received by the Hydrogen Bubbler 4.

In an alternative embodiment, the hydrogen and oxygen supply system of the present invention may include a first Desiccant Cartridge 7a, the first Desiccant Cartridge 7a having a housing defining an internal chamber and further having a desiccant contained in the chamber, the internal chamber and desiccant of the first Desiccant Cartridge 7a being in fluid communication with the first chamber 84 of the Redox Chamber 6 and receiving disassociated oxygen gas collected in the first chamber 84 of the Redox Chamber 6; and a second Desiccant Cartridge 7b, the second Desiccant Cartridge 7b having a housing defining an internal chamber and further having a desiccant contained in the chamber, the internal chamber and desiccant of the second Desiccant Cartridge 7b being in fluid communication with the second chamber 86 of the Hydrogen Trap 3 and receiving disassociated hydrogen gas collected in the second chamber 86 of the Hydrogen Trap 3.

In yet another form of the present invention, the hydrogen and oxygen supply system includes a first water feed (e.g., Fluid Vent 39a and/or Water Feed 14), a second water feed (e.g., Fluid Vent 39b and/or Water Feed 14), a redox chamber water valve (e.g., Redox Chamber Explosion Proof Solenoid Switch 27) and a hydrogen trap water valve (e.g., Hydrogen Trap Explosion Proof Solenoid Switch 28). More specifically, the first water feed 39a is in fluid communication with the interior space of the Redox Chamber 6 and is connectable to a supply of water. The redox chamber water valve 27 is in fluid communication with the first water feed 39a. The redox chamber water valve 27 is switchable between an open state in which water from the supply of water is permitted to pass through the first water feed 39a and enter the interior space of the Redox Chamber 6, and a closed state in which water from the supply of water is not permitted to pass through the first water feed 39a and enter the interior space of the Redox Chamber 6.

Similarly, the second water feed 39b is in fluid communication with the second chamber 86 of the Hydrogen Trap 3 and is connectable to the supply of water. The hydrogen trap water valve 28 is in fluid communication with the second water feed 39b. Like the redox chamber water valve 27, the hydrogen trap water valve 28 is switchable between an open state in which water from the supply of water is permitted to pass through the second water feed 39b and enter the second chamber 86 of the Hydrogen Trap 3, and a closed state in which water from the supply of water is not permitted to pass through the second water feed 39b and enter the second chamber 86 of the Hydrogen Trap.

In a more preferred form, the redox chamber water valve includes a Redox Chamber Explosion Proof Solenoid Switch 27, and the hydrogen trap water valve includes a Hydrogen Trap Explosion Proof Solenoid Switch 28.

The portable hydrogen and oxygen supply system of the present invention differs from conventional hydrogen and oxygen gas generating systems in many respects. The portable hydrogen and oxygen supply system of the present invention does not use expensive, rare platinum electrodes or catalysts. It instead uses highly electro-conductive polymer diodes, enriched with Carbon Nanotubes. They perform the same as platinum and outlive them on a ratio of 10 to 1, giving these components reliability and longevity.

The portable hydrogen and oxygen supply system of the present invention also does not use bipolar stacks. It uses a 120-degree geometry in a hexagonal pattern. This pattern mimics the path of electrical currents moving through water observed in electrolysis research which was conducted.

The portable hydrogen and oxygen supply system of the present invention further does not use Proton Exchange Membranes (PEMs). It instead breaks apart the water molecules through electrolysis, and lures the hydrogen atoms through the barrier of a tube (i.e., the Hydrogen Collector Tubes 17), where the anode (i.e., the Anodes 16) is housed, leaving the oxygen atoms on the outside of the barrier.

The portable hydrogen and oxygen supply system of the present invention is optimized to use common water sources. Although it can operate with distilled water, it performs better on tap water (preferably filtered).

Furthermore, the portable hydrogen and oxygen supply system of the present invention uses no electrolyte.

In addition, the portable hydrogen and oxygen supply system of the present invention uses spacing and improved electro-conductive materials to create its water disassociation.

The entire device (with the exception of the fastening bolts 46, the Water Level Sensors 37, wiring, the Water Level Control Board 38 and some hose fittings) can be vacuum molded, keeping the cost to the end user down while quality control can be maximized.

The portable hydrogen and oxygen supply system of the present invention can work in cooler temperatures than devices using Proton Exchange Membranes (PEMs) or solid oxide fuel cells (SOFC). Furthermore, the portable hydrogen and oxygen supply system of the present invention can work in lower pressures than devices using PEMs or SOFC. Additionally, the portable hydrogen and oxygen supply system of the present invention starts reaction at lower voltage, and drawing less current, than devices using PEMs or SOFC. Because of these advantages, the portably hydrogen and oxygen supply system can produce a greater yield of gasses than devices using PEMs or SOFC.

Preferably, the portable hydrogen and oxygen supply system of the present invention is made from polymers, and will be lighter in weight than devices made from metal. Furthermore, since it uses no electrolytes, the system of the present invention is more user friendly and is environmentally safer.

The portable hydrogen and oxygen supply system of the present invention, which creates hydrogen gas and oxygen gas from water disassociation, produces a greater yield of useable gases than that produced by conventional systems. Also, the portable hydrogen and oxygen supply system of the present invention exploits a number of observations noted by the inventor herein through his experimentation with water disassociation.

More specifically, the inventor herein has found that tap water and filtered tap water release far more gases than distilled water, using the same voltage in each example. Additionally, in an aqueous environment, it has been found that the closer one moves the diodes together, the less liquid electrolyte one needs to cause water disassociation with electrolysis. However, when the diodes are placed closer together, it becomes more difficult to separate the two gaseous elements when they leave the water.

It has further been found that using a Proton Exchange Membrane (PEM) can separate the gasses, but requires more electricity, draws more current, and requires certain torque pressures to work.

Similar results were reached when the inventor used diode material in place of the PEM. Through experimentation, it was realized that hydrogen passes through electro-conductive material with more ease than passing through Mylar, which is an electrical insulator and the outside layers of the PEM. Without PEMs, it was found that the diodes react optimally within a range of 3.175 mm to 2.54 mm from each other (i.e., the spacing between cathodes and anodes), depending on the diode material.

It was also found that, in a filtered water environment, tertiary gasses are still released, mostly in "trace" amounts which can easily be filtered.

It was further found that metals are limited in their application. Less precious metal has a higher resistance (Ω Ohms), while precious metals are more expensive and become impractical for diodes.

All diodes are sacrificial. Oxygen tends to dissolve cathodes rapidly as the anode becomes anodized with elements and compounds are free in the water or gasses. It was found that both soon needed to be replaced.

It was further found that, if highly electro-conductive polymers or highly electro-conductive carbon aerogels (i.e. PEEK or Polyphenylene Sulfide) are used, the longevity of these diodes can be greatly improved, in many instances by a ratio of 10 to 1.

It was also found that polymers, like Polyphenylene Sulfide, have very little resistance (in Ω Ohms) and remain cooler than their metal counterparts. Also, polymers can be modified to have even greater electro-conductivity. Polymers can be injection molded, keeping the cost down to the end user, as opposed to metals that have to be shaped at much higher costs.

It was further found through research that gasses in an electrolytic chamber (e.g., Redox Chamber 6) tend to flow through the water (following the electrical current) on a 60 or 120 degree angle. This pattern was found to be three dimensional.

The hydrogen and oxygen supply system of the present has a great number of features and advantages, some of which are summarized below:

1. The portable hydrogen and oxygen supply system of the present invention uses highly electro-conductive polymers or highly electro-conductive carbon aerogels instead of platinum for its diodes. The highly electro-conductive polymers or highly electro-conductive carbon aerogels promise longer life of the diode material than conventional diode materials.

2. The hydrogen and oxygen supply system of the present invention is portable, but can be scaled up for industrial applications.

3. The portable hydrogen and oxygen supply system of the present invention makes pure atomic hydrogen and pure atomic oxygen gasses from common water that does not require distillation.

4. The portable hydrogen and oxygen supply system of the present invention can be injection molded. This keeps consumer cost reasonable.

5. The portable hydrogen and oxygen supply system of the present invention does not use liquid electrolytes.

6. The portable hydrogen and oxygen supply system of the present invention does not need Proton Exchange Membranes (PEM).

7. The portable hydrogen and oxygen supply system of the present invention will create greater yields of gasses at lower voltage than that of PEM assembly generation devices.

8. The portable hydrogen and oxygen supply system of the present invention can disassociate water at lower temperatures than that of PEM, Solid Oxide Fuel Cell (SOFC), or other devices that disassociate water.

9. The portable hydrogen and oxygen supply system of the present invention works at lower internal pressures than other devices that disassociate water.

10. All emissions of the portable hydrogen and oxygen supply system of the present invention are environmentally safe, when using water.

11. The portable hydrogen and oxygen supply system of the present invention uses a unique "honeycomb" planar design.

12. The portable hydrogen and oxygen supply system of the present invention employs simple electrolysis, and passes the hydrogen from water through a polymer that filters out the oxygen.

13. The portable hydrogen and oxygen supply system of the present invention can produce the necessary gasses for: fuel cells, welding torches, hydrogen internal combustion engines, forming gasses, gasses for hospitals, cabin conditions and academic use.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A hydrogen and oxygen supply system, which comprises:
   a reactor, the reactor defining an internal cavity for containing water and for causing the water to disassociate into hydrogen gas and oxygen gas;
   a first port in fluid communication with the internal cavity of the reactor for venting therethrough the disassociated hydrogen gas; and
   a second port in fluid communication with the internal cavity of the reactor for venting therethrough the disassociated oxygen gas;
   wherein the reactor includes:
   a redox chamber, the redox chamber having an outer wall, the outer wall at least partially defining interiorly thereof an interior space, and a first chamber for collecting disassociated oxygen gas, the second port being in fluid communication with the first chamber;
   a hydrogen trap, the hydrogen trap being mounted on the redox chamber, the hydrogen trap at least partially defining a second chamber for collecting disassociated hydrogen gas, the first port being in fluid communication with the second chamber;
   a cathode matrix, the cathode matrix being situated within the interior space of the redox chamber, the cathode matrix including a plurality of upstanding cathode tubes, each cathode tube having an axial length and defining a bore extending axially therein, each cathode tube having a side wall and an open top axial end;
   means for providing a first voltage potential on the cathode matrix, the first voltage potential providing means being in electrical communication with the cathode matrix and the plurality of upstanding cathode tubes thereof;
   a plurality of anodes, each anode being in the form of an elongated member;
   means for providing a second voltage potential on the anodes, the second voltage potential providing means being in electrical communication with the anodes, the second voltage potential being different in magnitude from that of the first voltage potential;

a plurality of hydrogen collector tubes, each hydrogen collector tube having an axial length and defining a bore extending axially therein, each hydrogen collector tube having a side wall and an open top axial end, each anode being received by the bore of a respective hydrogen collector tube and being spaced therewithin so as not to contact the side wall of the respective hydrogen collector tube in which the anode is received, each hydrogen collector tube being received by the bore of a respective cathode tube of the cathode matrix and being spaced therewithin so as not to contact the side wall of the respective cathode tube in which the hydrogen collector tube is received; and a separator element disposed between the redox chamber and the hydrogen trap, the separator element separating the first chamber of the redox chamber from the second chamber of the hydrogen trap so that the first chamber is not in gaseous communication with the second chamber;

wherein the axial length of each of the hydrogen collector tubes is greater than the axial length of each of the cathode tubes of the cathode matrix;

wherein the open top axial end of each hydrogen collector tube extends to the hydrogen trap such that the bore of each hydrogen collector tube is in gaseous communication with the second chamber of the hydrogen trap;

wherein the open top axial end of each cathode tube of the cathode matrix extends upwardly in the redox chamber such that the space within the bore of each cathode tube defined between the side wall of the cathode tube and the side wall of the hydrogen collector tube received thereby is in gaseous communication with the first chamber of the redox chamber; and wherein each hydrogen collector tube is made from a material which is substantially permeable to hydrogen and is substantially impermeable to oxygen so as to allow hydrogen to pass therethrough and to prevent oxygen from passing therethrough.

2. A hydrogen and oxygen supply system as defined by claim 1, wherein the separator element is a planar member having a plurality of openings formed through the thickness thereof, each opening closely receiving a respective hydrogen collector tube and forming a substantially gastight seal therewith.

3. A hydrogen and oxygen supply system as defined by claim 2, wherein the separator element is a choke gasket having elastic properties.

4. A hydrogen and oxygen supply system as defined by claim 3, wherein the separator element is made from at least one of a fluoroelastomer and an electrically insulating material.

5. A hydrogen and oxygen supply system as defined by claim 1, wherein the cathode matrix is formed with a honeycomb shape in transverse cross-section;
wherein the cathode matrix includes cathode tubes which are adjacent to other cathode tubes; and
wherein the side wall of a cathode tube of the cathode matrix is joined to the side wall of an adjacent cathode tube.

6. A hydrogen and oxygen supply system as defined by claim 1, wherein the side wall of each cathode tube of the cathode matrix defines the bore of the cathode tube with a hexagonal shape in transverse cross-section.

7. A hydrogen and oxygen supply system as defined by claim 1, wherein each cathode tube of the cathode matrix is formed with a hexagonal shape in transverse cross-section.

8. A hydrogen and oxygen supply system as defined by claim 1, wherein the cathode matrix and the plurality of cathode tubes thereof are formed from an electro-conductive material.

9. A hydrogen and oxygen supply system as defined by claim 1, wherein the cathode matrix and the plurality of cathode tubes thereof are formed from a carbon nanotube enriched polymer.

10. A hydrogen and oxygen supply system as defined by claim 9, wherein the cathode matrix and the plurality of cathode tubes thereof are formed from one of polyphenylene sulfide and polyether ether ketone (PEEK) polymer.

11. A hydrogen and oxygen supply system as defined by claim 1, wherein each anode is formed from an electro-conductive material.

12. A hydrogen and oxygen supply system as defined by claim 1, wherein each anode is formed from a carbon nanotube enriched polymer.

13. A hydrogen and oxygen supply system as defined by claim 1, wherein each anode is formed with a hexagonal shape in transverse cross-section.

14. A hydrogen and oxygen supply system as defined by claim 1, wherein each hydrogen collector tube is formed with a hexagonal shape in transverse cross-section.

15. A hydrogen and oxygen supply system as defined by claim 1, wherein the side wall of each hydrogen collector tube defines the bore of the hydrogen collector tube with a hexagonal shape in transverse cross-section.

16. A hydrogen and oxygen supply system as defined by claim 1, wherein each hydrogen collector tube is formed from an electro-conductive material.

17. A hydrogen and oxygen supply system as defined by claim 1, wherein each hydrogen collector tube is formed from a carbon nanotube enriched polymer.

18. A hydrogen and oxygen supply system as defined by claim 1, wherein each hydrogen collector tube includes one of a graphene coating and a graphene film.

19. A hydrogen and oxygen supply system as defined by claim 1, wherein the reactor further includes:
a plurality of anode spacers, each anode spacer being mounted on and extending radially outwardly from a respective anode, each anode spacer maintaining a space between the respective anode on which the spacer is mounted and the side wall of a hydrogen collector tube in which the anode is received.

20. A hydrogen and oxygen supply system as defined by claim 19, wherein each anode spacer has a substantially planar body and includes openings formed through the thickness of the planar body to allow hydrogen gas to pass therethrough.

21. A hydrogen and oxygen supply system as defined by claim 19, wherein each anode spacer is formed as a permeable member to allow hydrogen gas to pass through the thickness thereof.

22. A hydrogen and oxygen supply system as defined by claim 19, wherein each anode spacer is formed from an electrically insulative material.

23. A hydrogen and oxygen supply system as defined by claim 19, wherein each anode spacer is formed from an aliphatic polyamide synthetic polymer.

24. A hydrogen and oxygen supply system as defined by claim 19, wherein each anode spacer has a substantially star-shaped planar body and a central opening formed through the thickness of the planar body, the central opening of the anode spacer receiving therein a respective anode.

25. A hydrogen and oxygen supply system as defined by claim 1, wherein the means for providing a second voltage potential on the plurality of anodes includes:
   an anode touch plate, the anode touch plate having a planar main body, the planar main body having an upper surface and a plurality of spaced apart anode push sockets situated on the upper surface, each anode push socket being dimensioned to at least partially receive an axial end of a respective anode.

26. A hydrogen and oxygen supply system as defined by claim 25, wherein the planar main body of the anode touch plate is formed of an electrically insulative material;
   wherein each anode push socket is formed of an electrically conductive material; and
   wherein the anode touch plate further includes a plurality of electrically conductive members electrically interconnected to the anode push sockets.

27. A hydrogen and oxygen supply system as defined by claim 26, wherein each anode push socket is formed from an electro-conductive polymer.

28. A hydrogen and oxygen supply system as defined by claim 26, wherein the planar main body of the anode touch plate has a lower surface situated opposite the upper surface; and
   wherein the lower surface of the planar main body has formed therein a plurality of channels recessed from the lower surface, the channels receiving the electrically conductive members.

29. A hydrogen and oxygen supply system as defined by claim 26, wherein the electrically conductive members of the anode touch plate are formed from electro-conductive polymer material.

30. A hydrogen and oxygen supply system as defined by claim 26, wherein the electrically conductive members of the anode touch plate include electrically conductive wires.

31. A hydrogen and oxygen supply system as defined by claim 1, which further comprises:
   a cathode touch plate, the cathode touch plate having an upper surface and a plurality of spaced apart openings fanned in the upper surface, each opening of the cathode touch plate at least partially receiving an axial end of a respective hydrogen collector tube; and
   wherein the means for providing a first voltage potential on the cathode matrix and the cathode tubes thereof includes:
   a cathode electro-conductive matrix, the cathode electro-conductive matrix being mounted on the upper surface of the cathode touch plate and being in electrical communication with the cathode matrix and the cathode tubes thereof.

32. A hydrogen and oxygen supply system as defined by claim 31, wherein the cathode electro-conductive matrix is formed from an electro-conductive polymer.

33. A hydrogen and oxygen supply system as defined by claim 31, wherein the cathode touch plate is formed from an electrically insulating material.

34. A hydrogen and oxygen supply system as defined by claim 31, wherein the cathode touch plate has formed in the upper surface thereof a channel, the channel at least partially receiving the cathode electro-conductive matrix.

35. A hydrogen and oxygen supply system as defined by claim 31, which further comprises:
   an anode touch plate, the anode touch plate having a planar main body, the planar main body having an upper surface and a plurality of spaced apart anode push sockets situated on the upper surface, each anode push socket being dimensioned to at least partially receive an axial end of a respective anode; and
   a collector gasket, the collector gasket having a substantially planar main body, the planar main body of the collector gasket having an upper surface, a plurality of spaced apart openings formed through the thickness of the main body, and a plurality of spaced apart collector tube support projections extending outwardly from the upper surface of the main body, each collector tube support projection surrounding a respective opening formed through the thickness of the main body;
   wherein an axial end of each anode passes through a respective opening formed in the main body of the collector gasket; and
   wherein each of the collector tube support projections of the collector gasket is dimensioned to be received by the bore of a respective hydrogen collector tube at an axial end thereof.

36. A hydrogen and oxygen supply system as defined by claim 1, which further comprises:
   a hydrogen bubbler, the hydrogen bubbler having an input port and an output port, the input port of the hydrogen bubbler being in gaseous communication with the first port of the reactor and receiving disassociated hydrogen gas collected in the second chamber of the hydrogen trap; and
   an oxygen bubbler, the oxygen bubbler having an input port and an output port, the input port of the oxygen bubbler being in gaseous communication with the second port of the reactor and receiving disassociated oxygen gas collected in the first chamber of the redox chamber.

37. A hydrogen and oxygen supply system as defined by claim 36, which further comprises:
   a first desiccant cartridge, the first desiccant cartridge having a housing defining an internal chamber and further having a desiccant contained in the chamber, the internal chamber and desiccant of the first desiccant cartridge being in fluid communication with the output port of the oxygen bubbler and receiving disassociated oxygen gas collected in the first chamber of the redox chamber and received by the oxygen bubbler; and
   a second desiccant cartridge, the second desiccant cartridge having a housing defining an internal chamber and further having a desiccant contained in the chamber, the internal chamber and desiccant of the second desiccant cartridge being in fluid communication with the output port of the hydrogen bubbler and receiving disassociated hydrogen gas collected in the second chamber of the hydrogen trap and received by the hydrogen bubbler.

38. A hydrogen and oxygen supply system as defined by claim 1, which further comprises:
   a first desiccant cartridge, the first desiccant cartridge having a housing defining an internal chamber and further having a desiccant contained in the chamber, the internal chamber and desiccant of the first desiccant cartridge being in fluid communication with the first chamber of the redox chamber and receiving disassociated oxygen gas collected in the first chamber of the redox chamber; and
   a second desiccant cartridge, the second desiccant cartridge having a housing defining an internal chamber and further having a desiccant contained in the chamber, the internal chamber and desiccant of the second desiccant cartridge being in fluid communication with the second chamber of the hydrogen trap and receiving disassociated hydrogen gas collected in the second chamber of the hydrogen trap.

39. A hydrogen and oxygen supply system as defined by claim 1, which further comprises:
- a first water feed, the first water feed being in fluid communication with the interior space of the redox chamber, the first water feed being connectable to a supply of water;
- a redox chamber water valve, the redox chamber water valve being in fluid communication with the first water feed and being switchable between an open state in which water from the supply of water is permitted to pass through the first water feed and enter the interior space of the redox chamber, and a closed state in which water from the supply of water is not permitted to pass through the first water feed and enter the interior space of the redox chamber;
- a second water feed, the second water feed being in fluid communication with the second chamber of the hydrogen trap, the second water feed being connectable to the supply of water; and
- a hydrogen trap water valve, the hydrogen trap water valve being in fluid communication with the second water feed and being switchable between an open state in which water from the supply of water is permitted to pass through the second water feed and enter the second chamber of the hydrogen trap, and a closed state in which water from the supply of water is not permitted to pass through the second water feed and enter the second chamber of the hydrogen trap.

40. A hydrogen and oxygen supply system as defined by claim 39, wherein the redox chamber water valve includes a redox chamber explosion proof solenoid switch; and
wherein the hydrogen trap water valve includes a hydrogen trap explosion proof solenoid switch.

41. A hydrogen and oxygen supply system, which comprises:
- a reactor, the reactor defining an internal cavity for containing water and for causing the water to disassociate into hydrogen gas and oxygen gas;
- a first port in fluid communication with the internal cavity of the reactor for venting therethrough a first disassociated gas, the first disassociated gas being one of oxygen gas and hydrogen gas; and
- a second port in fluid communication with the internal cavity of the reactor for venting therethrough a second disassociated gas, the second disassociated gas being the other of oxygen gas and hydrogen gas;
wherein the reactor includes:
- a redox chamber, the redox chamber having an outer wall, the outer wall at least partially defining interiorly thereof an interior space, and a first chamber for collecting the first disassociated gas, the second port being in fluid communication with the first chamber;
- a gas trap, the gas trap being mounted on the redox chamber, the gas trap at least partially defining a second chamber for collecting the second disassociated gas, the first port being in fluid communication with the second chamber;
- a cathode matrix, the cathode matrix being situated within the interior space of the redox chamber, the cathode matrix including a plurality of upstanding cathode tubes, each cathode tube having an axial length and defining a bore extending axially therein, each cathode tube having a side wall and an open top axial end;
- means for providing a first voltage potential on the cathode matrix, the first voltage potential providing means being in electrical communication with the cathode matrix and the plurality of upstanding cathode tubes thereof;
- a plurality of anodes, each anode being in the form of an elongated member;
- means for providing a second voltage potential on the anodes, the second voltage potential providing means being in electrical communication with the anodes, the second voltage potential being different in magnitude from that of the first voltage potential;
- a plurality of gas collector tubes, each gas collector tube having an axial length and defining a bore extending axially therein, each gas collector tube having a side wall and an open top axial end, each anode being received by the bore of a respective gas collector tube and being spaced therewithin so as not to contact the side wall of the respective gas collector tube in which the anode is received, each gas collector tube being received by the bore of a respective cathode tube of the cathode matrix and being spaced therewithin so as not to contact the side wall of the respective cathode tube in which the gas collector tube is received; and
- a separator element disposed between the redox chamber and the gas trap, the separator element separating the first chamber of the redox chamber from the second chamber of the gas trap so that the first chamber is not in gaseous communication with the second chamber;
wherein the axial length of each of the gas collector tubes is greater than the axial length of each of the cathode tubes of the cathode matrix;
wherein the open top axial end of each gas collector tube extends to the gas trap such that the bore of each gas collector tube is in gaseous communication with the second chamber of the gas trap;
wherein the open top axial end of each cathode tube of the cathode matrix extends upwardly in the redox chamber such that the space within the bore of each cathode tube defined between the side wall of the cathode tube and the side wall of the gas collector tube received thereby is in gaseous communication with the first chamber of the redox chamber; and
wherein each gas collector tube is made from a material which is substantially permeable to hydrogen and is substantially impermeable to oxygen so as to allow hydrogen to pass therethrough and to prevent oxygen from passing therethrough.

42. A hydrogen and oxygen supply system as defined by claim 41, wherein the separator element is a planar member having a plurality of openings formed through the thickness thereof, each opening closely receiving a respective gas collector tube and forming a substantially gastight seal therewith.

43. A hydrogen and oxygen supply system as defined by claim 42, wherein the separator element is a choke gasket having elastic properties.

44. A hydrogen and oxygen supply system as defined by claim 43, wherein the separator element is made from at least one of a fluoroelastomer and an electrically insulating material.

45. A hydrogen and oxygen supply system as defined by claim 41, wherein the cathode matrix is formed with a honeycomb shape in transverse cross-section;
wherein the cathode matrix includes cathode tubes which are adjacent to other cathode tubes; and
wherein the side wall of a cathode tube of the cathode matrix is joined to the side wall of an adjacent cathode tube.

46. A hydrogen and oxygen supply system as defined by claim 41, wherein the side wall of each cathode tube of the cathode matrix defines the bore of the cathode tube with a hexagonal shape in transverse cross-section.

47. A hydrogen and oxygen supply system as defined by claim 41, wherein each cathode tube of the cathode matrix is formed with a hexagonal shape in transverse cross-section.

48. A hydrogen and oxygen supply system as defined by claim 41, wherein the cathode matrix and the plurality of cathode tubes thereof are formed from an electro-conductive material.

49. A hydrogen and oxygen supply system as defined by claim 41, wherein the cathode matrix and the plurality of cathode tubes thereof are formed from a carbon nanotube enriched polymer.

50. A hydrogen and oxygen supply system as defined by claim 49, wherein the cathode matrix and the plurality of cathode tubes thereof are formed from one of polyphenylene sulfide and polyether ether ketone (PEEK) polymer.

51. A hydrogen and oxygen supply system as defined by claim 41, wherein each anode is formed from an electro-conductive material.

52. A hydrogen and oxygen supply system as defined by claim 41, wherein each anode is formed from a carbon nanotube enriched polymer.

53. A hydrogen and oxygen supply system as defined by claim 41, wherein each anode is formed with a hexagonal shape in transverse cross-section.

54. A hydrogen and oxygen supply system as defined by claim 41, wherein each gas collector tube is formed with a hexagonal shape in transverse cross-section.

55. A hydrogen and oxygen supply system as defined by claim 41, wherein the side wall of each gas collector tube defines the bore of the gas collector tube with a hexagonal shape in transverse cross-section.

56. A hydrogen and oxygen supply system as defined by claim 41, wherein each gas collector tube is formed from an electro-conductive material.

57. A hydrogen and oxygen supply system as defined by claim 41, wherein each gas collector tube is formed from a carbon nanotube enriched polymer.

58. hydrogen and oxygen supply system as defined by claim 41, wherein each gas collector tube includes one of a graphene coating and a graphene film.

59. A hydrogen and oxygen supply system as defined by claim 42, wherein the reactor further includes:
a plurality of anode spacers, each anode spacer being mounted on and extending radially outwardly from a respective anode, each anode spacer maintaining a space between the respective anode on which the spacer is mounted and the side wall of a gas collector tube in which the anode is received.

60. A hydrogen and oxygen supply system as defined by claim 59, wherein each anode spacer has a substantially planar body and includes openings formed through the thickness of the planar body to allow the second disassociated gas to pass therethrough.

61. A hydrogenand oxygen supply system as defined by claim 59, wherein each anode spacer is formed as a permeable member to allow the second disassociated gas to pass through the thickness thereof.

62. A hydrogen and oxygen supply system as defined by claim 59, wherein each anode spacer is formed from an electricallyinsulative material.

63. A hydrogen and oxygen supply system as defined by claim 59, wherein each anode spacer is formed from an aliphatic polyamide synthetic polymer.

64. A hydrogen and oxygen supply system as defined by claim 59, wherein each anode spacer has a substantially star-shaped planar body and a central opening formed through the thickness of the planar body, the central opening of the anode spacer receiving therein a respective anode.

65. A hydrogen and oxygen supply system as defined by claim 41, wherein the means for providing a second voltage potential on the plurality of anodes includes:
an anode touch plate, the anode touch plate having a planar main body, the planar main body having an upper surface and a plurality of spaced apart anode push sockets situated on the upper surface, each anode push socket being dimensioned to at least partially receive an axial end of a respective anode.

66. A hydrogen and oxygen supply system as defined by claim 65, wherein the planar main body of the anode touch plate is formed of an electrically insulative material;
wherein each anode push socket is formed of an electrically conductive material; and
wherein the anode touch plate further includes a plurality of electrically conductive members electrically interconnected to the anode push sockets.

67. A hydrogen and oxygen supply system as defined by claim 66, wherein each anode push socket is formed from an electro-conductive polymer.

68. A hydrogen and oxygen supply system as defined by claim 66, wherein the planar main body of the anode touch plate has a lower surface situated opposite the upper surface; and
wherein the lower surface of the planar main body has formed therein a plurality of channels recessed from the lower surface, the channels receiving the electrically conductive members.

69. A hydrogen and oxygen supply system as defined by claim 66, wherein the electrically conductive members of the anode touch plate are formed from electro-conductive polymer material.

70. A hydrogen and oxygen supply system as defined by claim 66, wherein the electrically conductive members of the anode touch plate include electrically conductive wires.

71. A hydrogen and oxygen supply system as defined by claim 41, which further comprises:
a cathode touch plate, the cathode touch plate having an upper surface and a plurality of spaced apart openings formed in the upper surface, each opening of the cathode touch plate at least partially receiving an axial end of a respective gas collector tube; and wherein the means for providing a first voltage potential on the cathode matrix and the cathode tubes thereof includes:
a cathode electro-conductive matrix, the cathode electro-conductive matrix being mounted on the upper surface of the cathode touch plate and being in electrical communication with the cathode matrix and the cathode tubes thereof.

72. A hydrogen and oxygen supply system as defined by claim 71, wherein the cathode electro-conductive matrix is formed from an electro-conductive polyiner.

73. A hydrogen and oxygen supply system as defined by claim 71, wherein the cathode touch plate is formed from an electrically insulating material.

74. A hydrogen and oxygen supply system as defined by claim 71, wherein the cathode touch plate has formed in the upper surface thereof a channel, the channel at least partially receiving the cathode electro-conductive matrix.

75. A hydrogen and oxygen supply system as defined by claim 71, which further comprises:
- an anode touch plate, the anode touch plate having a planar main body, the planar main body having an upper surface and a plurality of spaced apart anode push sockets situated on the upper surface, each anode push socket being dimensioned to at least partially receive an axial end of a respective anode; and
- a collector gasket, the collector gasket having a substantially planar main body, the planar main body of the collector gasket having an upper surface, a plurality of spaced apart openings formed through the thickness of the main body, and a plurality of spaced apart collector tube support projections extending outwardly from the upper surface of the main body, each collector tube support projection surrounding a respective opening formed through the thickness of the main body;
- wherein an axial end of each anode passes through a respective opening formed in the main body of the collector gasket; and
- wherein each of the collector tube support projections of the collector gasket is dimensioned to be received by the bore of a respective gas collector tube at an axial end thereof.

76. A hydrogen and oxygen supply system as defined by claim 41, which further comprises:
- a second disassociated gas bubbler, the second disassociated gas bubbler having an input port and an output port, the input port of the second disassociated gas bubbler being in gaseous communication with the first port of the reactor and receiving the second disassociated gas collected in the second chamber of the gas trap; and
- a first disassociated gas bubbler, the first disassociated gas bubbler having an input port and an output port, the input port of the first disassociated gas bubbler being in gaseous communication with the second port of the reactor and receiving the first disassociated gas collected in the first chamber of the redox chamber.

77. A hydrogen and oxygen supply system as defined by claim 76, which further comprises:
- a first desiccant cartridge, the first desiccant cartridge having a housing defining an internal chamber and further having a desiccant contained in the chamber, the internal chamber and desiccant of the first desiccant cartridge being in fluid communication with the output port of the first disassociated gas bubbler and receiving the first disassociated gas collected in the first chamber of the redox chamber and received by the first disassociated gas bubbler; and
- a second desiccant cartridge, the second desiccant cartridge having a housing defining an internal chamber and further having a desiccant contained in the chamber, the internal chamber and desiccant of the second desiccant cartridge being in fluid communication with the output port of the second disassociated gas bubbler and receiving the second disassociated gas collected in the second chamber of the gas trap and received by the second disassociated gas bubbler.

78. A hydrogen and oxygen supply system as defined by claim 41, which further comprises:
- a first desiccant cartridge, the first desiccant cartridge having a housing defining an internal chamber and further having a desiccant contained in the chamber, the internal chamber and desiccant of the first desiccant cartridge being in fluid communication with the first chamber of the redox chamber and receiving the first disassociated gas collected in the first chamber of the redox chamber; and
- a second desiccant cartridge, the second desiccant cartridge having a housing defining an internal chamber and further having a desiccant contained in the chamber, the internal chamber and desiccant of the second desiccant cartridge being in fluid communication with the second chamber of the gas trap and receiving the second disassociated gas collected in the second chamber of the gas trap.

79. A hydrogen and oxygen supply system as defined by claim 41, which further comprises:
- a first water feed, the first water feed being in fluid communication with the interior space of the redox chamber, the first water feed being connectable to a supply of water;
- a redox chamber water valve, the redox chamber water valve being in fluid communication with the first water feed and being switchable between an open state in which water from the supply of water is permitted to pass through the first water feed and enter the interior space of the redox chamber, and a closed state in which water from the supply of water is not permitted to pass through the first water feed and enter the interior space of the redox chamber;
- a second water feed, the second water feed being in fluid communication with the second chamber of the gas trap, the second water feed being connectable to the supply of water; and
- a gas trap water valve, the gas trap water valve being in fluid communication with the second water feed and being switchable between an open state in which water from the supply of water is permitted to pass through the second water feed and enter the second chamber of the gas trap, and a closed state in which water from the supply of water is not permitted to pass through the second water feed and enter the second chamber of the gas trap.

80. A hydrogen and oxygen supply system as defined by claim 79, wherein the redox chamber water valve includes a redox chamber explosion proof solenoid switch; and
- wherein the gas trap water valve includes a gas trap explosion proof solenoid switch.

* * * * *